US009812007B2

(12) United States Patent
Inaba et al.

(10) Patent No.: US 9,812,007 B2
(45) Date of Patent: Nov. 7, 2017

(54) MAP GENERATION SYSTEM, MAP GENERATION DEVICE, MAP GENERATION METHOD, AND PROGRAM

(71) Applicant: HONDA MOTOR CO., LTD., Tokyo (JP)

(72) Inventors: Tomonobu Inaba, Utsunomiya (JP); Hiromi Satou, Utsunomiya (JP); Naoko Imai, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 14/780,302

(22) PCT Filed: Mar. 26, 2014

(86) PCT No.: PCT/JP2014/058579
§ 371 (c)(1),
(2) Date: Sep. 25, 2015

(87) PCT Pub. No.: WO2014/157359
PCT Pub. Date: Oct. 2, 2014

(65) Prior Publication Data
US 2016/0078757 A1 Mar. 17, 2016

(30) Foreign Application Priority Data
Mar. 28, 2013 (JP) .................................. 2013-070530

(51) Int. Cl.
*G08G 1/01* (2006.01)
*G08G 1/056* (2006.01)
(Continued)

(52) U.S. Cl.
CPC ......... *G08G 1/0125* (2013.01); *G08G 1/0112* (2013.01); *G08G 1/0133* (2013.01);
(Continued)

(58) Field of Classification Search
None
See application file for complete search history.

(56) References Cited

U.S. PATENT DOCUMENTS 7,254,481 B2 * 8/2007 Yamada ............... G01C 21/343
340/988
2001/0027358 A1 * 10/2001 Schmitt ............. B60W 30/1882
701/1
(Continued)

FOREIGN PATENT DOCUMENTS

JP 3-37797 A 2/1991
JP 2003-240799 A 8/2003
(Continued)

OTHER PUBLICATIONS

International Search Report dated May 13, 2014, issued in counterpart Application No. PCT/JP2014/058579 (2 pages).

*Primary Examiner* — Rami Khatib
(74) *Attorney, Agent, or Firm* — Westerman, Hattori, Daniels & Adrian, LLP

(57) ABSTRACT

A map generation system includes: an extraction unit that collects vehicle speed information, which includes at least a speed, acceleration, and deceleration, from a vehicle and that extracts rapid deceleration information, which includes a first location where a rapid deceleration event satisfying predetermined conditions has occurred, and a traveling direction of the vehicle at the time when the rapid deceleration event has occurred from the collected vehicle speed information; a storage unit that stores map data; a division unit that generates mesh map data by dividing the map data stored in the storage unit into a plurality of meshes in a predetermined size and a predetermined number of divisions; and an estimation unit that estimates a location that requires caution when the vehicle travels therethrough, as a caution-required place, based on the rapid deceleration (Continued)

information extracted by the extraction unit and the mesh map data generated by the division unit.

12 Claims, 30 Drawing Sheets

(51) Int. Cl.
  *G08G 1/0968*  (2006.01)
  *G08G 1/16*  (2006.01)
  *G09B 29/10*  (2006.01)
  *G09B 29/00*  (2006.01)
  *G08G 1/0967*  (2006.01)

(52) U.S. Cl.
  CPC .......... *G08G 1/0141* (2013.01); *G08G 1/056* (2013.01); *G08G 1/0968* (2013.01); *G08G 1/096741* (2013.01); *G08G 1/096783* (2013.01); *G08G 1/096811* (2013.01); *G08G 1/096844* (2013.01); *G08G 1/16* (2013.01); *G09B 29/007* (2013.01); *G09B 29/10* (2013.01)

(56) References Cited

U.S. PATENT DOCUMENTS

| | | | | |
|---|---|---|---|---|
| 2013/0147955 | A1* | 6/2013 | Oosugi | G08G 1/096716 348/148 |
| 2014/0063196 | A1* | 3/2014 | Daniel | G08G 1/04 348/46 |
| 2015/0121472 | A1* | 4/2015 | Sengoku | G01C 21/26 726/4 |
| 2015/0211868 | A1* | 7/2015 | Matsushita | G01C 21/32 701/457 |

FOREIGN PATENT DOCUMENTS

| | | |
|---|---|---|
| JP | 2009-104531 A | 5/2009 |
| JP | 2010-140072 A | 6/2010 |

\* cited by examiner

MAP GENERATION SYSTEM, MAP GENERATION DEVICE, MAP GENERATION METHOD, AND PROGRAM

TECHNICAL FIELD

The present invention relates to a map generation system, a map generation device, a map generation method, and a program.

Priority is claimed on Japanese Patent Application No. 2013-070530, filed on Mar. 28, 2013, the contents of which are incorporated herein by reference.

BACKGROUND ART

There is a technique for collecting probe information of a vehicle and transmitting the probe information to a server (refer to Patent Document 1). The probe information includes information of the current location of the vehicle, which is information indicating the state of the vehicle based on the output signal of a sensor mounted in the vehicle.

For example, in a technique disclosed in Patent Document 2, characteristic specifying means and extraction means are included. The characteristic specifying means acquires road attribute information, which affects the road traveling on the danger occurrence point, and danger type information, which indicates the type of dangerous situation that has occurred at the danger occurrence point, for each of a plurality of danger occurrence points where the dangerous situation during the traveling of a vehicle has occurred, takes frequency distribution statistics for each of a plurality of pieces of road attribute information corresponding to the same danger type information, and specifies the representative characteristics of the road environment for each piece of the danger type information based on the frequency distribution statistics. The extraction means extracts a potential danger point, which matches one of the plurality of representative characteristics specified by the characteristic specifying means, by searching for point data including a combination of a point and the road environment, which affects the road traveling at the point, for a plurality of points.

PRIOR ART DOCUMENTS

Patent Documents

Patent Document 1: Japanese Unexamined Patent Application, First Publication No. 2010-140072
Patent Document 2: Japanese Unexamined Patent Application, First Publication No. 2009-104531

SUMMARY OF INVENTION

Problems to be Solved by the Invention

However, in the technique disclosed in Patent Document 2, even though it is possible to support safe driving by extracting the potential danger point (caution-required place) and transmitting the information of the danger point to the vehicle, for example, there has been a case where it is not possible to extract the potential danger point, such as an intersection where no traffic signal is provided. Thus, in the conventional techniques, there has been a problem that the extraction accuracy when extracting the caution-required place in a driving assistance system is not sufficient and accordingly the convenience of the user is not sufficient.

Aspects of the present invention have been made in view of the above, and it is an object of the present invention to provide a map generation system, a map generation device, a map generation method, and a program that can improve the extraction accuracy when extracting the caution-required place in a driving assistance system.

Means for Solving the Problems

In order to solve the aforementioned problem, the map generation system according to the present invention adopts the following configuration.

(1) A map generation system according to an aspect of the present invention includes: an extraction unit that collects vehicle speed information, which includes at least a speed, acceleration, and deceleration, from a vehicle and that extracts rapid deceleration information, which includes a first location where a rapid deceleration event satisfying predetermined conditions has occurred, and a traveling direction of the vehicle at the time when the rapid deceleration event has occurred from the collected vehicle speed information; a storage unit that stores map data; and an estimation unit that estimates a location that requires caution when the vehicle travels therethrough, as a caution-required place, based on the rapid deceleration information extracted by a division unit, which generates mesh map data by dividing the map data stored in the storage unit into a plurality of meshes in a predetermined size and a predetermined number of divisions, and the mesh map data generated by the division unit.

(2) In the aspect of (1) described above, intersection location information indicating a location of an intersection may be included in the map data, and the estimation unit may estimate the location of the intersection on the map data present in a front mesh in front of the mesh in which the first location indicated by the rapid deceleration information is included, as the caution-required place.

(3) In the aspect of (2) described above, the division unit may divide the map data into a plurality of block-shaped meshes in the predetermined size and the predetermined number of divisions, and the estimation unit may set the front mesh such that a bottom center portion of the front mesh having a plurality of meshes configured similarly to the plurality of meshes is provided at the first location where the rapid deceleration event has occurred.

(4) In the aspect of any one of (1) to (3) described above, the vehicle speed information may be information including vehicle speed information accumulated for a predetermined period of time, and the extraction unit may level the vehicle speed information in the predetermined period of time.

(5) In the aspect of any one of (2) to (4) described above, when a traffic signal is present at the location of the intersection, the estimation unit may not estimate the location of the intersection as the caution-required place.

(6) In the aspect of any one of (2) to (5) described above, the estimation unit may calculate a target speed in the caution-required place based on the vehicle speed information and associate the target speed with the caution-required place.

(7) In the aspect of any one of (2) to (6) described above, a word-of-mouth storage unit that stores word-of-mouth information including location information and road safety information at the location, the word-of-mouth information being provided from a plurality of users through a network, and a word-of-mouth unit that associates the caution-required place and the word-of-mouth information with each other when the word-of-mouth information regarding the caution-required place is present, may be further provided.

(8) A map generation device according to an aspect of the present invention includes: an extraction unit that collects vehicle speed information, which includes at least a speed, acceleration, and deceleration, from a vehicle and that extracts rapid deceleration information, which includes a first location where a rapid deceleration event satisfying predetermined conditions has occurred, and a traveling direction of the vehicle at the time when the rapid deceleration event has occurred from the collected vehicle speed information; a storage unit that stores map data; a division unit that generates mesh map data by dividing the map data stored in the storage unit into a plurality of meshes in a predetermined size and a predetermined number of divisions; and an estimation unit that estimates a location that requires caution when the vehicle travels therethrough, as a caution-required place, based on the rapid deceleration information extracted by the extraction unit and the mesh map data generated by the division unit.

(9) A map generation method according to an aspect of the present invention includes: a first step in which a map generation device including a storage unit that stores map data collects vehicle speed information, which includes at least a speed, acceleration, and deceleration, from a vehicle and that extracts rapid deceleration information, which includes a first location where a rapid deceleration event satisfying predetermined conditions has occurred, and a traveling direction of the vehicle at the time when the rapid deceleration event has occurred from the collected vehicle speed information; a second step of generating mesh map data by dividing the map data stored in the storage unit into a plurality of meshes in a predetermined size and a predetermined number of divisions; and a third step of estimating a location that requires caution when the vehicle travels therethrough, as a caution-required place, based on the rapid deceleration information extracted in the first step and the mesh map data generated in the second step.

(10) A program according to an aspect of the present invention causes a computer including a storage unit that stores map data to execute: a first step of collecting vehicle speed information, which includes at least a speed, acceleration, and deceleration, from a vehicle and extracting rapid deceleration information, which includes a first location where a rapid deceleration event satisfying predetermined conditions has occurred and a traveling direction of the vehicle at the time when the rapid deceleration event has occurred from the collected vehicle speed information; a second step of generating mesh map data by dividing the map data stored in the storage unit into a plurality of meshes in a predetermined size and a predetermined number of divisions; and a third step of estimating a location that requires caution when the vehicle travels therethrough, as a caution-required place, based on the rapid deceleration information extracted in the first step and the mesh map data generated in the second step.

Advantageous Effects of Invention

According to the aspect of (1) described above, the map generation system (driving assistance system S1) can extract rapid deceleration information including the traveling direction and the location of the vehicle when a rapid deceleration event has occurred based on the vehicle speed information including at least a speed, acceleration, and deceleration that is collected from the actual vehicle, and estimate a caution-required place based on the rapid deceleration information and mesh map data divided into a plurality of meshes in a predetermined size and a predetermined number of divisions. Therefore, it is possible to improve the extraction accuracy in extracting the caution-required place in the driving assistance system.

According to the aspect of (2) described above, the map generation system (driving assistance system S1) can estimate the location of the intersection present in a front mesh, which is in front of a location indicated by the rapid deceleration information and included in a mesh, as a caution-required place.

According to the aspect of (3) described above, the map generation system (driving assistance system S1) can estimate a caution-required place according to a plurality of front meshes based on the mesh map data which is obtained by dividing the map data into meshes in a predetermined size and a predetermined number of divisions.

According to the aspect of (4) described above, the map generation system (driving assistance system S1) can estimate a caution-required place according to season, year, month, day, and time by estimating the caution-required place through leveling in a predetermined period of time.

According to the aspect of (5) described above, the map generation system (driving assistance system S1) can estimate an intersection where no traffic signal is provided as a caution-required place, without estimating an intersection where a traffic signal is provided as a caution-required place, by estimating the caution-required place according to whether or not a traffic signal is provided.

According to the aspect of (6) described above, the map generation system (driving assistance system S1) can calculate the target speed based on the vehicle speed information including at least a speed, acceleration, and deceleration, and associate the target speed and the caution-required place with each other so that the target speed can be used as a threshold value when estimating the caution-required place. By estimating the caution-required place based on the threshold value, it is possible to suppress the occurrence of a situation in which a point, at which the vehicle travels appropriately along a specific flow of a road, is estimated as a caution-required place.

According to the aspect of (7) described above, the map generation system (driving assistance system S1) can store the word-of-mouth information including the location information and the road safety information and associate the word-of-mouth information and the caution-required place with each other. Therefore, it is possible to estimate a caution-required place based on the word-of-mouth information associated with the caution-required place.

According to the aspect of (8) described above, the map generation device (navigation in formation collection devices 1, 1A, and 1B) can extract rapid deceleration information including the traveling direction and the location of the vehicle when a rapid deceleration event has occurred based on the vehicle speed information including at least a speed, acceleration, and deceleration that is collected from the actual vehicle, and estimate a caution-required place based on the rapid deceleration information and mesh map data divided into a plurality of meshes in a predetermined size and a predetermined number of divisions. Therefore, it is possible to improve the extraction accuracy in extracting the caution-required place in the driving assistance system.

According to the aspect of (9) described above, the map generation method can extract rapid deceleration information including the traveling direction and the location of the vehicle when a rapid deceleration event has occurred based on the vehicle speed information including at least a speed, acceleration, and deceleration that is collected from the actual vehicle, and estimate a caution-required place based on the rapid deceleration information and mesh map data divided into a plurality of meshes in a predetermined size and a predetermined number of divisions. Therefore, it is possible to improve the extraction accuracy in extracting the caution-required place in the driving assistance system.

According to the aspect of (10) described above, the program can extract rapid deceleration information including the traveling direction and the location of the vehicle when a rapid deceleration event has occurred based on the vehicle speed information including at least a speed, acceleration, and deceleration that is collected from the actual vehicle, and estimate a caution-required place based on the rapid deceleration information and mesh map data divided into a plurality of meshes in a predetermined size and a predetermined number of divisions. Therefore, it is possible to improve the extraction accuracy in extracting the caution-required place in the driving assistance system.

Thus, according to the aspects of the present invention, it is possible to improve the extraction accuracy in extracting the driving assistance place in the driving assistance system.

DESCRIPTION OF EMBODIMENTS

First Embodiment

Hereinafter, a first embodiment of the present invention will be described in detail with reference to the accompanying diagrams.

Figure 1:
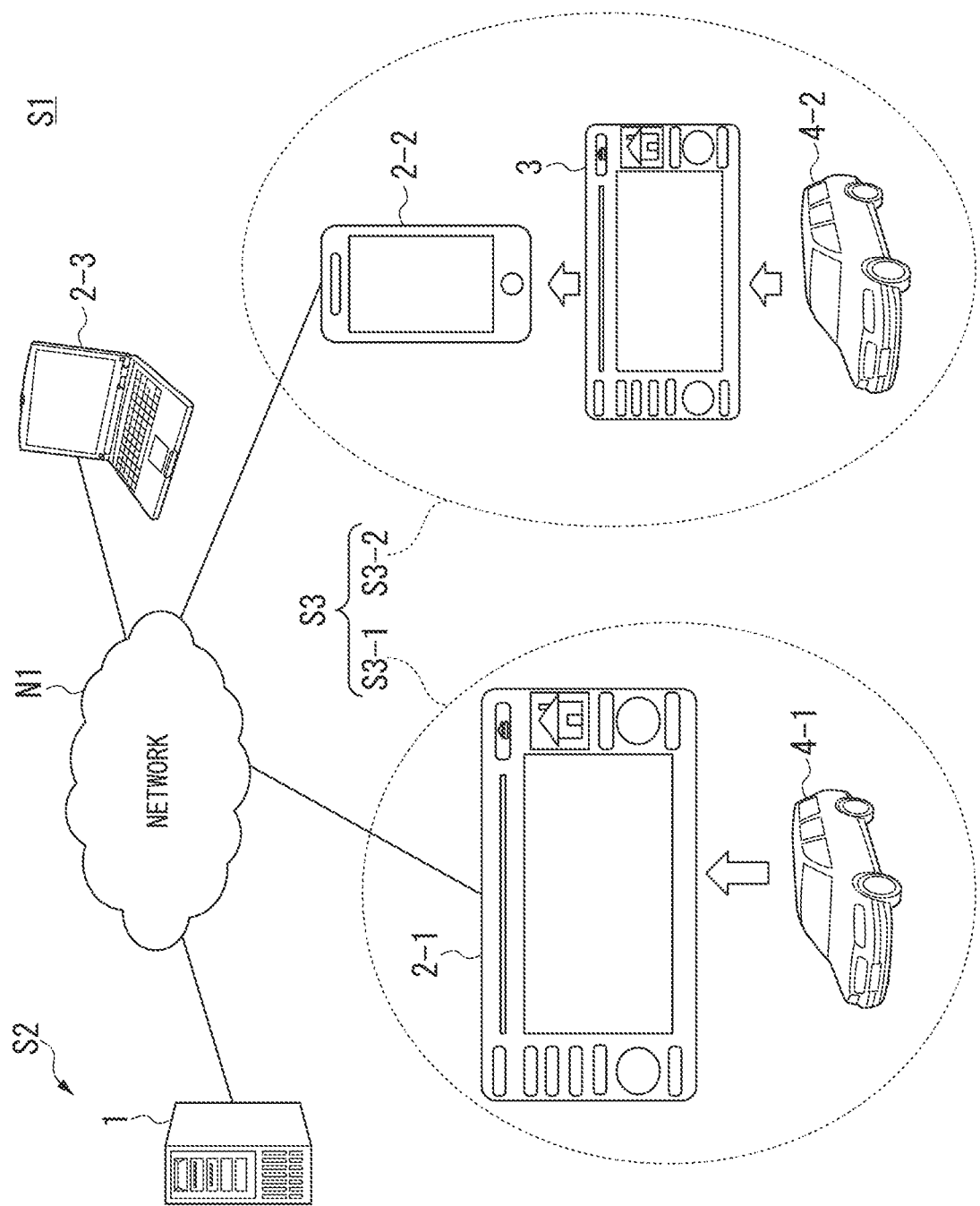
FIG. 1 is a schematic diagram showing an example of the configuration of a driving assistance system according to a first embodiment of the present invention.

FIG. 1 is a schematic diagram showing an example of the configuration of a driving assistance system S1 according to the first embodiment of the present invention.

The driving assistance system S1 includes a navigation information collection system S2 and a navigation system S3.

The navigation information collection system S2 includes a navigation information collection device 1, and generates driving assistance place information (hereinafter, may also be referred to as caution-required place information) including a driving assistance place that the navigation system S3 provides for a vehicle.

Here, the driving assistance place is a place where it is predicted that assistance is required when a vehicle travels through a certain point, and a caution-required place that requires caution when a vehicle travels through a certain point is included. For example, an intersection where rapid deceleration occurs frequently, that is, a frequent sudden braking intersection is included in the caution-required place.

The navigation system S3 includes navigation systems S3-1 and S3-2.

In the navigation system S3-1, for example, an electronic device 2-1 (for example, an in-vehicle terminal device including communication means connectable to a network N1) mounted in a vehicle 4-1 collects vehicle control information, such as the speed of the vehicle 4-1, acceleration when the vehicle 4-1 accelerates, deceleration when the vehicle 4-1 decelerates, engine speed, and a brake state, and location information (for example, latitude and longitude), and transmits the collected information to the navigation information collection system S2 through the network N1. When driving assistance place information is received, the navigation system S3-1 performs the driving assistance of the vehicle 4-1 for the driver based on the driving assistance place information.

In the navigation system S3-2, for example, an electronic device 2-2 (for example, a smartphone) mounted in a vehicle 4-2 collects vehicle control information, such as the speed, acceleration, deceleration, engine speed, and brake state of the vehicle 4-2, and location information (for example, latitude and longitude) through an in-vehicle terminal device 3 that does not include communication means connectable to the network N1, and transmits the collected information to the navigation information collection system S2 through the network N1. When driving assistance place information is received, the navigation system S3-2 performs the driving assistance of the vehicle 4-2 for the driver based on the driving assistance place information.

Here, the communication between the electronic device 2-1 or the electronic device 2-2 and the navigation information collection system S2 is realized by performing wireless communication with a base station apparatus (not shown) in the network N1, and by the communication of the base station apparatus and the navigation information collection device 1 through a cable or in a wireless manner.

The driving assistance system S1 may include an electronic device 2-3 (for example, a personal computer). The electronic device 2-3 can communicate with the navigation information collection device 1 by a cable or wirelessly through the network N1, and can display the driving assistance place information and an evaluation result obtained after driving the vehicle based on the driving assistance place information, which will be described later. In addition, the user of the electronic device 2-3 can post an impression, a comment or the like after actually driving the vehicle based on the driving assistance place information using the electronic device 2-3, as word-of-mouth information, to the social media service.

The network N1 includes a base station apparatus that communicates with a mobile station apparatus, a relay apparatus for relaying communication between the base station apparatus and another base station apparatus, a network management apparatus, a home base station apparatus, and the like.

In the following explanation, a system which connects the in-vehicle terminal device 3, which does not include communication means connectable to the network N1, the electronic devices 2-1 and 2-3, and the electronic device 2-2 in a wired or wireless manner, is referred to collectively as an electronic device 2. In addition, the vehicles 4-1 and 4-2 are referred to collectively as a vehicle 4.

Figure 2:
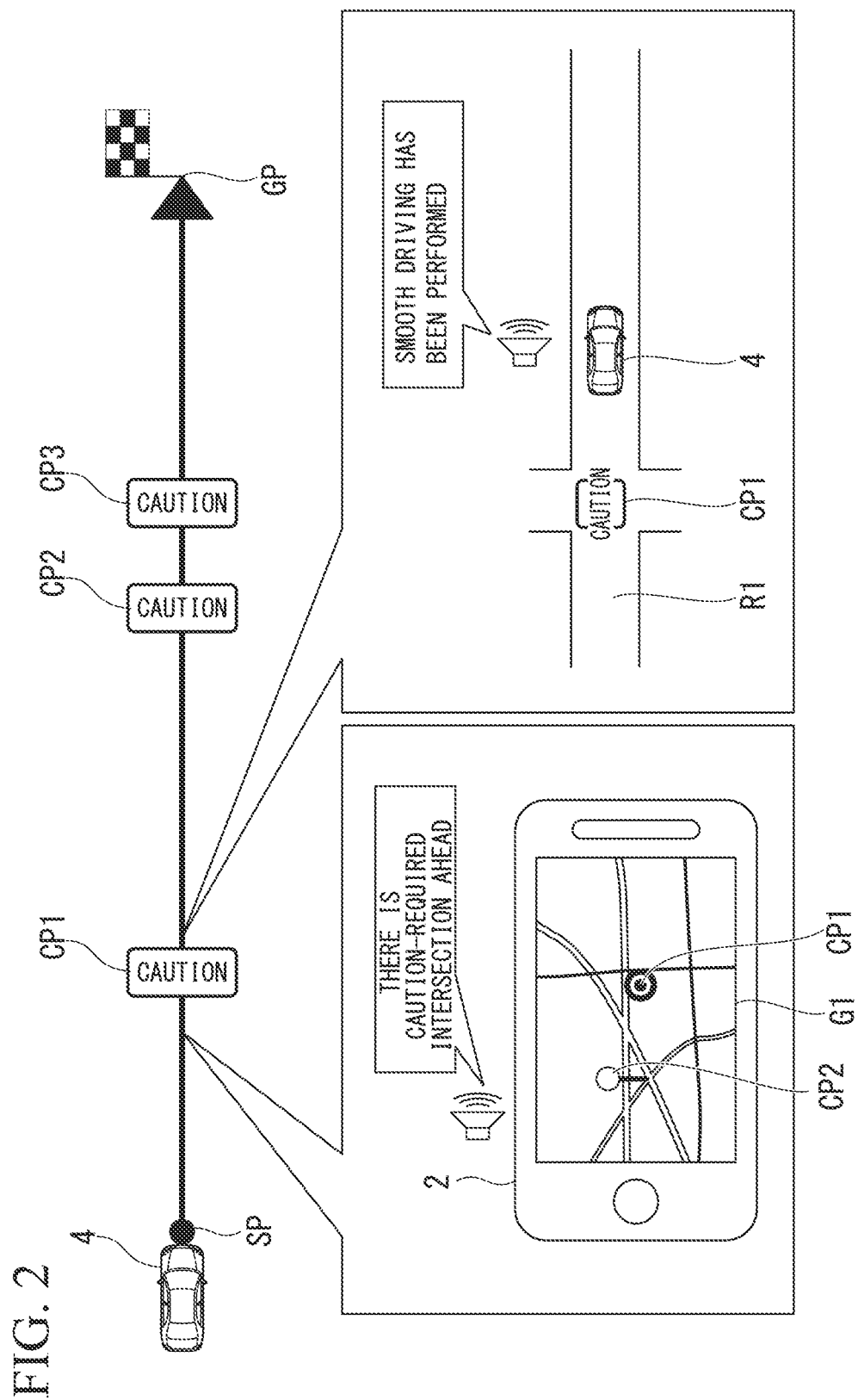
FIG. 2 is a diagram for explaining an example of usage of the driving assistance system according to the present embodiment.

FIG. 2 is a diagram for explaining an example of usage of the driving assistance system S1 according to the present embodiment.

When the driver drives the vehicle 4 toward a destination point GP from a starting point S1, a plurality of (for example, three) caution-required places CP1, CP2, and CP3 based on the driving assistance place information, for which it is expected and determined that caution is required for traveling, are present on the travel path of the vehicle 4 from the starting point SP to the destination point GP.

For example, when the vehicle 4 approaches the caution-required place CP1, the electronic device 2 notifies the driver of the vehicle 4 of the caution-required place CP1 by displaying an image G1, such as a map or a schematic road view, on the display device of the electronic device 2, or displaying a sign or graphics on the caution-required place CP1, or outputting "there is a caution-required intersection ahead" by voice.

In addition, for example, immediately after the vehicle 4 has passed through the caution-required place CP1 appropriately (safely), the electronic device 2 evaluates the traveling state of the vehicle 4 at the caution-required place CP1, notifies the driver of the vehicle 4 that "smooth driving has been performed" by voice, and feeds back the evaluation of the traveling state with respect to the caution-required place CP1. Also for the caution-required places CP2 and CP3, the electronic device 2 notifies the driver of the vehicle 4 of the traveling of the caution-required place and an evaluation result according to the traveling state in the caution-required place in the same manner as when the vehicle passes through the caution-required place CP1.

Figure 3:
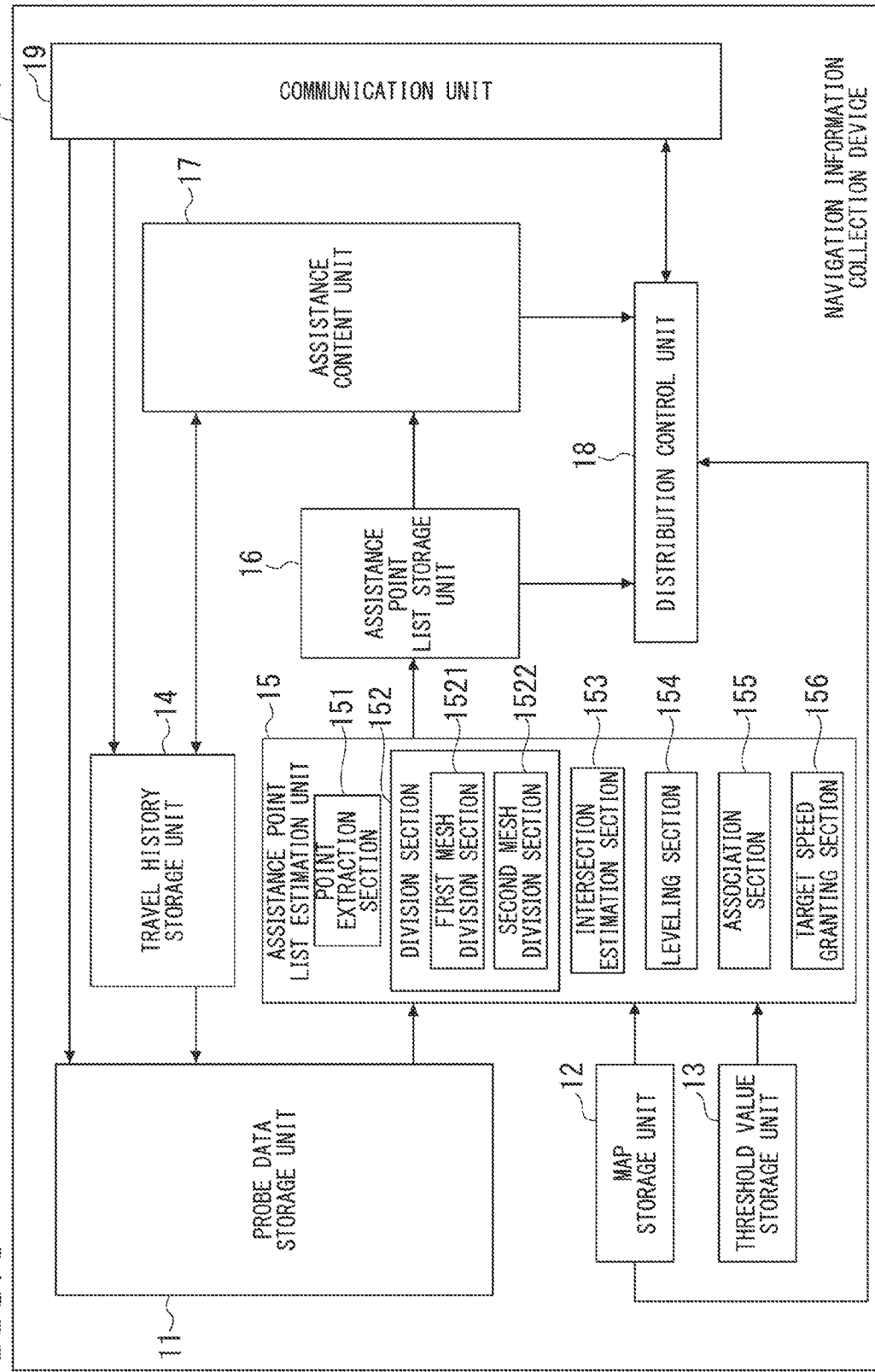
FIG. 3 is a schematic block diagram showing an example of the configuration of a navigation information collection device according to the present embodiment.

FIG. 3 is a schematic block diagram showing an example of the configuration of the navigation information collection device 1 according to the present embodiment.

The navigation information collection device 1 includes a probe data storage unit 11, a map storage unit 12, a threshold value storage unit 13, a travel history storage unit (personal history storage unit) 14, an assistance point list estimation unit 15, an assistance point list storage unit 16, an assistance content unit 17, a distribution control unit 18, and a communication unit 19.

The assistance point list estimation unit 15 includes a point extraction section 151 (extraction section), a division section 152, an intersection estimation section 153 (estimation section), a leveling section 154, an association section 155, and a target speed granting section 156. The division section 152 includes a first mesh division section 1521 and a second mesh division section 1522.

The probe data storage unit 11 stores probe data including location information uploaded by a plurality of vehicles, time information when a vehicle is present in the location information, vehicle speed information when traveling through the point indicated by the location information, travel path information from the starting point to the destination point, and the like.

The probe data is accumulated for a predetermined period of time. In the speed information, acceleration information when a vehicle accelerates, deceleration information when a vehicle decelerates, stop time information such as a vehicle stop time, and the like are included for each vehicle.

The map storage unit 12 stores map data. In the map data, for example, road coordinate data indicating the location coordinates on the road that are required for the processing of map matching based on the current location of the electronic device 2 and road map data required for the calculation of the guidance path (for example, a node, a plurality of links where the location and the orientation are associated with each other, link cost, road shape and road type, and traffic signal information indicating the presence or absence of a traffic signal at each intersection) are included. The node is a coordinate point including the latitude and longitude of a predetermined point on the road, such as an intersection and a branching point. The link is a line connecting between the nodes, and is a road section that connects between the nodes. The link cost is information indicating the distance of the road section corresponding to the link or the time required for the movement of the road section.

The threshold value storage unit 13 stores a threshold value regarding the extraction accuracy of a caution-required place when the intersection estimation section 153 to be described later notifies the driver of the caution-required place.

The travel history storage unit 14 stores the travel history of each vehicle including the vehicle 4, for example. Travel path information, location information, time information, vehicle speed information, and the like are included in the travel history. Assuming that one trip is from one starting point to the destination point, the travel history storage unit 14 stores the travel history of the one trip. The travel history storage unit 14 uploads the travel history in the probe data storage unit 11.

The point extraction section 151 reads probe data from the probe data storage unit 11 and extracts, from the probe data, rapid deceleration information including the occurrence location (first location) of a rapid deceleration event corresponding to predetermined conditions (for example, vehicle speed information is deceleration equal to or greater than the threshold value) and a traveling direction of the vehicle when the rapid deceleration event has occurred. The point extraction section 151 outputs the extracted rapid deceleration information to the intersection estimation section 153.

The division section 152 reads the map data from the map storage unit 12 and divides the map data into a plurality of block-shaped meshes in a predetermined size and a predetermined number of divisions, thereby generating mesh map data.

Specifically, the first mesh division section 1521 generates first mesh map data by dividing a predetermined range of map data into block-shaped meshes, for example, eight equal parts in each of the latitude and longitude directions. The first mesh division section 1521 outputs the generated first mesh map data to the second mesh division section 1522 and the intersection estimation section.

The second mesh division section 1522 generates second mesh map data by dividing one mesh in the first mesh map data into, for example, nine meshes. The second mesh division section 1522 outputs the generated second mesh map data to the intersection estimation section 153.

The intersection estimation section 153 applies the number of vehicles, which have caused the rapid deceleration event included in the rapid deceleration information input from the point extraction section 151, to the first mesh map data input from the first mesh division section 1521, and counts the number as a traffic volume in the mesh for each mesh of the first mesh map data. The intersection estimation section 153 counts the number of occurrence points of rapid deceleration included in the rapid deceleration information, as a rapid deceleration number, for each mesh in the first mesh map data.

The intersection estimation section 153 calculates a rapid deceleration probability from the traffic volume and the rapid deceleration number for each mesh in the first mesh map data, and estimates a mesh having the rapid deceleration probability of, for example, 50% or more as a mesh in which rapid deceleration occurs frequently.

The intersection estimation section 153 applies the number of occurrence points of rapid deceleration included in the rapid deceleration information input from the point extraction section 151, to the second mesh map data input from the second mesh division section 1522, and counts the number as a rapid deceleration number for each mesh of the second mesh map data. When the rapid deceleration number counted in a certain mesh in the second mesh map data is, for example, 80% or more of the total rapid deceleration number counted in the corresponding first mesh map data, the intersection estimation section 153 estimates second mesh map data including the mesh of the second mesh map data as a candidate mesh.

Then, in the estimated candidate mesh, the intersection estimation section 153 estimates an orientation in which the number of rapid deceleration events is the largest, for example, among eight orientations of north, northeast, east, southeast, south, southwest, west, and northwest, as the rapid deceleration orientation. Then, for the estimated candidate mesh, the intersection estimation section 153 extracts, for example, an intersection based on the rapid deceleration orientation of the candidate mesh. By referring to the traffic signal information of the extracted intersection, the intersection estimation section 153 excludes the candidate mesh from the driving assistance place when the traffic signal information is traffic signal information indicating that there is a traffic signal.

For the candidate mesh that is not excluded, the intersection estimation section 153 estimates an intersection closest to the center point of a mesh where the candidate mesh is present, among the plurality of front meshes (for example, nine meshes) in the direction of the rapid deceleration orientation, as a frequent sudden braking intersection, and extracts the location coordinates of the intersection (refer to FIGS. 5, 6, and 7 to be described later). In addition, when the intersection of the traffic signal information indicating that there is no traffic signal is not present in the plurality of front meshes, the intersection estimation section 153 does not estimate the candidate mesh as a frequent sudden braking intersection. The intersection estimation section 153 outputs the estimated frequent sudden braking intersection to the leveling section 154, the association section 155, and the target speed granting section 156.

By referring to the probe data stored in the probe data storage unit 11, the leveling section 154 levels one or both of the probe data and the frequent sudden braking intersection estimated by the intersection estimation section 153 in a predetermined period of time, day, month, season, or year, for example.

The association section 155 associates the number of links and the orientation of each link at the frequent sudden braking intersection estimated by the intersection estimation section 153, as coordinates, with the map data with reference to the map data read from the map storage unit 12, and stores the result in the assistance point list storage unit 16. Then, the association section 155 calculates an average actual vehicle speed at the frequent sudden braking intersection based on the probe data read from the probe data storage unit 11, and associates the average actual vehicle speed with the frequent sudden braking intersection. In addition, the association section 155 may associate the calculated average actual speed with the frequent sudden braking intersection as a target speed. Here, the average actual vehicle speed is an average traveling speed at a certain point (for example, a frequent sudden braking intersection) based on the probe data stored in the probe data storage unit 11.

The average actual vehicle speed is used as a threshold value for traveling notification of caution-required place, which will be described later, in the electronic device 2 that actually performs driving assistance or as a threshold value for determining the extraction accuracy in the extraction of a caution-required place. Therefore, a case where the vehicle 4 travels appropriately along the specific flow of the road, for example, according to the specific vehicle speed of the road, can be excluded from the traveling notification of caution-required place. In addition, a point when the vehicle 4 travels appropriately along the specific flow of the road, for example, according to the specific vehicle speed of the road, can be excluded from the caution-required place extraction target.

The target speed granting section 156 grants a target speed as a target to pass safely through the frequent sudden braking intersection, which is calculated for each link at the frequent sudden braking intersection, to the frequent sudden braking intersection estimated by the intersection estimation section 153 based on the probe data and the map data read from the probe data storage unit 11 and the map storage unit 12. The target speed granting section 156 stores frequent sudden braking intersection information, which indicates the frequent sudden braking intersection to which the target speed has been granted, in the assistance point list storage unit 16.

The assistance point list storage unit 16 stores, as an assistance point list, some of the map data including the caution-required place information and the target speed in the caution-required place. Specifically, the assistance point list storage unit 16 stores an assistance point list obtained by associating the number of links and the orientation of each link at the frequent sudden braking intersection (caution-required place) estimated by the intersection estimation section 153, as coordinates, with the map data.

In addition, the assistance point list storage unit 16 stores the frequent sudden braking intersection information indicating the frequent sudden braking intersection to which the target speed has been granted by the target speed granting section 156.

Although the map data is held in the navigation information collection device 1 in the above explanation, the map data may also be held in the electronic device 2.

The assistance content unit 17 manages software for executing an application for performing driving assistance in the electronic device 2, data generation for the application, and the like. In order to perform an overall evaluation when driving the vehicle 4, the assistance content unit 17 reads the travel history and the assistance point list from the travel history storage unit 14 and the assistance point list storage unit 16, and counts the evaluations based on the vehicle speed information such as acceleration, deceleration, and low speed time included in the travel history. The assistance content unit 17 stores the counted evaluation result in the travel history storage unit 14, and outputs the counted evaluation result to the distribution control unit 18. In addition, the assistance content unit 17 outputs content information, such as an application or software for executing the application, to the distribution control unit 18. In addition, the low speed time also includes a stop time for which the vehicle 4 is stopped.

The distribution control unit 18 controls the distribution of an application managed by the assistance content unit 17. In addition, the distribution control unit 18 performs control to read the assistance point list from the assistance point list storage unit 16 based on the instruction signal from the electronic device 2 and to distribute the assistance point list to the electronic device 2. The distribution control unit 18 performs control to distribute the assistance point list and the content information to the electronic device 2 through the communication unit 19 and the network N1. In addition, the distribution control unit 18 performs control to read the map data from the map storage unit 12 based on the instruction signal from the electronic device 2 and to distribute a predetermined range of map data including the current location of the vehicle 4 to the electronic device 2 through the communication unit 19 and the network N1.

The communication unit 19 communicates with the electronic device 2. The communication unit 19 performs communication processing, such as encoding/decoding of data, modulation/demodulation of data, analog to digital (AD)/digital to analog (DA) conversion, frequency conversion, and transmission and reception of data signals using radio waves. The communication unit 19 is connected to the network N1 through a cable or wirelessly.

Figure 4:
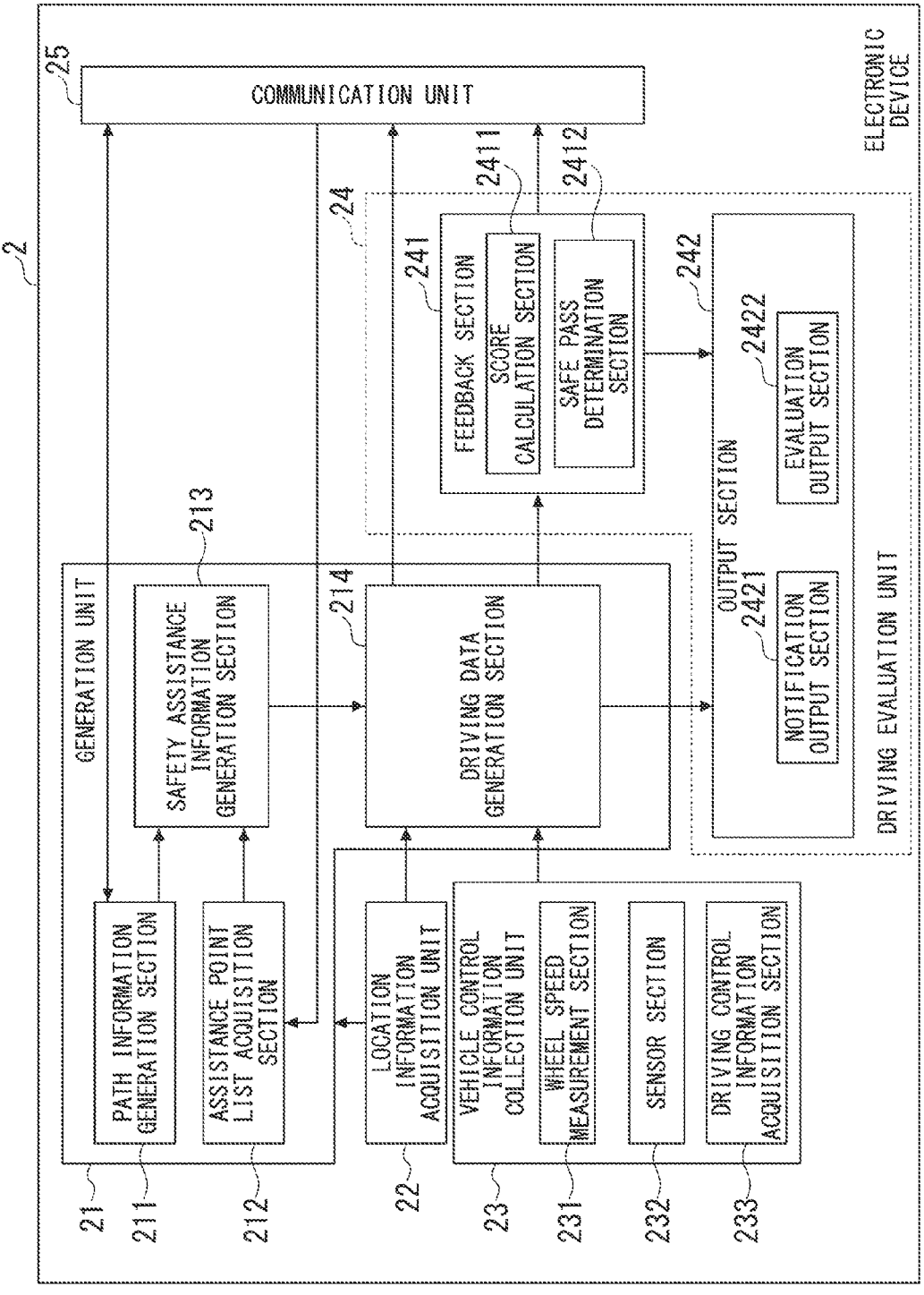
FIG. 4 is a schematic block diagram showing an example of the configuration of an electronic device according to the present embodiment.

FIG. 4 is a schematic block diagram showing an example of the configuration of the electronic device 2 according to the present embodiment.

The electronic device 2 is an electronic device including a display unit, such as a personal computer, a smartphone, an in-vehicle terminal device including communication means connectable to the network N1, and a combination of an in-vehicle terminal device including no communication means connectable to the network N1 and a personal computer or a smartphone.

In the following explanation, a combination of a smartphone temporarily mounted in the vehicle 4 and an in-vehicle terminal device including no communication means connectable to the network N1 will be described as an example of the electronic device 2.

The electronic device 2 includes a generation unit 21, a location information acquisition unit 22, a vehicle control information collection unit 23, a driving evaluation unit 24, and a communication unit 25. The generation unit 21 includes a path information generation section 211, an assistance point list acquisition section 212, a safety assistance information generation section 213, and a driving data generation section 214. The vehicle control information collection unit 23 includes a wheel speed measurement section 231, a sensor section 232, and a driving control information acquisition section 233. The driving evaluation unit 24 includes a feedback section 241 and an output section 242. The feedback section 241 includes a score calculation section 2411 and a safe pass determination section 2412. The output section 242 includes a notification output section 2421 and an evaluation output section 2422.

The path information generation section 211 receives an input of the starting point and the destination point. The path information generation section 211 transmits the starting point and the destination point, as point information, to the navigation information collection device 1 through the communication unit 25 and the network N1. In addition, the path information generation section 211 transmits an instruction signal for instructing the acquisition of map data including the point information to the navigation information collection device 1 through the communication unit 25 and the network N1. The path information generation section 211 acquires a predetermined range of map data including the point information from the navigation information collection device 1 through the communication unit 25 and the network N1. The path information generation section 211 generates navigation information by searching for a path from the acquired map data based on the starting point and the destination point included in the point information. The path information generation section 211 outputs the generated navigation information to the safety assistance information generation section 213.

When the starting point is the current location of the vehicle 4, it is preferable to acquire the location information from the location information acquisition unit 22 and transmit the location information, as point information including the current location and the destination point, to the navigation information collection device 1 through the communication unit 25 and the network.

The assistance point list acquisition section 212 acquires an assistance point list of a predetermined range including the point information, which has been transmitted to the navigation information collection device 1 through the communication unit 25 by the path information generation section 211, and outputs the acquired assistance point list to the safety assistance information generation section 213.

The safety assistance information generation section 213 generates driving assistance place information by associating the frequent sudden braking intersection information (hereinafter, also referred to as driving assistance place information or caution-required place information) included in the assistance point list with the map data included in the navigation information based on the navigation information input from the path information generation section 211 and the assistance point list input from the assistance point list acquisition section 212. The safety assistance information generation section 213 outputs the generated driving assistance place information to the driving data generation section 214.

The driving data generation section 214 performs driving assistance in the traveling of the vehicle 4 based on the current location of the vehicle 4 input from the location information acquisition unit 22, the vehicle control information input from the vehicle control information collection unit 23, and the driving assistance place information input from the safety assistance information generation section 213. Specifically, except for the frequent sudden braking intersection information, navigation of the travel path included in the driving assistance place information is performed. The driving data generation section 214 sets a frequent sudden braking intersection satisfying the predetermined conditions as a point for which the driver of the vehicle 4 is notified that caution is required (hereinafter, referred to as a notification target point). When the vehicle 4 approaches the notification target point, an instruction signal for instructing the traveling notification of caution-required place, which indicates that the vehicle 4 approaches the notification target point, is output to the notification output section 2421, and the notification output section 2421 is made to perform traveling notification of caution-required place.

When the vehicle 4 passes through the notification target point included in the driving assistance place information, the driving data generation section 214 outputs to the feedback section 241 vehicle control information, location information in a measurement section from a predetermined distance of the notification target point to a predetermined distance after the notification target point and notification target point information such as the location information of the notification target point and the target speed.

When a rapid deceleration event occurs during the traveling of the vehicle 4, the driving data generation section 214 transmits the vehicle control information including the location and vehicle speed information to the navigation information collection device 1 through the communication unit 25.

The location information acquisition unit 22 acquires the location information (current location) of the vehicle 4 using a global positioning system (GPS), for example.

The vehicle control information collection unit 23 collects vehicle control information. The vehicle control information collection unit 23 acquires the vehicle control information, such as the traveling speed, engine speed, brake state, and inter-vehicle distance, and failure diagnosis information, using a controller area network (CAN) used for data transfer between control devices of the vehicle connected to each other.

The wheel speed measurement section 231 measures the rotational speed of the wheels of the vehicle 4. The wheel speed measurement section 231 calculates the travel distance of the vehicle 4 from the measured rotational speed of the wheels of the vehicle 4.

The sensor section 232 includes various sensors for acquiring the vehicle control information of the vehicle 4, and measures an inter-vehicle distance between the vehicle 4 and another vehicle.

The driving control information acquisition section 233 acquires the operation information of the accelerator and the brake pedal (both not shown), brake state, engine speed, and failure diagnosis information using known techniques.

The score calculation section 2411 evaluates the traveling state of the vehicle 4 at the notification target point based on the vehicle control information input from the driving data generation section 214.

The score calculation section 2411 calculates an evaluation index (for example, a score) when the vehicle 4 travels at a traveling speed of z [km/h] or more in a measurement section from a predetermined distance x [m] before the notification target point to y [m] after the notification target point, the vehicle 4 approaches within the radius r [m] of the notification target point in the measurement section, and the traveling time in the measurement section is within t [seconds].

First, the score calculation section 2411 acquires the traveling speed [km/h] of the vehicle 4 by predetermined sampling in the measurement section. Then, the score calculation section 2411 differentiates the acquired traveling speed [km/h], and calculates acceleration [G] and deceleration [G] from the differential value. In addition, the score calculation section 2411 calculates the total time for which the acquired traveling speed [km/h] of the vehicle 4 is a traveling speed of n [km/h] or less in the measurement section.

Specifically, the score calculation section 2411 calculates the evaluation index based on, for example, the acceleration [G], the deceleration [G], and the stop or low speed time [seconds]. In this case, the score calculation section 2411 calculates a deduction rate for the acceleration when the vehicle 4 passes through the caution-required place so as to be larger than that for the deceleration when the vehicle 4 passes through the caution-required place. The score calculation section 2411 outputs information indicating the calculated evaluation index to the safe pass determination section 2412.

The safe pass determination section 2412 determines whether or not the vehicle 4 has passed through the notification target point by safe driving, from the traveling state of the vehicle 4 in the measurement section including the notification target point, when traveling through the notification target point. Specifically, the safe pass determination section 2412 determines whether or not the evaluation index included in the information indicating the evaluation index is equal to or greater than a predetermined score based on the information indicating the evaluation index input from the score calculation section 2411. When the evaluation index is equal to or greater than the predetermined score, the safe pass determination section 2412 outputs an instruction signal, which is for instructing the notification of the evaluation result to the driver of the vehicle 4, to the evaluation output section 2422, and the evaluation output section 2422 performs notification of the evaluation result. On the other hand, when the evaluation index is less than the predetermined score, the safe pass determination section 2412 outputs to the evaluation output section 2422 an instruction signal for instructing the notification of the evaluation result, which prompts the driver of the vehicle 4 to change the traveling state, to the driver of the vehicle 4, and the evaluation output section 2422 performs notification of the evaluation result.

In addition, the safe pass determination section 2412 transmits the evaluation result to the navigation information collection device 1 through the communication unit 25.

When notifying the driver of the vehicle 4 of the evaluation result, the driving evaluation unit 24 may notify the driver using one of a plurality of types of voices, or may notify the driver using a voice recorded in advance by the driver or the like. In addition, when the vehicle 4 has passed through the caution-required place multiple times in a predetermined period of time, the driving evaluation unit 24 may not perform the evaluation for the traveling state for a period set in advance. In addition, when the vehicle 4 has passed through the caution-required place a predetermined number of times or more in a predetermined period of time, the driving evaluation unit 24 may change the notification mode for notifying the driver of the vehicle 4.

The notification output section 2421 is a display device, such as a liquid crystal display, a plasma display, or an organic EL display, for example, and performs traveling notification of caution-required place by displaying information on the display device.

The evaluation output section 2422 is a voice output device, such as a speaker, for example, and notifies the driver of the vehicle 4 of the evaluation result by outputting a voice from the voice output device.

In addition, the notification output section 2421 and the evaluation output section 2422 may include one or both of a display device and a voice output device as the output section 242, and may perform traveling notification of caution-required place and notification of the evaluation result according to the traveling state when traveling through the caution-required place using one or both of display and voice.

The communication unit 25 performs communication with the navigation information collection device 1. The communication unit 25 performs communication processing, such as encoding/decoding of data, modulation/demodulation of data, AD/DA conversion, frequency conversion, and transmission and reception of data signals using radio waves. The communication unit 25 is connected to the network N through a cable or wirelessly.

Figure 5:
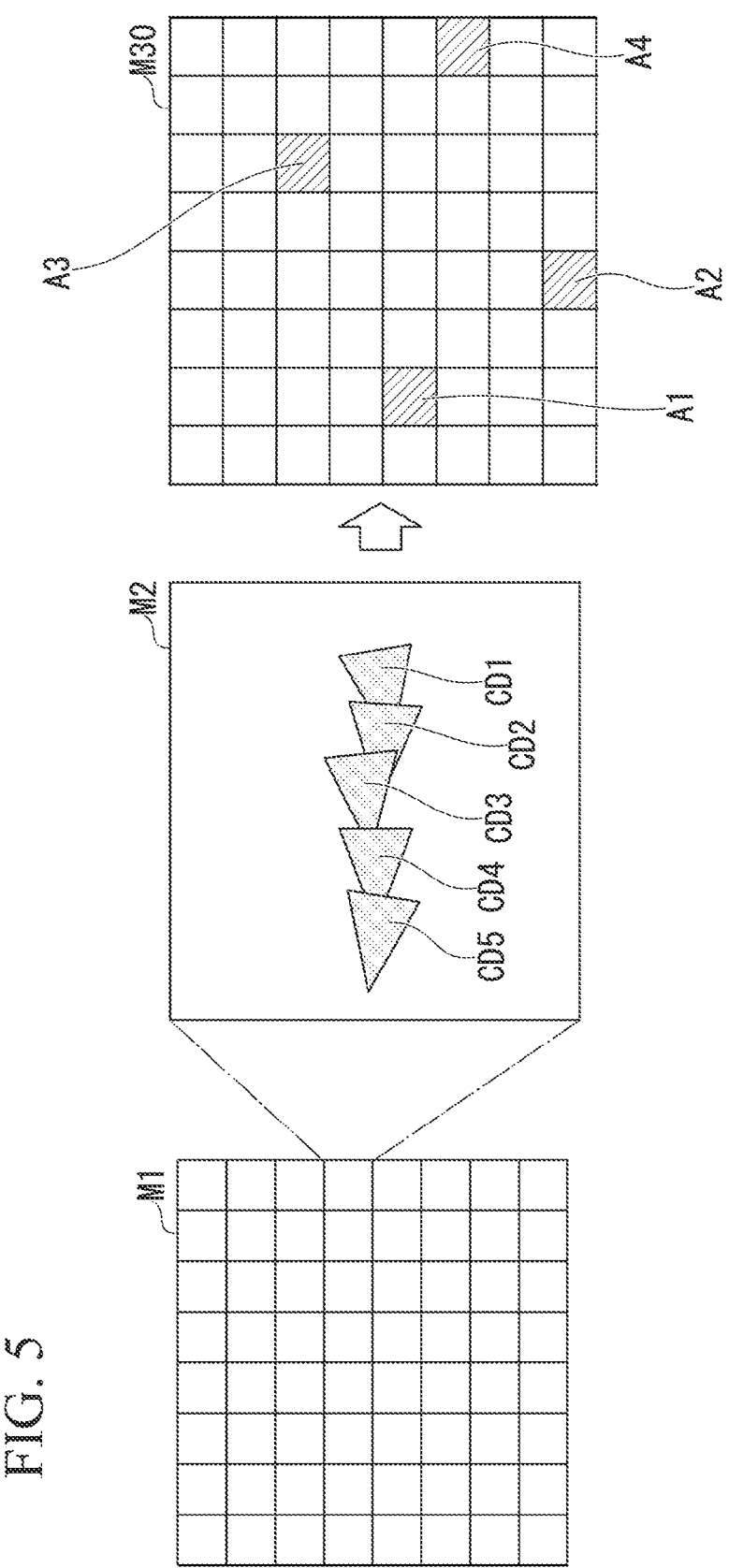
FIG. 5 is a schematic diagram showing an example of the processing of a first mesh division section and an intersection estimation section according to the present embodiment.

FIG. 5 is a schematic diagram showing an example of the processing of the first mesh division section 1521 and the intersection estimation section 153 according to the present embodiment.

First, the first mesh division section 1521 generates first mesh map data M1 by dividing a predetermined range of map data including a location where the vehicle 4 is present into block-shaped meshes in the latitude and longitude directions in a predetermined size and a predetermined number of divisions (for example, into eight parts in each of the horizontal and vertical directions).

As described above, for each mesh M2 obtained by division of the first mesh map data M1 into eight parts, the intersection estimation section 153 counts traffic volumes CD1, CD2, CD3, CD4, and CD5 in the mesh M2. In addition, the intersection estimation section 153 counts the number of occurrence points of rapid deceleration as a rapid deceleration number for each mesh M2 in the first mesh map data M1.

Then, the intersection estimation section 153 calculates a rapid deceleration probability from the traffic volume and the rapid deceleration number for each mesh M2 in the first mesh map data M1, and estimates meshes A1, A2, A3, and A4 with the rapid deceleration probability of, for example, 50% or more in first mesh map data M30 as meshes in which rapid deceleration occurs frequently.

Figure 6:
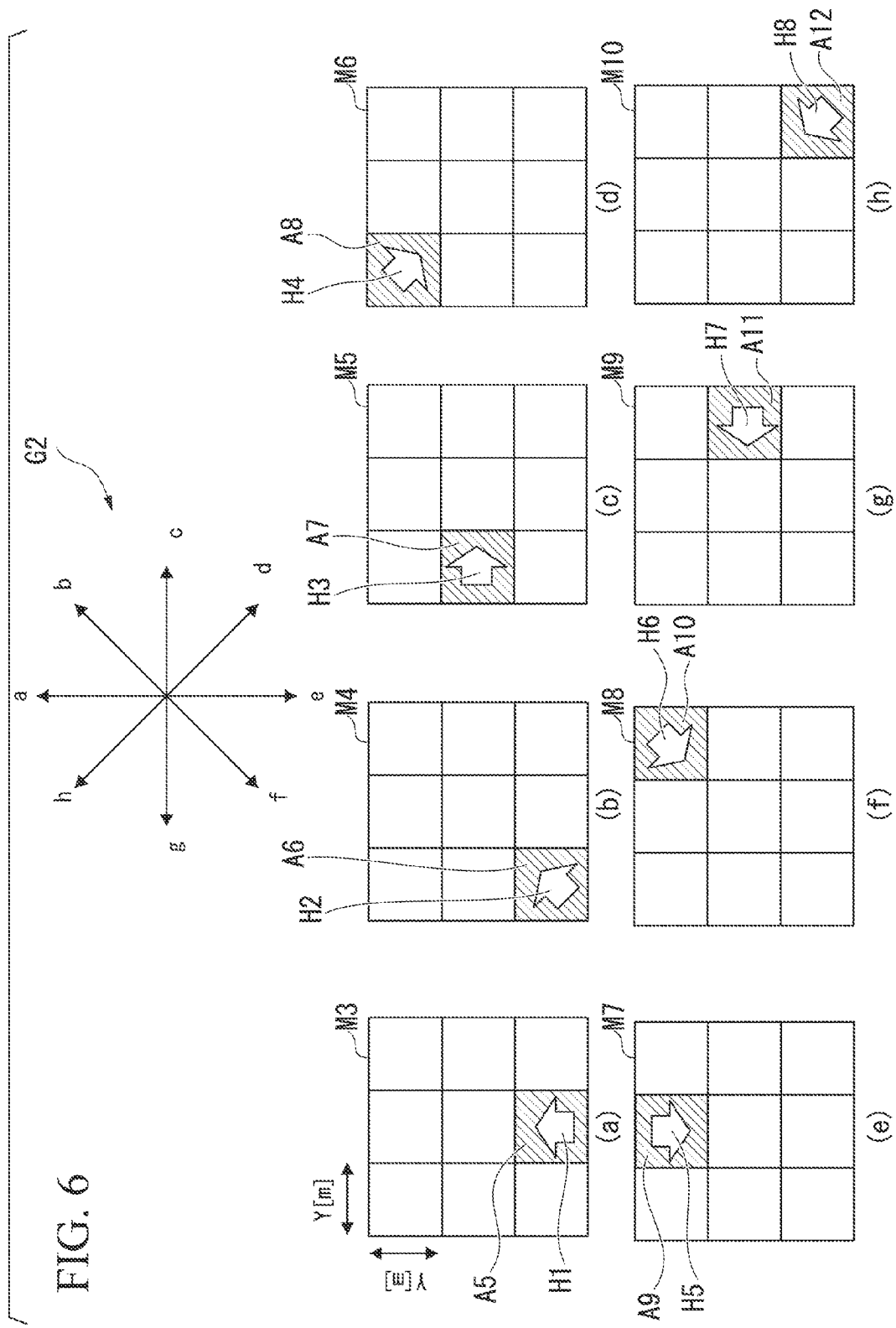
FIG. 6 is a schematic diagram showing an example of the processing of a second mesh division section and an intersection estimation section according to the present embodiment.

FIG. 6 is a schematic diagram showing an example of the processing of the second mesh division section 1522 and the intersection estimation section 153 according to the present embodiment.

The second mesh division section 1522 generates second mesh map data by dividing one mesh in the first mesh map data into, for example, a plurality of (for example, nine) meshes. The second mesh division section 1522 outputs the generated second mesh map data to the intersection estimation section 153.

The intersection estimation section 153 applies the number of occurrence points of rapid deceleration to the second mesh map data, and counts the number of occurrence points of rapid deceleration as a rapid deceleration number for each mesh of the second mesh map data. When the rapid deceleration number counted in a certain mesh in the second mesh map data is, for example, 80% or more of the total rapid deceleration number counted in the corresponding first mesh map data, the intersection estimation section 153 estimates the mesh of the second mesh map data as a candidate mesh.

Then, in the estimated candidate mesh, the intersection estimation section 153 estimates an orientation in which the number of rapid deceleration events is the largest, among eight orientations (north a, northeast b, east c, southeast d, south e, southwest f, west g, and northwest h) shown in G2 of FIG. 6, as the rapid deceleration orientation. Here, the orientations (north a, northeast b, east c, southeast d, south e, southwest f, west g, and northwest h) in G2 of FIG. 6 correspond to rapid deceleration orientations H1, H2, H3, H4, H5, H6, H7, and H8 in a plurality of front meshes (for example, nine meshes) M3, M4, M5, M6, M7, M8, M9, and M10 in FIGS. 6(a), 6(b), 6(c), 6(d), 6(e), 6(f), 6(g), and 6(h).

For the estimated candidate mesh, the intersection estimation section 153 estimates an intersection closest to the center point of a mesh where the candidate mesh is present, among the plurality of front meshes (FIGS. 6(a), 6(b), 6(c), 6(d), 6(e), 6(f). 6(g), and 6(h)) in the directions of the rapid deceleration orientations, as a frequent sudden braking intersection, and extracts the location coordinates of the intersection (refer to FIG. 7 to be described later).

Specifically, in FIG. 6(a), for a candidate mesh A5, the intersection estimation section 153 estimates an intersection closest to the center point of a mesh where the candidate mesh A5 is present, among the plurality of front meshes M3 in the direction of the rapid deceleration orientation H1, as a frequent sudden braking intersection. Here, one mesh in the plurality of front meshes M3 is Y [m] in all directions. In addition, although the rapid deceleration orientations H2, H3, H4, H5, H6, H7, and H8 and the locations of the plurality of front meshes M4, M5, M6, M7, M8, M9, and M10 where candidate meshes A6, A7, A8, A9, A10, A11, and A12 are present in FIGS. 6(b), 6(c), 6(d), 6(e). 6(f), 6(g), and 6(h) are different from those shown in FIG. 6(a), explanation thereof will be omitted since the substantial content is the same.

Figure 7:
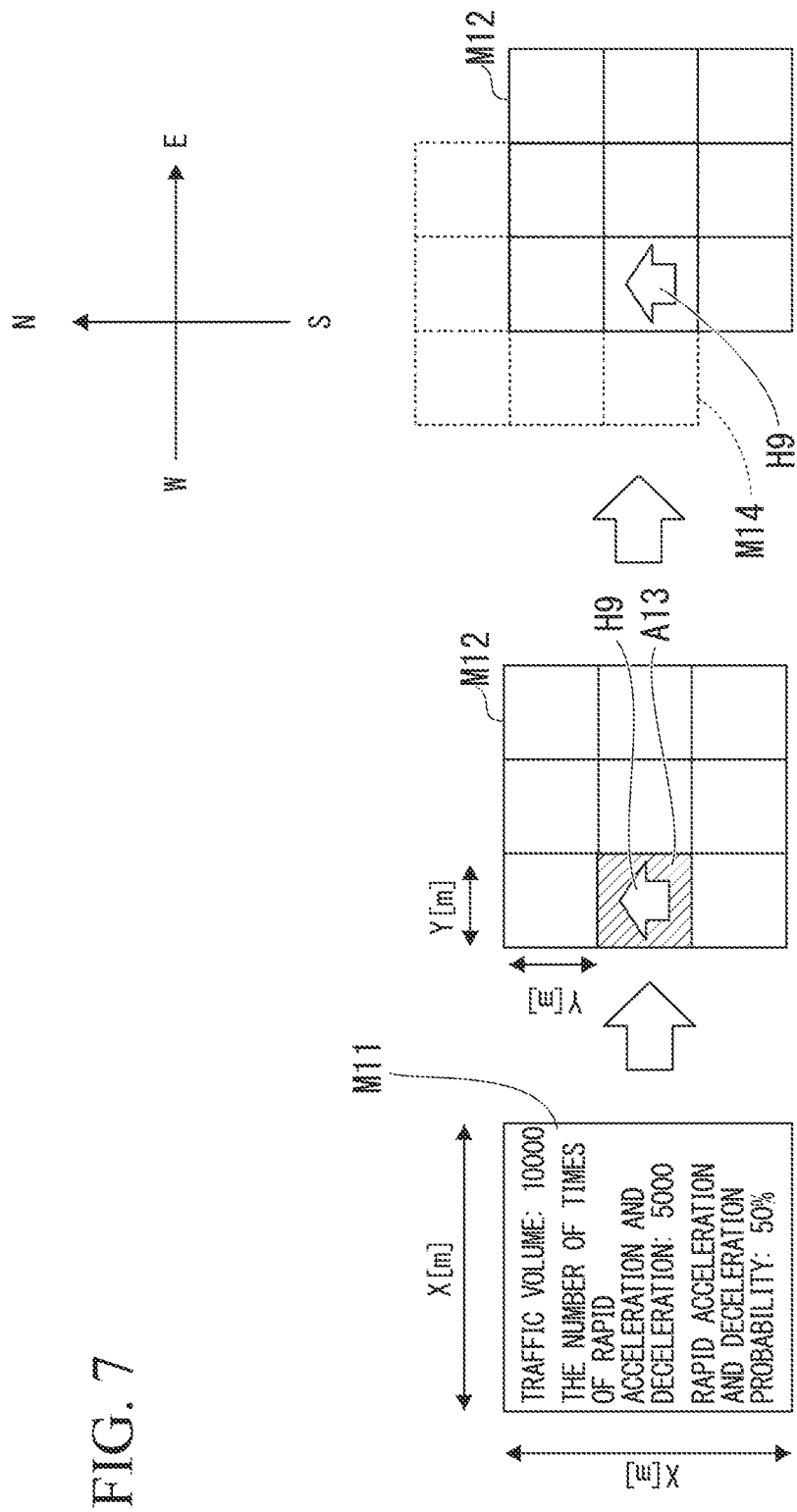
FIG. 7 is a diagram for explaining the processing of estimating a frequent sudden braking intersection by the intersection estimation section according to the present embodiment.

FIG. 7 is a diagram for explaining the processing of estimating the frequent sudden braking intersection in the intersection estimation section 153 according to the present embodiment.

The intersection estimation section 153 estimates a mesh in which rapid deceleration occurs frequently based on the threshold value of deceleration (rapid deceleration) and the threshold value of the rapid deceleration probability in the first mesh map data. Specifically, in the first mesh map data divided into a plurality of meshes M11 having a size of X [m] in all directions, for example, if the threshold value of the rapid deceleration probability is 50[%] when the traffic (traffic volume) is 10000 units and the number of times of rapid deceleration (rapid deceleration number) is 5000 (times), the intersection estimation section 153 estimates the mesh M11 in the first mesh map data as a mesh in which rapid deceleration occurs frequently.

Subsequently, when the rapid deceleration number counted in a certain mesh A13 in second mesh map data M12 included in the second mesh map data divided into a plurality of meshes having a size of Y [m] in all directions is, for example, 5 and the rapid deceleration orientation H19 is north, the intersection estimation section 153 estimates the second mesh map data M12 including the mesh A13, which occupies a proportion of 80% or more of the total rapid deceleration number counted in the mesh M11 in which rapid deceleration occurs frequently in the corresponding first mesh map data, as a candidate mesh.

Then, based on the location (first location) and the rapid deceleration direction H9 of the mesh A13 in the second mesh map data (candidate mesh) M12, the intersection estimation section 153 searches for an intersection with a front mesh M14 as an intersection search range with reference to the map data stored in the map storage unit 12. In this case, the intersection estimation section 153 sets the front mesh M14 such that a bottom center portion of the front mesh M14 having a plurality of meshes configured similarly to the second mesh map data (candidate mesh) M12 is provided at the location (first location) of the mesh A13 in which a rapid deceleration event has occurred in the second mesh map data (candidate mesh) M12, estimates an intersection closest to the center point of the front mesh M14 as a frequent sudden braking intersection, and extracts the location coordinates of the intersection. In this case, when the traffic signal information at the intersection estimated as a frequent sudden braking intersection is information indicating that a traffic signal is provided, the intersection is excluded from the frequent sudden braking intersection. When the traffic signal information at the intersection estimated as a frequent sudden braking intersection is information indicating that no traffic signal is provided, the location information (location coordinates) of the intersection is stored in the assistance point list storage unit 16.

Figure 8:
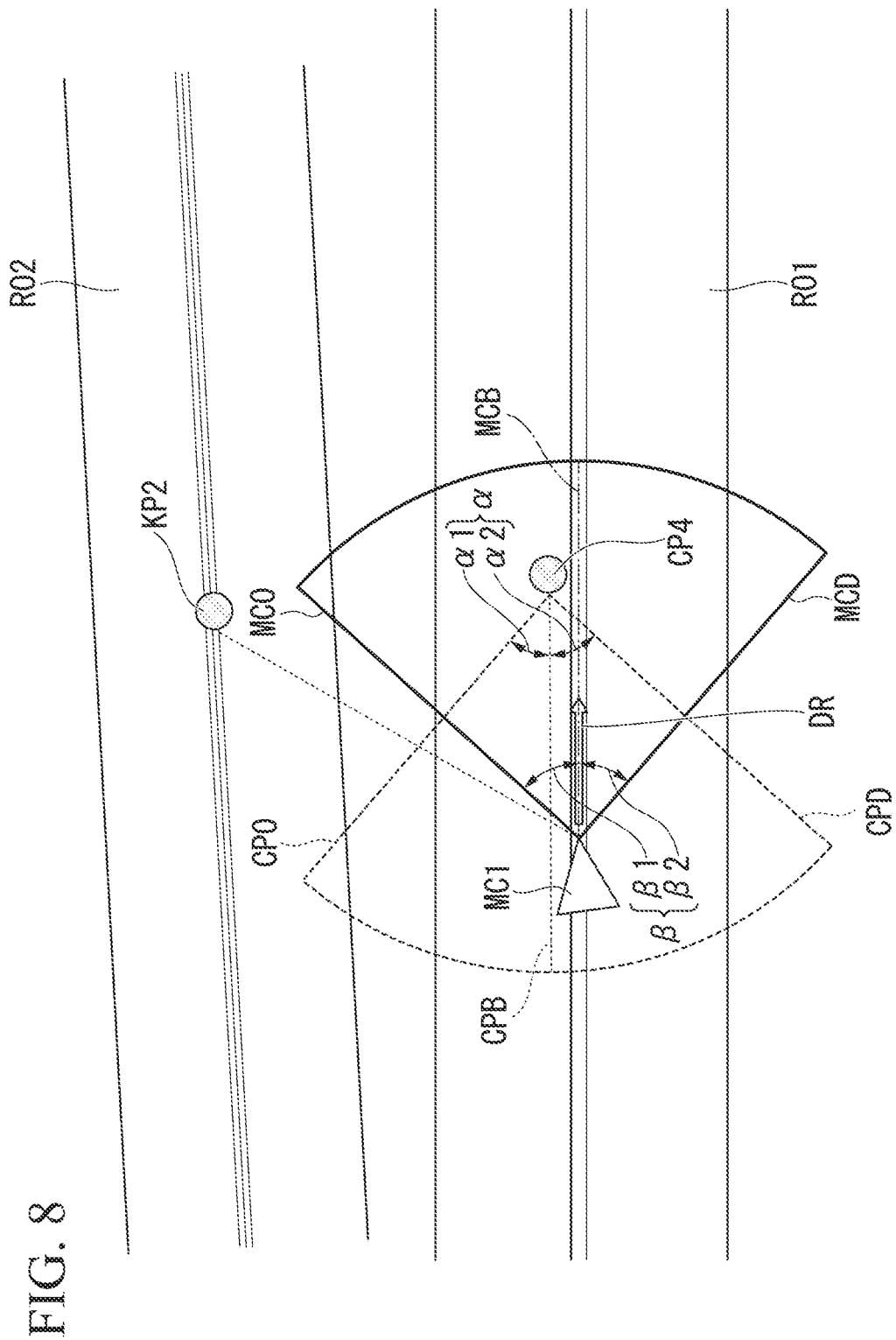
FIG. 8 is an explanatory diagram showing an example when a driving data generation section according to the present embodiment extracts a notification target point from frequent sudden braking intersections (driving assistance places, caution-required places).

FIG. 8 is an explanatory diagram showing an example when the driving data generation section 214 according to the present embodiment extracts a notification target point from frequent sudden braking intersections.

The driving data generation section 214 performs driving assistance in the traveling of the vehicle 4 based on a current location MC1 of the vehicle 4 on a road RO1, vehicle control information including vehicle speed information, and driving assistance place information.

First, a first frequent sudden braking intersection candidate extraction section of the driving data generation section 214 extracts frequent sudden braking intersections KP2 and CP4 present within a predetermined distance range (for example, a radius rr [m]) having the current location MC1 of the vehicle 4 as the center, of the plurality of frequent sudden braking intersections KP2 and CP4, as first frequent sudden braking intersection candidates.

Then, a second frequent sudden braking intersection candidate extraction section of the driving data generation section 214 extracts the frequent sudden braking intersection CP4 present within a predetermined angle when the current traveling direction DR of the vehicle 4 passing through the current location MC1 of the vehicle 4 is the central axis MCB (for example, within an angle (3 between a virtual line MCO having an angle β1 from the central axis MCB and a virtual line MCD having an angle β2 from the central axis MCB), of the plurality of frequent sudden braking intersections β2 and CP4, as a second frequent sudden braking intersection candidate.

Thus, the frequent sudden braking intersection CP4, which is extracted in common by both of the first frequent sudden braking intersection candidate extraction section and the second frequent sudden braking intersection candidate extraction section, is extracted. Then, when the current location MC1 of the vehicle 4 is present within a predetermined angle range defined by the central axis CPB and the orientation line of the link, in which it is determined that the vehicle 4 at the current location MC1 passes through the frequent sudden braking intersection CP4 by referring to the map data (for example, within an angle α between a virtual line CPO having an angle α1 from the central axis CPB and a virtual line CPD having an angle α2 from the central axis CPB), a notification target point extraction section of the driving data generation section 214 extracts the frequent sudden braking intersection CP4 as a notification target point.

The map data may be acquired from the navigation information collection device 1 as a part of the assistance point list, or the electronic device 2 or the in-vehicle terminal device may be configured to hold the map data.

Figure 9:
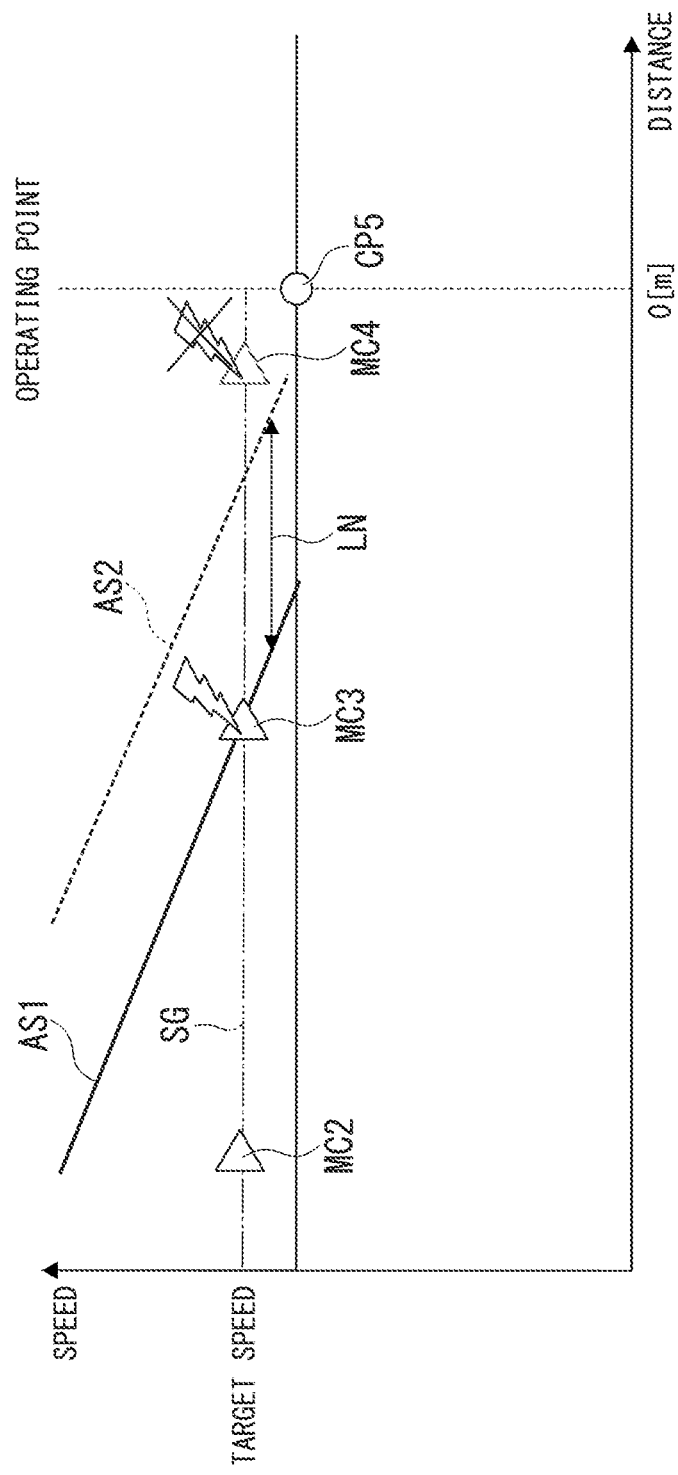
FIG. 9 is an explanatory diagram showing an example of notification determination when the driving data generation section according to the present embodiment performs notification at a notification target point.

FIG. 9 is an explanatory diagram showing an example of notification determination when the driving data generation section 214 according to the present embodiment performs notification at a notification target point.

First, to the notification target point and the link of the notification target point, a target speed calculated for each notification target point and each link of the notification target point is granted.

A distance determination section of the driving data generation section 214 determines whether or not the distance between a current location MC2 of the vehicle 4 and a notification target point CP5 is a predetermined distance or less.

Then, when the distance between the current location MC2 of the vehicle 4 and the notification target point CP5 is a predetermined distance or less, a speed determination section of the driving data generation section 214 compares the traveling speed (target speed) of the vehicle 4 with a target speed SG in the link of the notification target point CP5. When the traveling speed of the vehicle 4 is equal to or greater than the target speed, a first time determination section of the driving data generation section 214 determines whether or not the vehicle 4 will arrive at the notification target point CP5 from the current location MC2 of the vehicle 4 (or the vehicle 4 will arrive at a location MC3) within a first time threshold value if the vehicle 4 travels at a speed equal to the current traveling speed.

When the vehicle 4 arrives at the notification target point CP5 at a predetermined distance from the current location MC2 of the vehicle 4 within the first time threshold value, the second time determination section of the driving data generation section 214 determines whether or not the vehicle 4 will arrive at the notification target point CP5 from the current location MC2 of the vehicle 4 within a second time threshold value if the vehicle 4 travels at a speed equal to the current traveling speed.

When the vehicle 4 arrives at the notification target point CP5 at a predetermined distance from the current location MC2 of the vehicle 4 within the second time threshold value if the vehicle 4 travels at a speed equal to the current traveling speed, the driving data generation section 214 performs traveling notification of caution-required place at the notification target point. In this case, an operating line obtained by associating the distance and the speed to reach within the first time threshold value by the vehicle 4 is AS1, and an operating line obtained by associating the distance and the speed to reach within the second time threshold value by the vehicle 4 is AS2. In addition, the distance between the operating lines AS1 and AS2 is a notification section LN in which traveling notification of caution-required place is performed. In addition, the traveling notification of caution-required place may not be performed for the vehicle 4 that travels through the location MC4 after passing through the operating line AS2.

Figure 10:
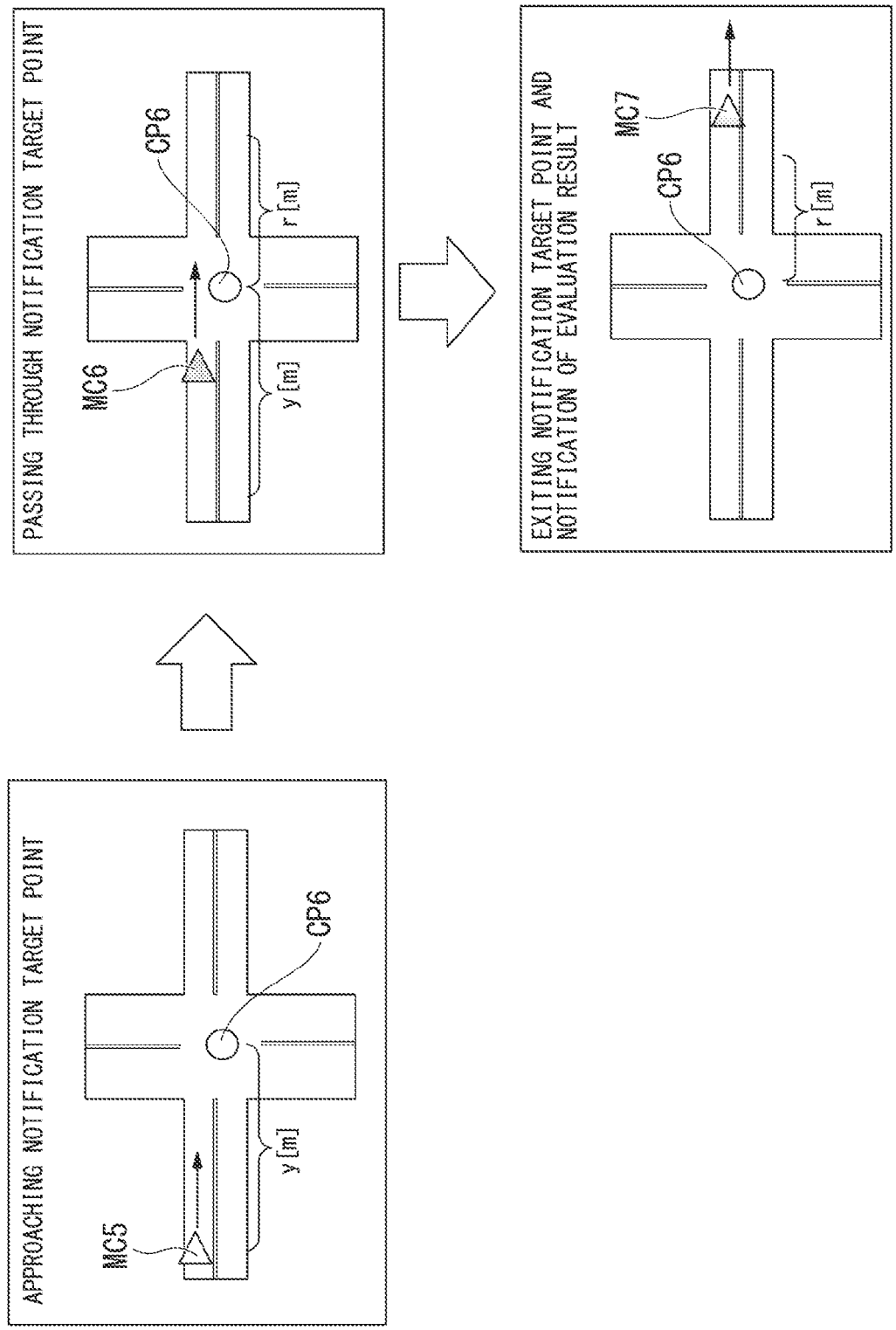
FIG. 10 is a diagram for explaining an example when a driving evaluation unit according to the present embodiment notifies a driver of a vehicle of an evaluation result.

FIG. 10 is a diagram for explaining an example when the driving evaluation unit 24 according to the present embodiment performs traveling notification of caution-required place and notifies the driver of the vehicle 4 of the evaluation result.

The distance determination section of the driving data generation section 214 determines whether or not the distance between a current location MC5 of the vehicle 4 and a notification target point CP6 is a predetermined distance y [m] or less. When the distance between the current location MC5 of the vehicle 4 and the notification target point CP6 is a predetermined distance or less, the traveling speed (target speed) of the vehicle 4 is compared with a target speed in the link of the notification target point CP6. When the traveling speed of the vehicle 4 is equal to or greater than the target speed, the first time determination section of the driving data generation section 214 determines whether or not the vehicle 4 will arrive at the notification target point CP6 from the current location MC5 of the vehicle 4 within the first time threshold value if the vehicle 4 travels at a speed equal to the current traveling speed.

When the vehicle 4 arrives at the notification target point CP6 at a predetermined distance from the current location MC5 of the vehicle 4 within the first time threshold value, the second time determination section of the driving data generation section 214 determines whether or not the vehicle 4 will arrive at the notification target point CP6 from the current location MC5 of the vehicle 4 within the second time threshold value if the vehicle 4 travels at a speed equal to the current traveling speed.

When the vehicle 4 arrives at the notification target point CP6 at the predetermined distance y [m] from the current location MC5 of the vehicle 4 within the second time threshold value if the vehicle 4 travels at a speed equal to the current traveling speed, the driving data generation section 214 performs traveling notification of caution-required place at the predetermined distance y [m] from the notification target point CP6.

The safe pass determination section 2412 determines whether or not the vehicle 4 has passed through the notification target point by safe driving, from the traveling state of the vehicle 4 in the caution-required place, when the vehicle 4 travels through the notification target point. Immediately after the vehicle 4 has passed through the notification target point, the driving evaluation unit 24 evaluates the traveling state of the vehicle 4 at the notification target point according to the determination result of the safe pass determination section 2412, and notifies the driver of the vehicle 4 of the evaluation result.

Specifically, the vehicle 4 travels through the locations MC5, MC6, and MC7, approaches the notification target point CP6, and passes through the notification target point CP6. In this case, when the vehicle 4 travels through the location MC5 at the distance y [m] that is a predetermined range for performing traveling notification of caution-required place for the notification target point CP6, the driving data generation section 214 performs the traveling notification of caution-required place for notifying that the vehicle 4 approaches the caution-required place.

The vehicle 4 travels through the locations MC5, MC6, and MC7 in this order and arrives at a location at the distance y [m] that is a predetermined range, and then arrives at a location at a distance r [m] that is a predetermined range after a notification target point and passes through a location at the distance r [m] that is the predetermined range after the notification target point.

When the vehicle 4 has exited a point of the predetermined range distance r [m] which is further beyond the notification target point, the driving evaluation unit 24 evaluates a traveling state when the vehicle 4 travels through the notification target point CP6. In other words, immediately after the vehicle 4 has exited the point of the predetermined range distance r [m], that is, when the vehicle 4 has traveled through the location MC7, the driver of the vehicle 4 is notified of the evaluation result.

Figure 11:
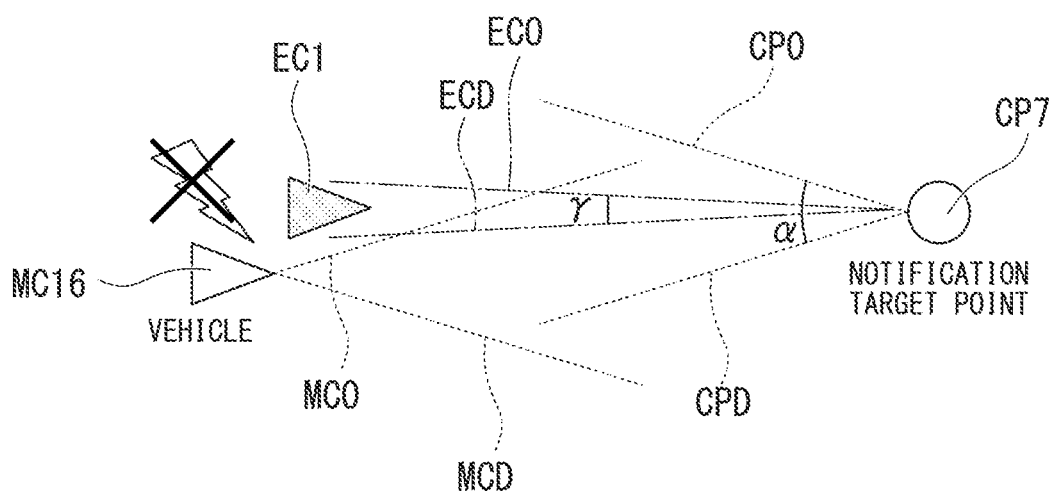
FIG. 11 is an explanatory diagram showing an example of malfunction suppression determination performed at the notification target point by the driving data generation section according to the present embodiment.

FIG. 11 is an explanatory diagram showing an example of malfunction suppression determination at a notification target point performed by the driving data generation section 214 according to the present embodiment.

In order to suppress the malfunction of traveling notification of caution-required place on roads located in parallel and adjacent to each other, the driving data generation section 214 sets an allowed operating angle range γ at the notification target point by setting the rapid deceleration orientation, in which a rapid deceleration event has occurred, as a center, and determines whether or not the vehicle 4 is present in the allowed operating angle range γ. When the vehicle 4 is present in the allowed operating angle range γ, traveling notification of caution-required place may be performed. In this case, for example, when the vehicle 4 travels through the location MC16, the driving data generation section 214 does not perform the traveling notification of caution-required place for the vehicle 4 traveling through the location MC16, since the vehicle 4 is not present in the allowed operating angle range γ.

Here, the allowed operating angle range γ is an angle range narrower than the predetermined angle range α in FIG. 8.

On the other hand, when the vehicle 4 travels through a location EC1, the vehicle 4 is present within the allowed operating angle range of a notification target point CP7. Therefore, it is preferable that the driving data generation section 214 performs traveling notification of caution-required place for the vehicle 4 which is traveling through the location EC1.

In addition, in order to suppress the malfunction on a road located in parallel to an elevated construction and under the elevated construction, the driving data generation section 214 may not perform traveling notification of caution-required place when the minimum speed of the vehicle 4 exceeds a certain speed within the past predetermined period of time.

Figure 12:
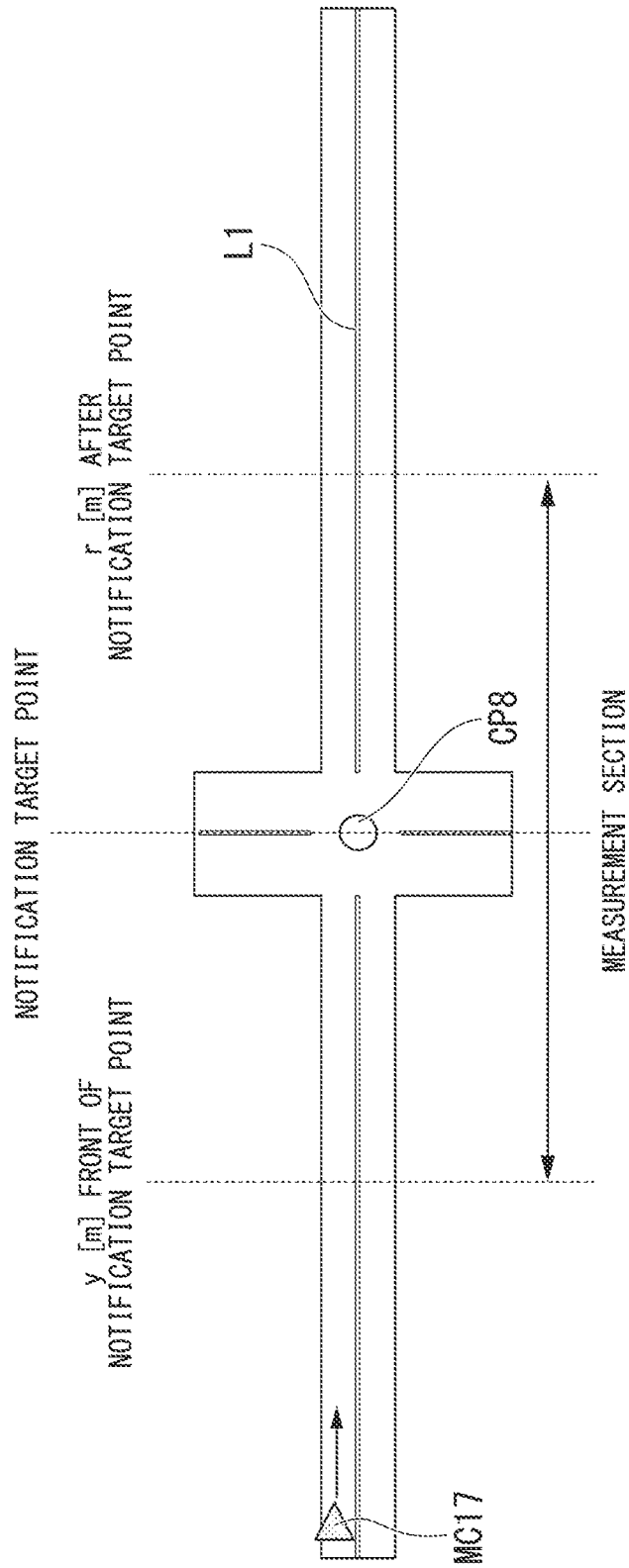
FIG. 12 is a diagram for explaining an example when the driving evaluation unit according to the present embodiment performs evaluation based on the traveling state of a vehicle.

FIG. 12 is a diagram for explaining an example when the driving evaluation unit 24 according to the present embodiment performs evaluation based on the traveling state of the vehicle 4.

When the vehicle 4 travels through a location MC17 and is about to travel through a notification target point CP8, a section from a point at a distance y [m] in front of the notification target point CP8 to a point at a distance r [m] after the notification target point CP8 when the notification target point CP8 is viewed from the vehicle 4 in a path L1 along, on which the vehicle 4 travels, is a measurement section.

In this measurement section, the driving evaluation unit 24 evaluates the traveling state based on the traveling state (acceleration, deceleration, low speed time, or stop time) of the vehicle 4.

Figure 13:
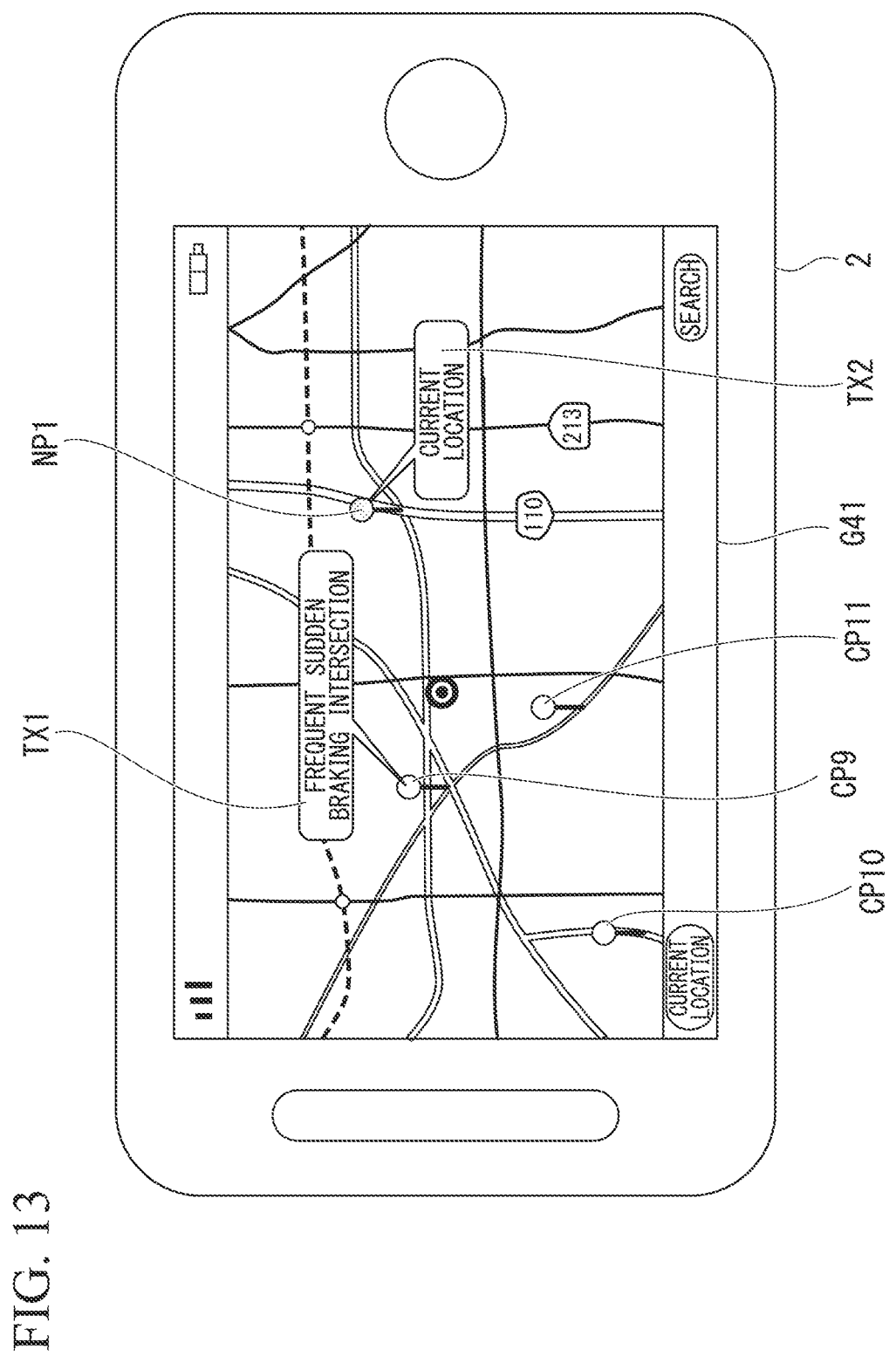
FIG. 13 is a diagram showing an example of a display screen when providing information regarding frequent sudden braking intersections (driving assistance places, caution-required places) output from an output section of the electronic device according to the present embodiment.

FIG. 13 is a diagram showing an example of a display screen when providing information regarding the frequent sudden braking intersection (a driving assistance place, a caution-required place) output from the output section 242 of the electronic device 2 according to the present embodiment.

The output section 242 of the electronic device 2 displays, for example, a map image G41, and displays a current location NP1 of the vehicle 4 and frequent sudden braking intersections CP9, CP10, and CP11. In this case, for example, the current location NP1 of the vehicle 4 and the frequent sudden braking intersections CP9, CP10, and CP11 may be displayed with different icons. A text box TX1 may be displayed at the frequent sudden braking intersections CP9, CP10, and CP11, and "frequent sudden braking intersection" may be displayed in the text box TX1. A text box TX2 may be displayed at the current location NP1 of the vehicle 4, and "current location" may be displayed in the text box TX2.

Figure 14:
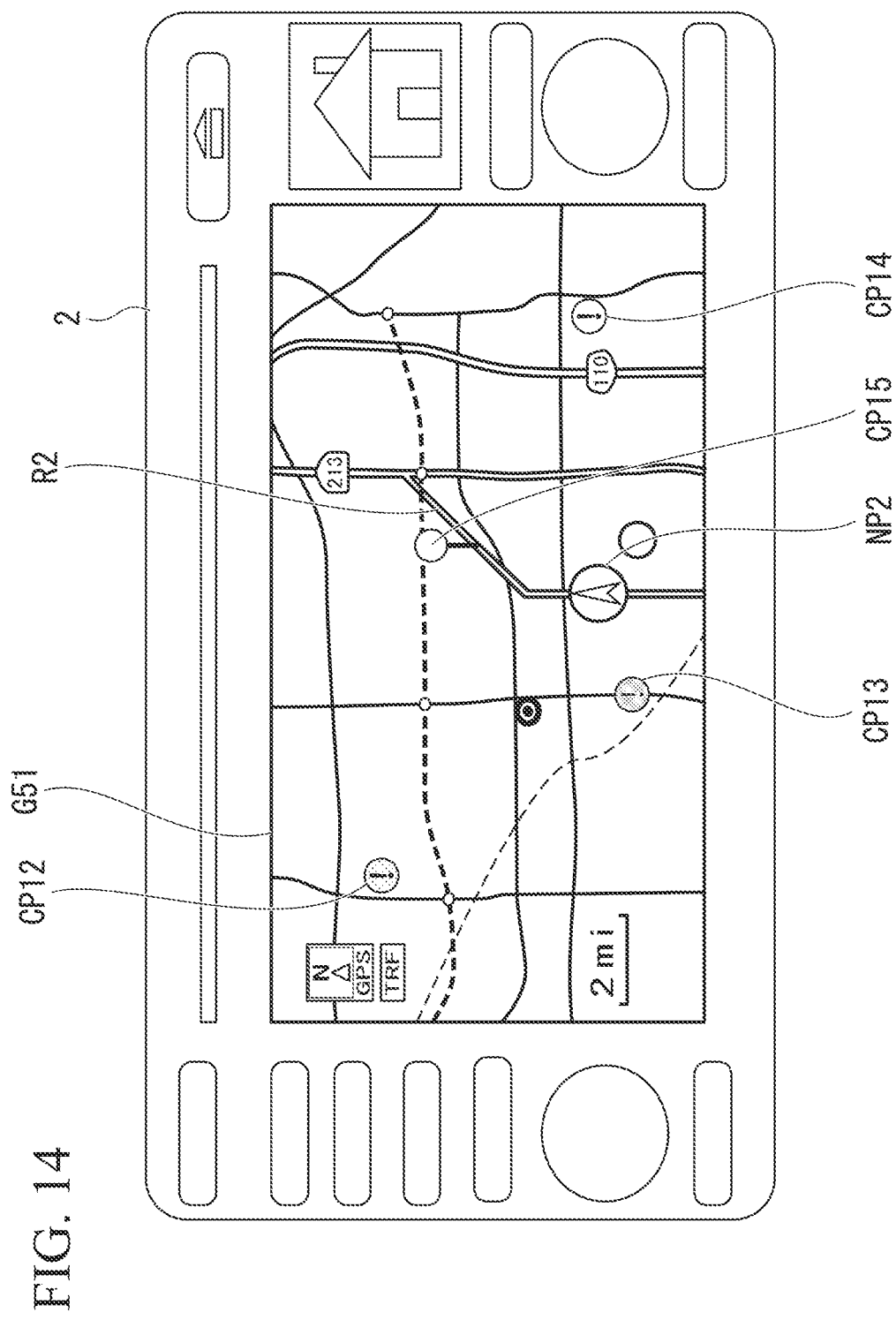
FIG. 14 is a diagram showing an example of a display screen when providing information regarding frequent sudden braking intersections (driving assistance places, caution-required places) output from an output section of the electronic device according to the present embodiment.

FIG. 14 is a diagram showing an example of a display screen when providing information regarding the frequent sudden braking intersections (driving assistance places, caution-required places) output from the output section 242 of the electronic device 2 according to the present embodiment.

The output section 242 of the electronic device 2 displays, for example, a map image G51, and displays a current location NP2 of the vehicle 4 and frequent sudden braking intersections (driving assistance places, caution-required places) CP12, CP13, CP14, and CP15. In this case, only the frequent sudden braking intersection CP15 is present in a travel path R2 along which the vehicle 4 travels. Therefore, the output section 242 may display only the display icon of the frequent sudden braking intersection CP15 in the travel path R2 so as to be different from the display icons of the frequent sudden braking intersections CP12, CP13, and CP14 that are not present in the travel path R2. In addition, it is also possible to adopt a display mode in which the output section 242 performs display by changing the color of the display icon (for example, display icons of three colors) stepwise or changing the display icon to be displayed itself based on the rapid deceleration probability at each of the frequent sudden braking intersections CP12, CP13, and CP14.

Figure 15:
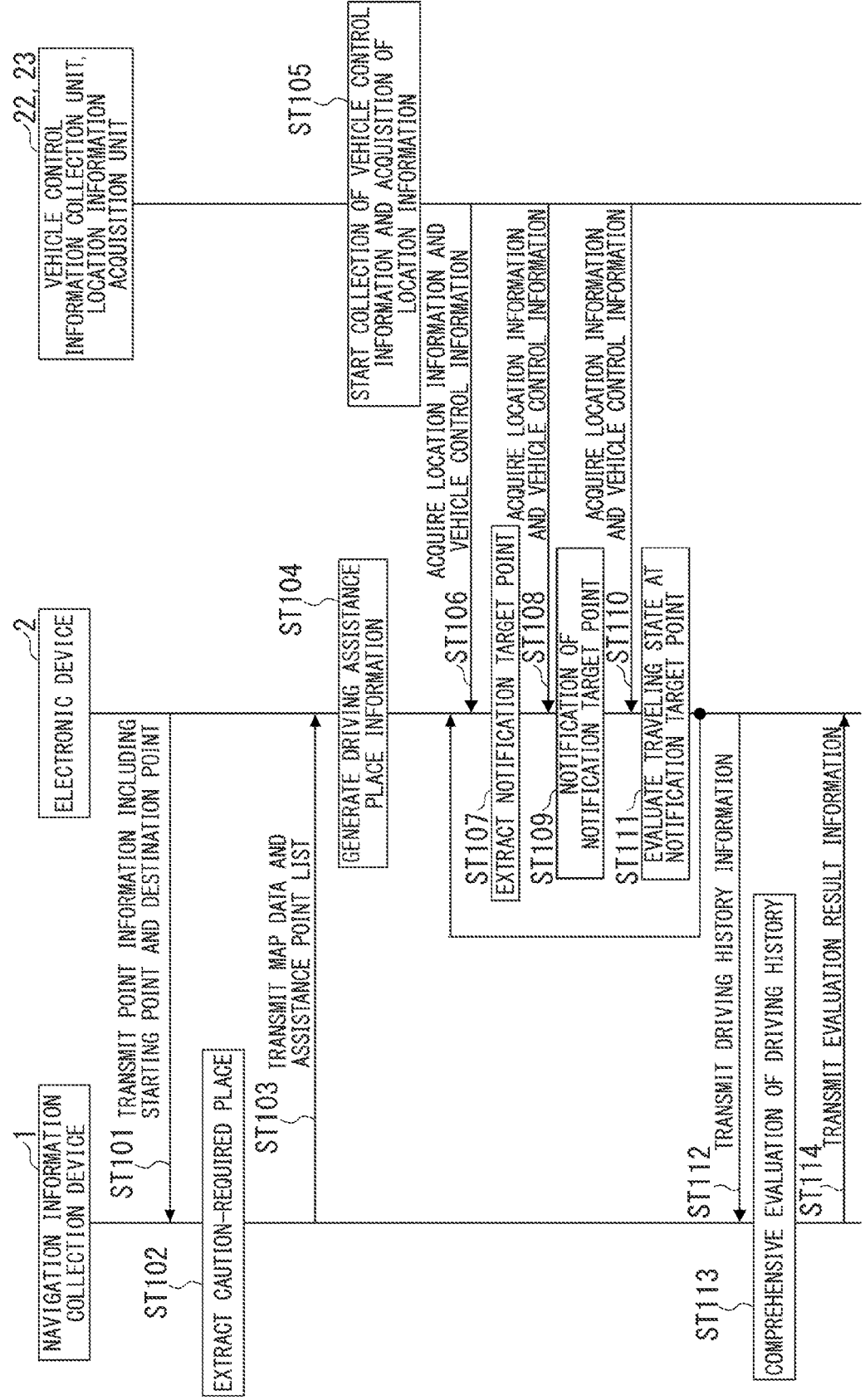
FIG. 15 is a sequence diagram showing an example of the operation of the driving assistance system according to the present embodiment.

FIG. 15 is a sequence diagram showing an example of the operation of the driving assistance system S1 according to the present embodiment.

In step ST101, the electronic device 2 transmits, to the navigation information collection device 1, point information including the starting point and the destination point generated by the path information generation section 211.

In step ST102, the intersection estimation section 153 of the navigation information collection device 1 extracts a caution-required place, and stores the caution-required place in the assistance point list storage unit 16.

In step ST103, the navigation information collection device 1 transmits, to the electronic device 2, map data and an assistance point list of a range including the point information acquired by the distribution control unit 18.

In step ST104, the safety assistance information generation section 213 of the electronic device 2 generates driving assistance place information based on the map data, the point information, and the assistance point list.

In step ST105, the location information acquisition unit 22 and the vehicle control information collection unit 23 of the electronic device 2 start the acquisition of the location information of the vehicle 4 and the collection of the vehicle control information of the vehicle 4.

In step ST106, the driving data generation section 214 of the electronic device 2 acquires the location information of the vehicle 4 and the vehicle control information of the vehicle 4 that have been acquired or collected by the location information acquisition unit 22 and the vehicle control information collection unit 23.

In step ST107, the driving data generation section 214 extracts a notification target point from a plurality of caution-required places included in the assistance point list based on the location information and the vehicle control information that have been acquired.

In step ST108, the driving data generation section 214 acquires the location information of the vehicle 4 and the vehicle control information of the vehicle 4 that have been acquired or collected by the location information acquisition unit 22 and the vehicle control information collection unit 23.

In step ST109, the driving data generation section 214 performs notification determination for the extracted notification target point, and performs traveling notification of caution-required place based on the determination result.

In step ST110, the driving data generation section 214 acquires the location information of the vehicle 4 and the vehicle control information of the vehicle 4 that have been acquired or collected by the location information acquisition unit 22 and the vehicle control information collection unit 23.

In step ST111, the driving evaluation unit 24 evaluates the traveling state based on the traveling state of the vehicle 4 in a predetermined range including the notification target point, and notifies the driver of the vehicle 4 of the evaluation result immediately after the vehicle 4 has passed through the notification target point.

In addition, the electronic device 2 repeats the processing of steps ST106 to ST111 until the vehicle 4 arrives at the destination point from the starting point.

In step ST112, the electronic device 2 transmits a travel history for one trip, that is, a travel history from the starting point to the destination point, as driving history information, to the navigation information collection device 1.

In step ST113, the navigation information collection device 1 stores the driving history information received from the electronic device 2 in the travel history storage unit 14, and the assistance content unit 17 evaluates the driving history comprehensively.

In step ST114, the navigation information collection device 1 transmits evaluation result information including the evaluation result to the electronic device 2.

Figure 16:
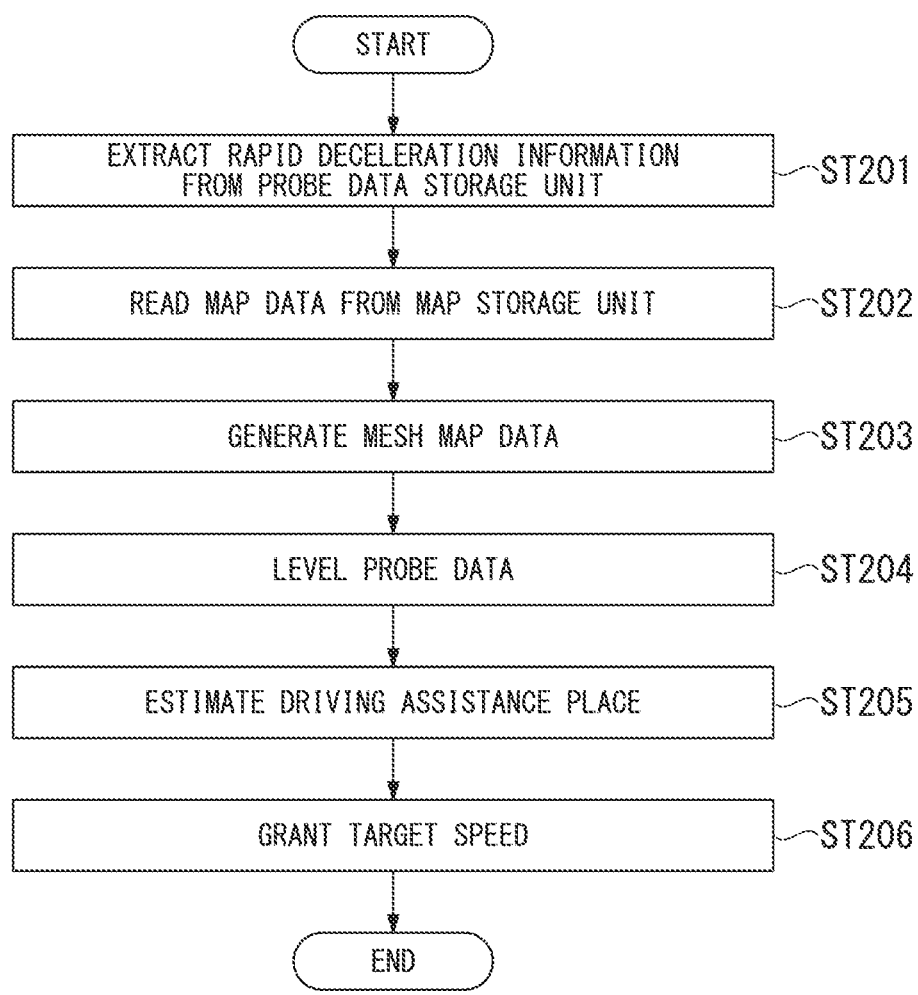
FIG. 16 is a flowchart showing an example of the assistance point list extraction processing of an assistance point list estimation unit according to the present embodiment.

FIG. 16 is a flowchart showing an example of the assistance point list extraction processing of the assistance point list estimation unit 15 according to the present embodiment.

In step ST201, the point extraction section 151 reads probe data from the probe data storage unit 11 and extracts, from the probe data, rapid deceleration information including the occurrence location of a rapid deceleration event and a traveling direction of the vehicle when the rapid deceleration event has occurred.

In step ST202, the division section 152 reads the map data from the map storage unit 12.

In step ST203, the first mesh division section 1521 generates first mesh map data by dividing a predetermined range of map data into block-shaped meshes in the latitude and longitude directions. The second mesh division section 1522 generates second mesh map data by dividing one mesh in the first mesh map data into, for example, a plurality of (for example, nine) meshes.

In step ST204, the leveling section 154 levels one or both of the probe data and the frequent sudden braking intersection estimated by the intersection estimation section 153 in a predetermined period of time by referring to the probe data.

In step ST205, the intersection estimation section 153 estimates the frequent sudden braking intersection as a driving assistance place based on the first mesh map data, the second mesh map data, the number of occurrence points of rapid deceleration, the rapid deceleration orientation, and the rapid deceleration probability.

In step ST206, the target speed granting section 156 grants a target speed as a target to pass safely through the frequent sudden braking intersection, which is calculated for each link at the frequent sudden braking intersection, to the frequent sudden braking intersection based on the probe data and the map data.

Figure 17:
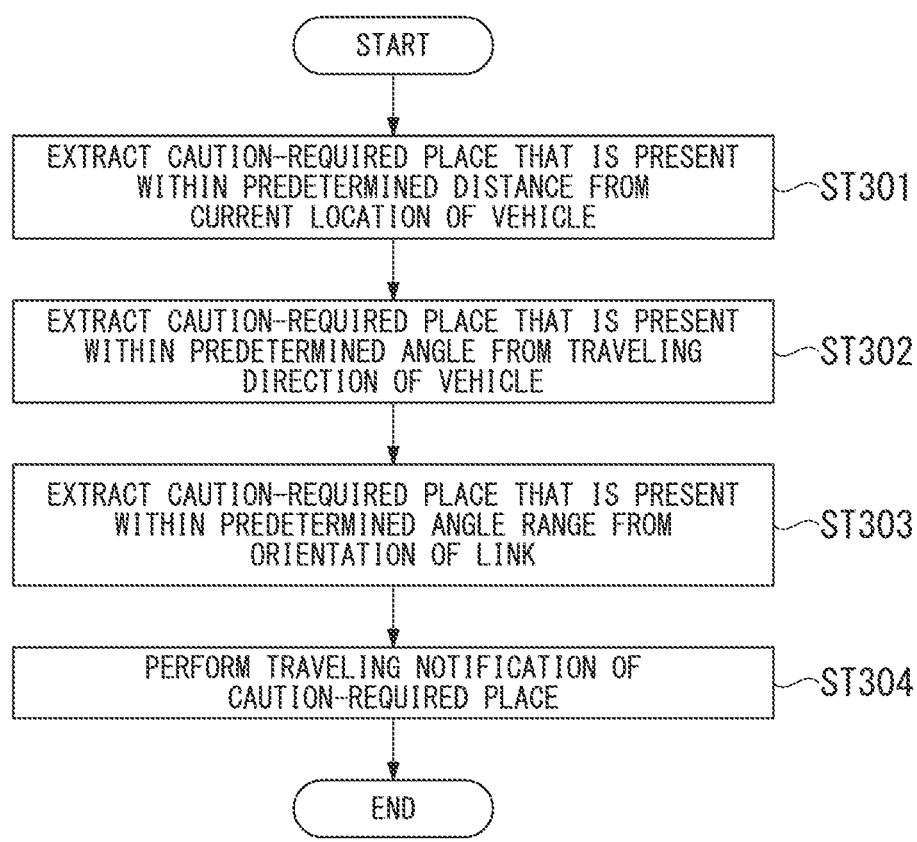
FIG. 17 is a flowchart showing an example of the notification target point extraction processing in a driving data generation section according to the present embodiment.

FIG. 17 is a flowchart showing an example of the notification target point extraction processing in the driving data generation section 214 according to the present embodiment.

In step ST301, the driving data generation section 214 extracts a caution-required place that is present within a predetermined distance range from the current location of the vehicle 4, among a plurality of caution-required places, as a first frequent sudden braking intersection candidate. The current location of the vehicle 4 is set as a center of the predetermined distance range.

In step ST302, the driving data generation section 214 extracts a caution-required place that is present within a predetermined angle from the current traveling direction of the vehicle 4 passing through the current location of the vehicle 4, among the plurality of caution-required places, as a second frequent sudden braking intersection candidate. The current traveling direction of the vehicle 4 is set as a central axis.

In step ST303, when the current location of the vehicle 4 is present within a predetermined angle range defined by the central axis and the orientation line of the link, in which it is determined that the vehicle 4 at the current location passes through the caution-required place by referring to the map data including the information of a plurality of links in which locations and orientations are associated with each other, among the caution-required places extracted in common by both of the first frequent sudden braking intersection candidate and the second frequent sudden braking intersection candidate, the driving data generation section 214 extracts the caution-required place as a notification target point.

In step ST304, the driving data generation section 214 determines whether or not the distance between the current location of the vehicle 4 and the notification target point is a predetermined distance or less. Then, when the distance between the current location of the vehicle 4 and the notification target point is a predetermined distance or less, the driving data generation section 214 compares the traveling speed of the vehicle 4 with a target speed in the link of the notification target point. When the traveling speed of the vehicle 4 is higher than the target speed by a predetermined value or more, the driving data generation section 214 determines whether or not the vehicle 4 will arrive at the notification target point at a predetermined distance from the current location of the vehicle 4 within the first time threshold value if the vehicle 4 travels at a speed equal to the current traveling speed. When the vehicle 4 arrives at the notification target point at a predetermined distance from the current location of the vehicle 4 within the first time threshold value, the driving data generation section 214 determines whether or not the vehicle 4 will arrive at the notification target point at a predetermined distance from the current location of the vehicle 4 within the second time threshold value if the vehicle 4 travels at a speed equal to the current traveling speed. When the vehicle 4 arrives at the notification target point at a predetermined distance from the current location of the vehicle 4 within the second time threshold value and if the vehicle 4 travels at a speed equal to the current traveling speed, the driving data generation section 214 performs traveling notification of caution-required place at the notification target point.

Figure 18:
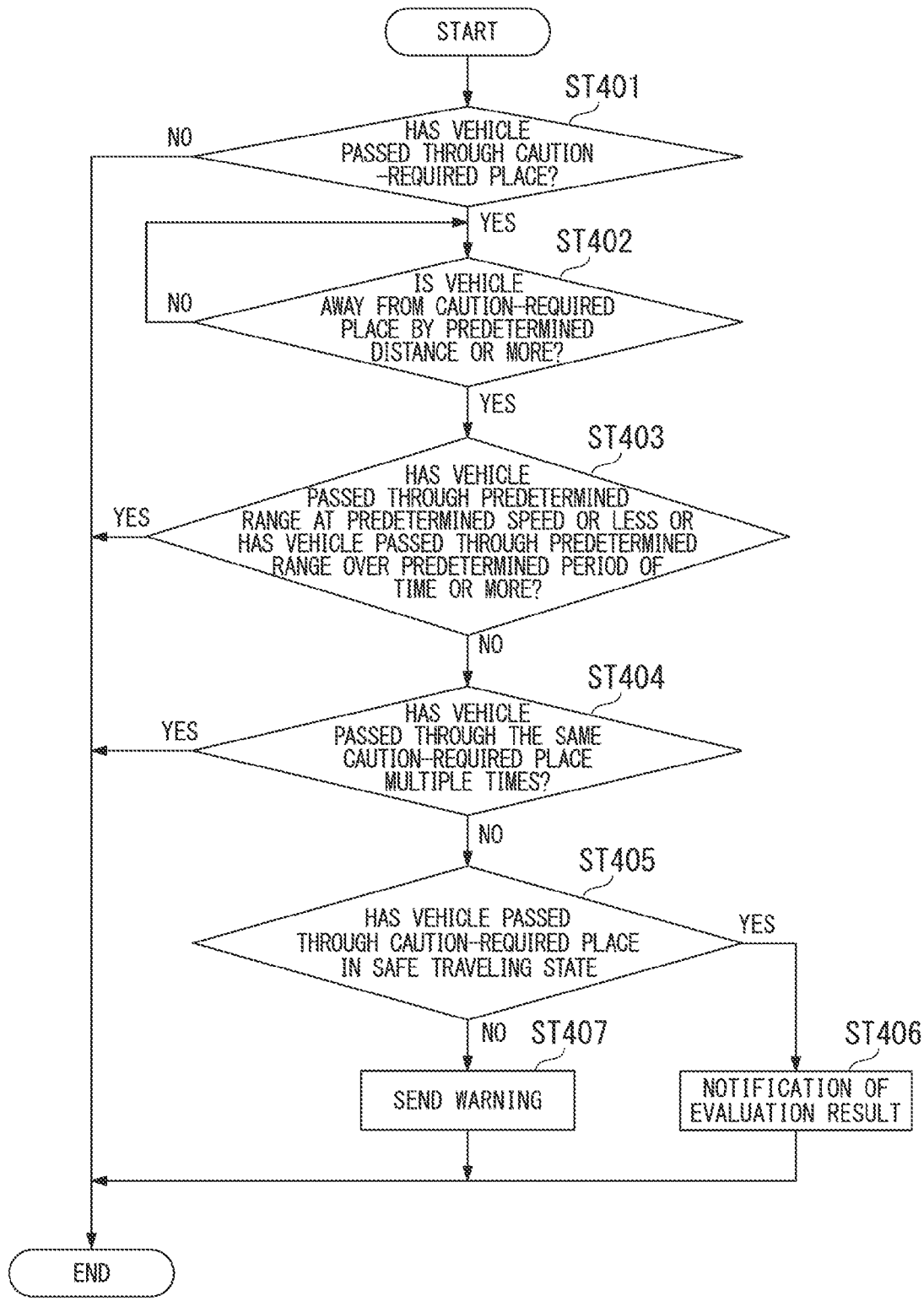
FIG. 18 is a flowchart showing an example of the processing when a driving evaluation unit according to the present embodiment evaluates the traveling state of a vehicle at the notification target point.

FIG. 18 is a flowchart showing an example of the processing when the driving evaluation unit 24 according to the present embodiment evaluates the traveling state of the vehicle 4 at the notification target point.

In step ST401, the driving evaluation unit 24 determines whether or not the vehicle 4 has passed through the caution-required place that is a notification target point. When the vehicle 4 has not passed through the caution-required place, the evaluation processing is ended. On the other hand, when the vehicle 4 has passed through the caution-required place, the process proceeds to step ST402.

In step ST402, the driving evaluation unit 24 determines whether or not the vehicle 4 is away from the caution-required place by a predetermined distance or more. When the vehicle 4 is not away from the caution-required place by the predetermined distance or more, the processing of step ST402 is repeated. On the other hand, when the vehicle 4 is away from the caution-required place by the predetermined distance or more, the process proceeds to step ST403.

In step ST403, the driving evaluation unit 24 determines whether or not the vehicle 4 has passed through a predetermined range at a predetermined speed or less, or determines whether or not the vehicle 4 has passed through the predetermined range over a predetermined period of time or more. When the vehicle 4 has passed through the predetermined range at the predetermined speed or less or when the vehicle 4 has passed through the predetermined range over the predetermined period of time or more, the evaluation processing is ended since further evaluation is not required in such a case. On the other hand, when the vehicle 4 has not passed through the predetermined range at the predetermined speed or less or when the vehicle 4 has not passed through the predetermined range over the predetermined period of time or more, the process proceeds to step ST404. That is, when the vehicle 4 has passed through the predetermined range at the predetermined speed or more or when the vehicle 4 has passed through the predetermined range within the predetermined period of time, the process proceeds to step ST404.

In step ST404, the driving evaluation unit 24 determines whether or not the vehicle 4 has passed through the same caution-required place multiple times. When the vehicle 4 has passed through the same caution-required place multiple times, the evaluation processing is ended since further evaluation for the caution-required place is not required. On the other hand, when the vehicle 4 has not passed through the same caution-required place multiple times, the process proceeds to step ST405.

In step ST405, the driving evaluation unit 24 determines whether or not the vehicle 4 has passed through the caution-required place in a safe (appropriate) traveling state. When the vehicle 4 has passed through the caution-required place in a safe (appropriate) traveling state, the process proceeds to step ST406. On the other hand, when the vehicle 4 has not passed through the caution-required place in a safe (appropriate) traveling state, the process proceeds to step ST407.

In step ST406, the driving evaluation unit 24 notifies the driver of the vehicle 4 of the evaluation result, and ends the evaluation processing.

In step ST407, the driving evaluation unit 24 sends a warning to the driver of the vehicle 4 that prompts the driver to pass through the caution-required place in a safe traveling state, and ends the evaluation processing.

Thus, according to the present embodiment, a map generation system (driving assistance system S1) includes: an extraction unit (point extraction section 151) that collects information including vehicle speed information, which includes at least a speed, acceleration, deceleration, and other kinds of speed, from a vehicle and that extracts rapid deceleration information, which includes a location (first location) where a rapid deceleration event satisfying predetermined conditions has occurred, and a traveling direction of the vehicle at the time when the rapid deceleration event has occurred from the collected information including the vehicle speed information which includes at least a speed, acceleration, deceleration, and other kinds of speed; a storage unit (map storage unit 12) that stores map data; a division unit (division section 152) that generates mesh map data by dividing the map data stored in the storage unit (map storage unit 12) into a plurality of meshes in a predetermined size and a predetermined number of divisions; and an estimation unit (intersection estimation section 153) that estimates a location that requires caution when the vehicle travels therethrough, as a caution-required place, based on the rapid deceleration information extracted by the extraction unit (point extraction section 151) and the mesh map data generated by the division unit (division section 152).

Accordingly, the map generation system (driving assistance system S1) can extract rapid deceleration information including the traveling direction and the location of the vehicle when a rapid deceleration event has occurred based on the information including the vehicle speed information including at least a speed, acceleration, deceleration, and other kinds of speed that is collected from the actual vehicle, and estimate a caution-required place based on the rapid deceleration information and mesh map data which is divided into a plurality of meshes in a predetermined size and a predetermined number of divisions. Therefore, it is possible to improve the extraction accuracy in extracting the caution-required place in the driving assistance system.

In the map generation system (driving assistance system S1), intersection location information indicating a location of an intersection is included in the map data, and the estimation unit (intersection estimation section 153) estimates the location of the intersection on the map data, which is present in a front mesh in front of a mesh in which the location indicated by the rapid deceleration information is included, as the caution required place.

Accordingly, the map generation system (driving assistance system S1) can estimate the location of the intersection, which is present within a front mesh located in front of a location which is indicated by the rapid deceleration information included in a mesh, as a caution-required place.

Second Embodiment

Hereinafter, a second embodiment of the present invention will be described in detail with reference to the accompanying diagrams.

Figure 19:
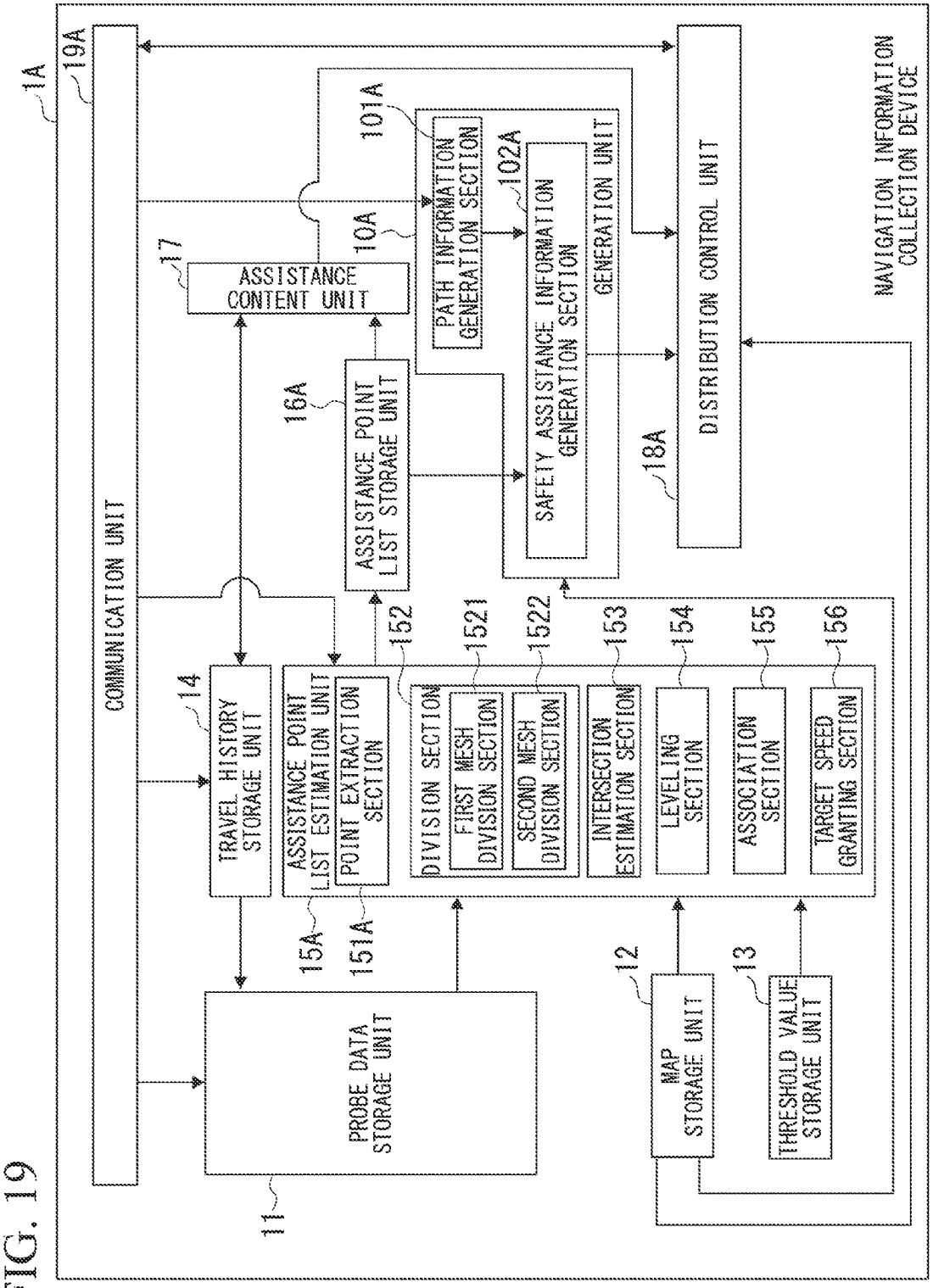
FIG. 19 is a schematic block diagram showing an example of the configuration of a navigation information collection device according to a second embodiment of the present invention.

FIG. 19 is a schematic block diagram showing an example of the configuration of a navigation information collection device 1A according to the second embodiment of the present invention.

The navigation information collection device 1A includes a probe data storage unit 11, a map storage unit 12, a threshold value storage unit 13, a travel history storage unit (personal history storage unit) 14, an assistance point list estimation unit 15A, an assistance point list storage unit 16A, an assistance content unit 17, a distribution control unit 18A, a communication unit 19A, and a generation unit 10A. The assistance point list estimation unit 15A includes a point extraction section 151A, a division section 152, an intersection estimation section 153, a leveling section 154, an association section 155, and a target speed granting section 156. The division section 152 includes a first mesh division section 1521 and the second mesh division section 1522. The generation unit 10A includes a path information generation section 101A and a safety assistance information generation section 102A.

When the navigation information collection device 1A according to the second embodiment is compared with the navigation information collection device 1 according to the first embodiment, the generation unit 10A is added in the navigation information collection device 1A. Since other configurations are the same as those of the navigation information collection device 1 according to the first embodiment, explanation thereof will be omitted. In addition, operations of the point extraction section 151A of the assistance point list estimation unit 15A, the distribution control unit 18A, the communication unit 19A, and the generation unit 10A in the navigation information collection device 1A are different from those in the first embodiment, the operations will be described.

The point extraction section 151A reads a predetermined range of probe data including point information, which is received from the electronic device 2A through the communication unit 19A and the network N1, from the probe data storage unit 11 and extracts, from the probe data, rapid deceleration information including the occurrence location of a rapid deceleration event corresponding to predetermined conditions (for example, vehicle speed information is deceleration equal to or greater than the threshold value) and a traveling direction of the vehicle when the rapid deceleration event has occurred. The point extraction section 151A outputs the extracted rapid deceleration information to the intersection estimation section 153.

When the point information including the starting point and the destination point is received from the electronic device 2A through the communication unit 19A, the path information generation section 101A generates navigation information by reading map data in a range including the point information from the map storage unit 12 and searching for a path from the map data based on the starting point and the destination point included in the point information. The path information generation section 101A outputs the generated navigation information to the safety assistance information generation section 102A.

The safety assistance information generation section 102A reads an assistance point list in a range including the point information from the assistance point list storage unit 16 based on the point information including the starting point and the destination point received from the electronic device 2A through the communication unit 19A. The safety assistance information generation section 102A generates driving assistance place information by associating frequent sudden braking intersection information (driving assistance place information, caution-required place information) included in the assistance point list with the map data included in the navigation information based on the assistance point list and the navigation information input from the path information generation section 101A. The safety assistance information generation section 102A outputs the generated driving assistance place information to the distribution control unit 18A.

The distribution control unit 18A controls the distribution of an application managed by the assistance content unit 17. The distribution control unit 18A performs control to transmit the driving assistance place information, which is input from the safety assistance information generation section 102A, to the electronic device 2A through the communication unit 19A and the network N1. In addition, the distribution control unit 18 performs control to transmit the content information, which is input from the assistance content unit 17, to the electronic device 2A through the communication unit 19A and the network N1.

The communication unit 19A communicates with the electronic device 2A. The communication unit 19A performs communication processing, such as encoding/decoding of data, modulation/demodulation of data, AD/DA conversion, frequency conversion, and transmission and reception of data signals using radio waves. The communication unit 19A is connected to the network N1 through a cable or wirelessly.

Figure 20:
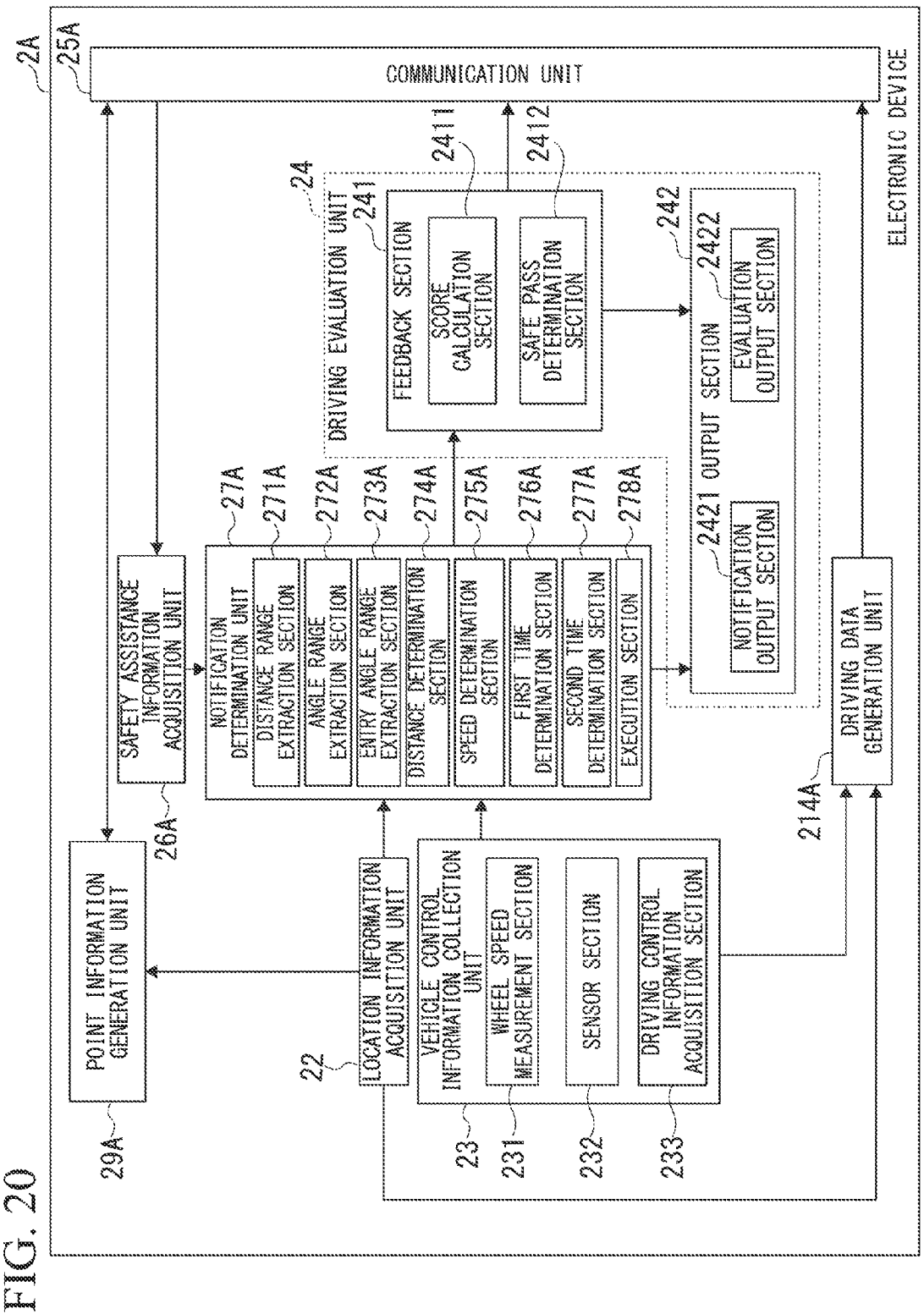
FIG. 20 is a schematic block diagram showing an example of the configuration of an electronic system.

FIG. 20 is a schematic block diagram showing an example of the configuration of the electronic device 2A according to the present embodiment.

The electronic device 2A includes a driving data generation unit 214A, a location information acquisition unit 22, a vehicle control information collection unit 23, a driving evaluation unit 24, a communication unit 25A, a safety assistance information acquisition unit 26A, a notification determination unit 27A, and a point information generation unit 29A. The vehicle control information collection unit 23 includes a wheel speed measurement section 231, a sensor section 232, and a driving control information acquisition section 233. The driving evaluation unit 24 includes a feedback section 241 and an output section 242. The feedback section 241 includes a score calculation section 2411 and a safe pass determination section 2412. The output section 242 includes a notification output section 2421 and an evaluation output section 2422. The notification determination unit 27A includes a distance range extraction section 271A, an angle range extraction section 272A, an entry angle range extraction section 273A, a distance determination section 274A, a speed determination section 275A, a first time determination section 276A, a second time determination section 277A, and an execution section 278A.

When the electronic device 2A according to the second embodiment is compared with the electronic device 2 according to the first embodiment, the generation unit 21 is removed and the driving data generation unit 214A, the safety assistance information acquisition unit 26A, the notification determination unit 27A, and the point information generation unit 29A are added in the electronic device 2A. Since other configurations are the same as those of the electronic device 2, explanation thereof will be omitted.

The point information generation unit 29A receives an input of the starting point and the destination point. The point information generation unit 29A transmits the received starting point and destination point, as point information, to the navigation information collection device 1A through the communication unit 25A and the network N1. When the starting point is the current location of the vehicle 4, it is preferable to acquire the location information from the location information acquisition unit 22 and transmit the location information, as point information including the current location and the destination point, to the navigation information collection device 1A through the communication unit 25A and the network N1.

The safety assistance information acquisition unit 26A acquires the driving assistance place information from the navigation information collection device 1A through the communication unit 25A and the network N1. The safety assistance information acquisition unit 26A outputs the acquired driving assistance place information to the notification determination unit 27A.

The driving data generation unit 214A generates a travel history by associating the current location of the vehicle 4 with the vehicle control information based on the current location of the vehicle 4 input from the location information acquisition unit 22 and the vehicle control information input from the vehicle control information collection unit 23, and transmits the generated travel history to the navigation information collection device 1A through the communication unit 25 and the network N1.

The notification determination unit 27A performs driving assistance in the traveling of the vehicle 4 based on the location information input from the location information acquisition unit 22, the vehicle control information input from the vehicle control information collection unit 23, and the driving assistance place information input from the safety assistance information acquisition unit 26A. In addition, the notification determination unit 27A extracts a notification target point satisfying the predetermined conditions to be described later, among a plurality of caution-required places, based on the location information input from the location information acquisition unit 22, the vehicle control information input from the vehicle control information collection unit 23, and the driving assistance place information input from the safety assistance information acquisition unit 26A, and performs traveling notification of caution-required place as the vehicle 4 approaches the notification target point. The notification determination unit 27A outputs the information regarding the extracted notification target point, the location information, and the vehicle control information to the feedback section 241.

First, the distance range extraction section 271A (first extraction section) extracts a frequent sudden braking intersection that is present in a predetermined distance range from the current location of the vehicle 4, among a plurality of caution-required places included in the driving assistance place information, as a first caution-required place candidate. The current location of the vehicle 4 is set as a center of the predetermined distance range.

Then, the angle range extraction section 272A (second extraction section) extracts a frequent sudden braking intersection that is present at a distance closest to the current location of the vehicle 4, among a plurality of caution-required places included in the driving assistance place information, as a second caution-required place candidate.

Then, the entry angle range extraction section 273A (third extraction section) extracts a caution-required place in the link with a highest travel probability as a caution-required place in the travel path along which the vehicle 4 travels, among caution-required places extracted in common by both of first caution-required place candidates extracted by the distance range extraction section 271A and second caution-required place candidates extracted by the angle range extraction section 272A, as a notification target point.

Thus, a notification target point is extracted from a plurality of caution-required places when the predetermined conditions in each of the distance range extraction section 271A, the angle range extraction section 272A, and the entry angle range extraction section 273A are satisfied.

The distance determination section 274A determines whether or not the distance between the current location of the vehicle 4 and the notification target point is a predetermined distance or less.

When the distance between the current location of the vehicle 4 and the notification target point is a predetermined distance or less, the speed determination section 275A compares the traveling speed of the vehicle 4 with the target speed in the link of the notification target point, and determines whether or not the traveling speed of the vehicle 4 is equal to or higher than the target speed by a predetermined value or more.

When the traveling speed of the vehicle 4 is equal to or higher than the target speed by a predetermined value or more, the first time determination section 276A determines whether or not the vehicle 4 will arrive at the notification target point at a predetermined distance from the current location of the vehicle 4 within the first time threshold value if the vehicle 4 travels at a speed equal to the current traveling speed.

When the vehicle 4 arrives at the notification target point at a predetermined distance from the current location of the vehicle 4 within the first time threshold value, the second time determination section 277A determines whether or not the vehicle 4 will arrive at the notification target point at a predetermined distance from the current location of the vehicle 4 within the second time threshold value if the vehicle 4 travels at a speed equal to the current traveling speed.

When the vehicle 4 arrives at the notification target point at a predetermined distance from the current location of the vehicle 4 within the second time threshold value if the vehicle 4 travels at a speed equal to the current traveling speed, the execution section 278A performs traveling notification of caution-required place at the notification target point.

Thus, the execution section 278A performs the traveling notification of caution-required place at the notification target point in conjunction with the output section 242 based on the determination results of the distance determination section 274A, the speed determination section 275A, the first time determination section 276A, and the second time determination section 277A.

The communication unit 25A performs communication with the navigation information collection device 1. The communication unit 25A performs communication processing, such as encoding/decoding of data, modulation/demodulation of data, AD/DA conversion, frequency conversion, and transmission and reception of data signals using radio waves. The communication unit 25A is connected to the network N1 through a cable or wirelessly.

Figure 21:
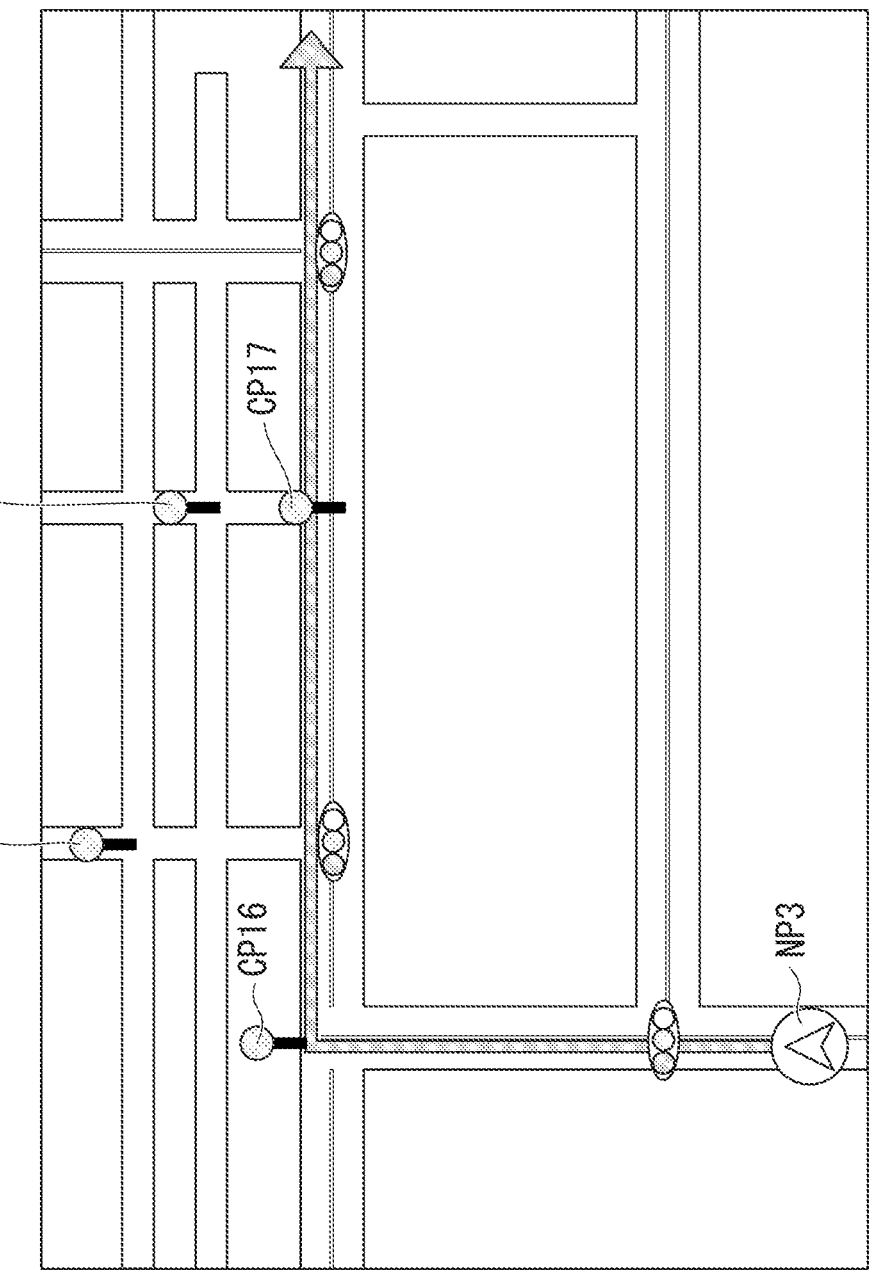
FIG. 21 is a diagram for explaining the notification operation according to the present embodiment.

FIG. 21 is a diagram for explaining the notification operation according to the present embodiment.

When the vehicle 4 travels from a current location NP3 to the destination point along a predetermined path, a plurality of caution-required places KP7, KP8, CP16, and CP17 are present in the driving assistance place information of a predetermined range including the current location of the vehicle 4 and the destination point. The distance range extraction section 271A, the angle range extraction section 272A, and the entry angle range extraction section 273A extract a notification target point from the caution-required places in conjunction with each other, thereby extracting the caution-required places CP16 and CP17 present on a path R3, along which the vehicle 4 travels, as notification target points.

Therefore, when a plurality of caution-required places are present in a predetermined range including the current location of the vehicle 4, it is possible to suppress the execution of notification for the caution-required places KP7 and KP8 that are not on the path R3 along which the vehicle 4 travels. As a result, it is possible to suppress incorrect traveling notification of caution-required place at the caution-required place.

Figure 22:
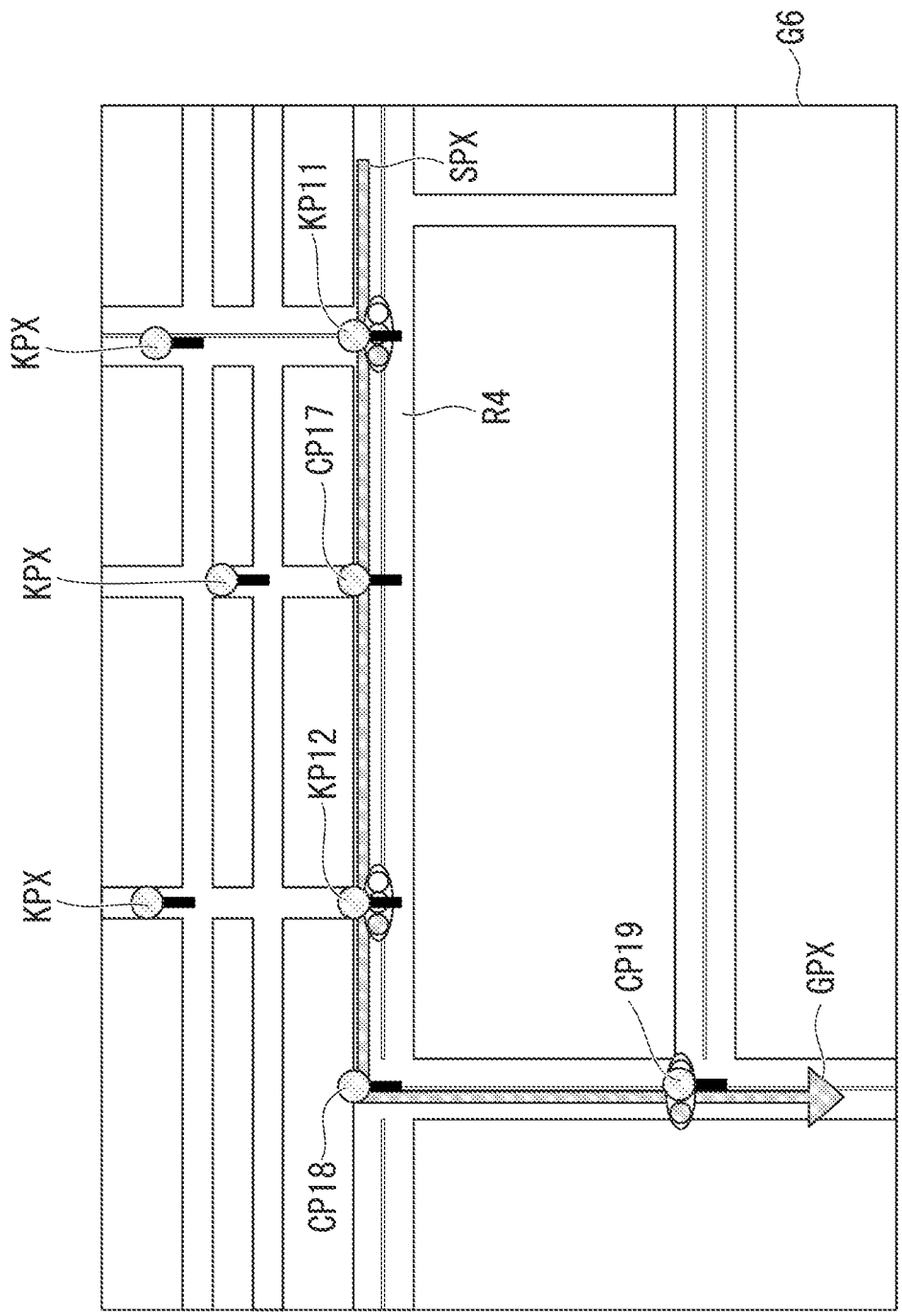
FIG. 22 is a diagram for explaining a plurality of caution-required places, a notification target point, and the travel path of a vehicle according to the present embodiment.

FIG. 22 is a diagram for explaining a plurality of caution-required places, a notification target point, and the travel path of the vehicle 4 according to the present embodiment.

An explanatory diagram G6 is a map image diagram. A travel path R4 and a plurality of caution-required places KPX, KP11, KP12, CP17, CP18, and CP19 when searching for the travel path of the vehicle 4 with reference to map data based on a starting point SPX and a destination point GPX are included in the explanatory diagram G6. In this case, the caution-required places KP11, CP17, KP12, CP18, and CP19 are also present on the travel path R4. Here, traffic signal information in the caution-required places KP11, KP12, and CP19 indicates that a traffic signal is provided, and the distance range extraction section 271A, the angle range extraction section 272A, and the entry angle range extraction section 273A do not extract the caution-required places KP11, KP12, and CP19 as notification target points in conjunction with each other. In the caution-required places CP17 and CP18 extracted by the distance range extraction section 271A, the angle range extraction section 272A, and the entry angle range extraction section 273A, the execution section 278A performs traveling notification of caution-required place based on the determination results of the distance determination section 274A, the speed determination section 275A, the first time determination section 276A, and the second time determination section 277A.

Figure 23:
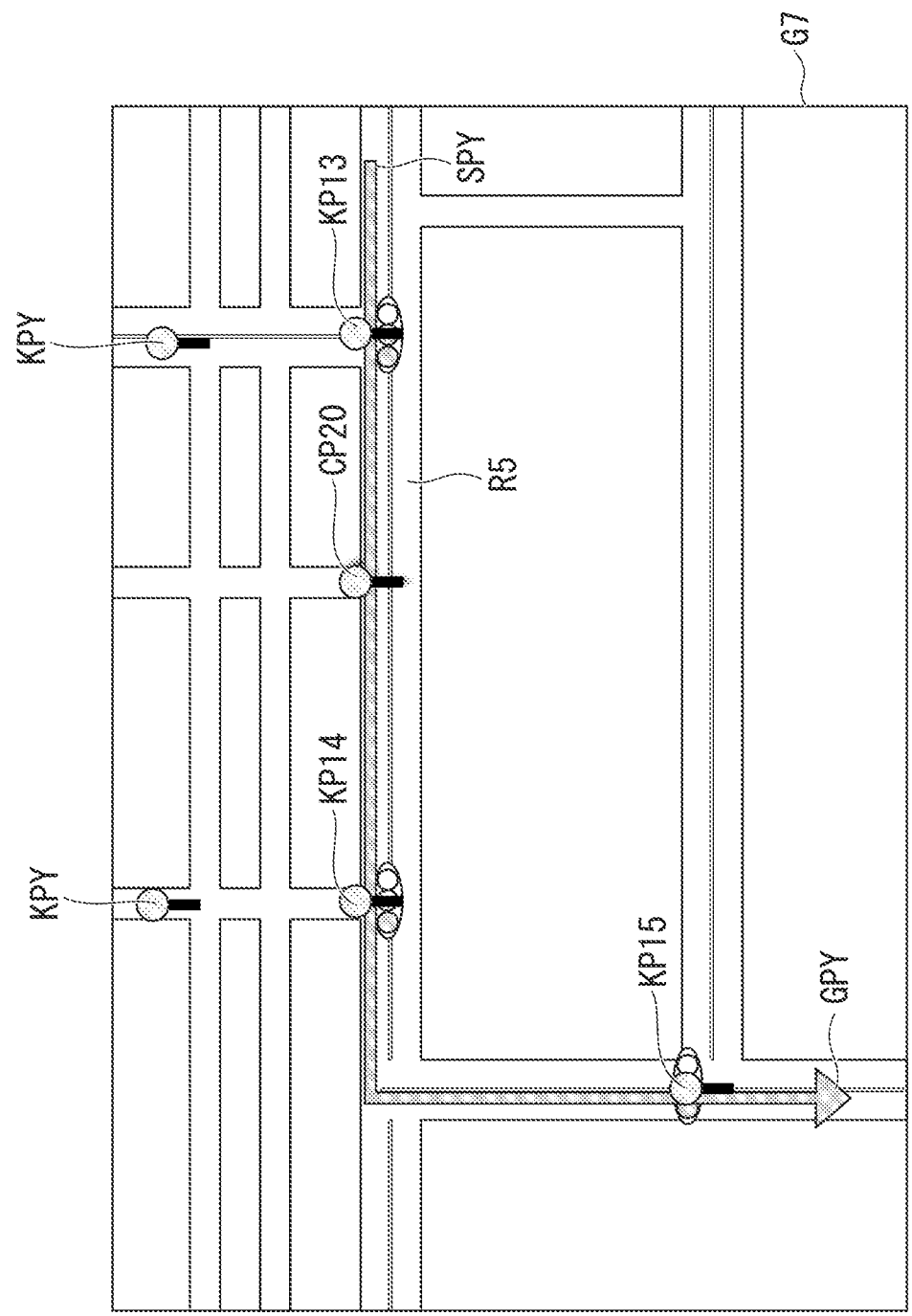
FIG. 23 is a diagram for explaining a plurality of caution-required places, a notification target point, and the travel path of a vehicle according to the present embodiment.

FIG. 23 is a diagram for explaining a plurality of caution-required places, a notification target point, and the travel path of the vehicle 4 according to the present embodiment.

An explanatory diagram G7 is a map image diagram. A travel path R5 and a plurality of caution-required places KPY, KP13, CP20, KP14, and KP15 when searching for the travel path of the vehicle 4 with reference to map data based on a starting point SPY and a destination point GPY are included in the explanatory diagram G7.

Here, when the explanatory diagram G7 of FIG. 23 is compared with the explanatory diagram G6 of FIG. 22, the number of caution-required places in the explanatory diagram G7 is smaller than the number of caution-required places in the explanatory diagram G6. This is because the assistance point list estimation unit 15A reduces the number of extracted caution-required places with reference to the threshold value stored in the threshold value storage unit 13. Thus, by referring to the threshold value in the extraction of caution-required places, it is possible to adjust the number of extracted caution-required places. In addition, the distribution control unit 18A may adjust the number of caution-required places by performing filtering for the assistance point list read from the assistance point list storage unit 16 with reference to the threshold value storage unit 13.

Attention-required places KP13, CP20, KP14, and KP15 are included in the travel path R5 of the vehicle 4 in the explanatory diagram G7. Here, since the caution-required places KP13, KP14, and KP15 are intersections where a traffic signal is provided, the distance range extraction section 271A, the angle range extraction section 272A, and the entry angle range extraction section 273A do not extract the caution-required places KP13, KP14, and KP15 as notification target points in conjunction with each other. The distance range extraction section 271A, the angle range extraction section 272A, and the entry angle range extraction section 273A extract the caution-required place CP20 as a notification target point in conjunction with each other, and perform traveling notification of caution-required place based on the location information of the vehicle 4 and the vehicle control information.

Figure 24:
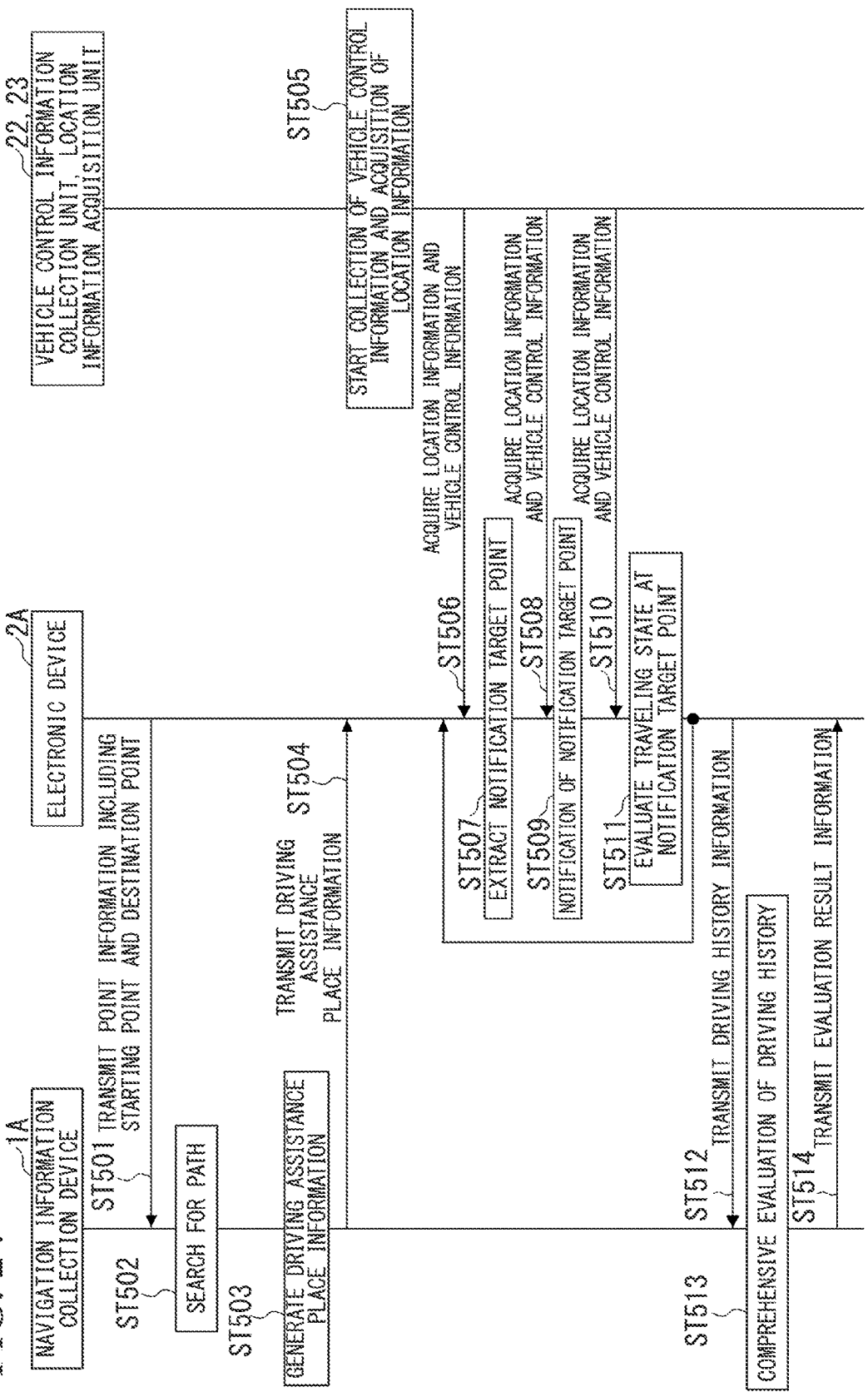
FIG. 24 is a sequence diagram showing an example of the operation of the driving assistance system according to the present embodiment.

FIG. 24 is a sequence diagram showing an example of the operation of the driving assistance system S1 according to the present embodiment.

In step ST501, the electronic device 2A transmits, to the navigation information collection device 1A, point information including the starting point and the destination point generated by the point information generation unit 29A.

In step ST502, the path information generation section 101A generates navigation information by reading map data from the map storage unit 12 and searching for a path from the map data based on the starting point and the destination point included in the point information.

In step ST503, the safety assistance information generation section 102A of the navigation information collection device 1A reads an assistance point list in a range including the point information from the assistance point list storage unit 16 based on the point information received from the electronic device 2A. The safety assistance information generation section 102A generates driving assistance place information by associating frequent sudden braking intersection information included in the assistance point list with the map data included in the navigation information based on the assistance point list and the navigation information input from the path information generation section 101A.

In step ST504, the navigation information collection device 1A transmits the driving assistance place information to the electronic device 2A.

In step ST505, the location information acquisition unit 22 and the vehicle control information collection unit 23 of the electronic device 2A start the acquisition of the location information of the vehicle 4 and the collection of the vehicle control information of the vehicle 4.

In step ST506, the notification determination unit 27A of the electronic device 2A acquires the location information of the vehicle 4 and the vehicle control information of the vehicle 4 that have been acquired or collected by the location information acquisition unit 22 and the vehicle control information collection unit 23.

In step ST507, the notification determination unit 27A extracts a notification target point from a plurality of caution-required places included in the assistance point list based on the location information and the vehicle control information that have been acquired.

In step ST508, the notification determination unit 27A acquires the location information of the vehicle 4 and the vehicle control information of the vehicle 4 that have been acquired or collected by the location information acquisition unit 22 and the vehicle control information collection unit 23.

In step ST509, the notification determination unit 27A performs notification determination for the extracted notification target point, and performs traveling notification of caution-required place based on the determination result.

In step ST510, the notification determination unit 27A acquires the location information of the vehicle 4 and the vehicle control information of the vehicle 4 that have been acquired or collected by the location information acquisition unit 22 and the vehicle control information collection unit 23.

In step ST511, the driving evaluation unit 24 evaluates the traveling state based on the traveling state of the vehicle 4 in a predetermined range including the notification target point, and notifies the driver of the vehicle 4 of the evaluation result immediately after the vehicle 4 has passed through the notification target point.

In addition, the electronic device 2A repeats the processing of steps ST506 to ST511 until the vehicle 4 arrives at the destination point from the starting point.

In step ST512, the electronic device 2A transmits a travel history for one trip, that is, a travel history from the starting point to the destination point, as driving history information, to the navigation information collection device 1A.

In step ST513, the navigation information collection device 1A stores the driving history information received from the electronic device 2A in the travel history storage unit 14, and the assistance content unit 17 evaluates the driving history comprehensively.

In step ST514, the navigation information collection device 1A transmits evaluation result information including the evaluation result to the electronic device 2A.

Figure 25:
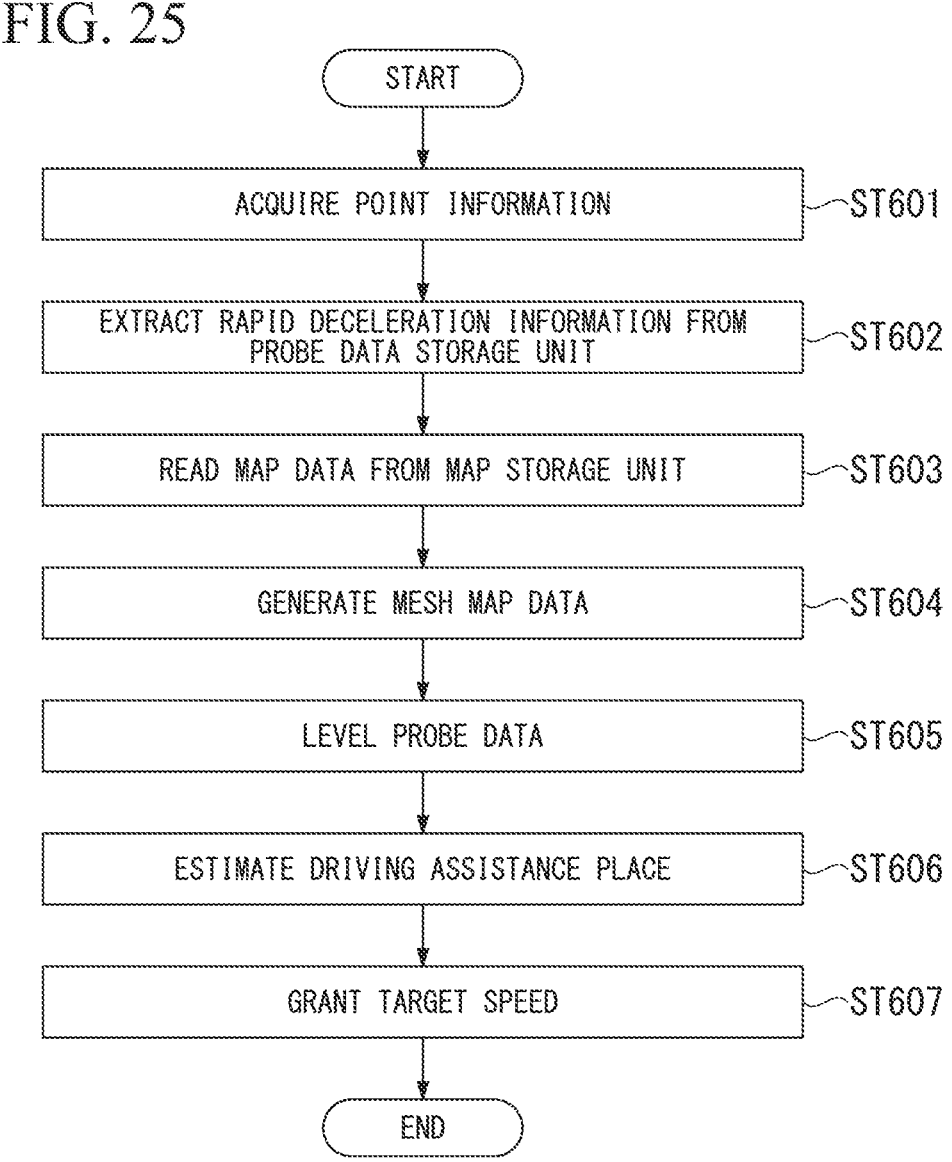
FIG. 25 is a flowchart showing an example of the assistance point list extraction processing of an assistance point list estimation unit according to the present embodiment.

FIG. 25 is a flowchart showing an example of the assistance point list extraction processing of the assistance point list estimation unit 15 according to the present embodiment.

In step ST601, the point extraction section 151A acquires point information from the electronic device 2A through the communication unit 19A and the network N1.

In step ST602, the point extraction section 151A reads a predetermined range of probe data including the point information from the probe data storage unit 11 and extracts, from the probe data, rapid deceleration information including the occurrence location of a rapid deceleration event corresponding to predetermined conditions (for example, vehicle speed information is deceleration equal to or greater than the threshold value) and a traveling direction of the vehicle when the rapid deceleration event has occurred.

In step ST603, the division section 152 reads the map data from the map storage unit 12.

In step ST604, the first mesh division section 1521 generates first mesh map data by dividing a predetermined range of map data into block-shaped meshes in the latitude and longitude directions. The second mesh division section 1522 generates second mesh map data by dividing one mesh in the first mesh map data into, for example, nine meshes.

In step ST605, the leveling section 154 levels one or both of the probe data and the frequent sudden braking intersection estimated by the intersection estimation section 153 in a predetermined period of time by referring to the probe data.

In step ST606, the intersection estimation section 153 estimates the frequent sudden braking intersection as a driving assistance place based on the first mesh map data, the second mesh map data, the number of occurrence points of rapid deceleration, the rapid deceleration orientation, and the rapid deceleration probability.

In step ST607, the target speed granting section 156 grants a target speed, which is calculated for each link at the frequent sudden braking intersection, as a target in order to pass safely through the frequent sudden braking intersection based on the probe data and the map data.

Figure 26:
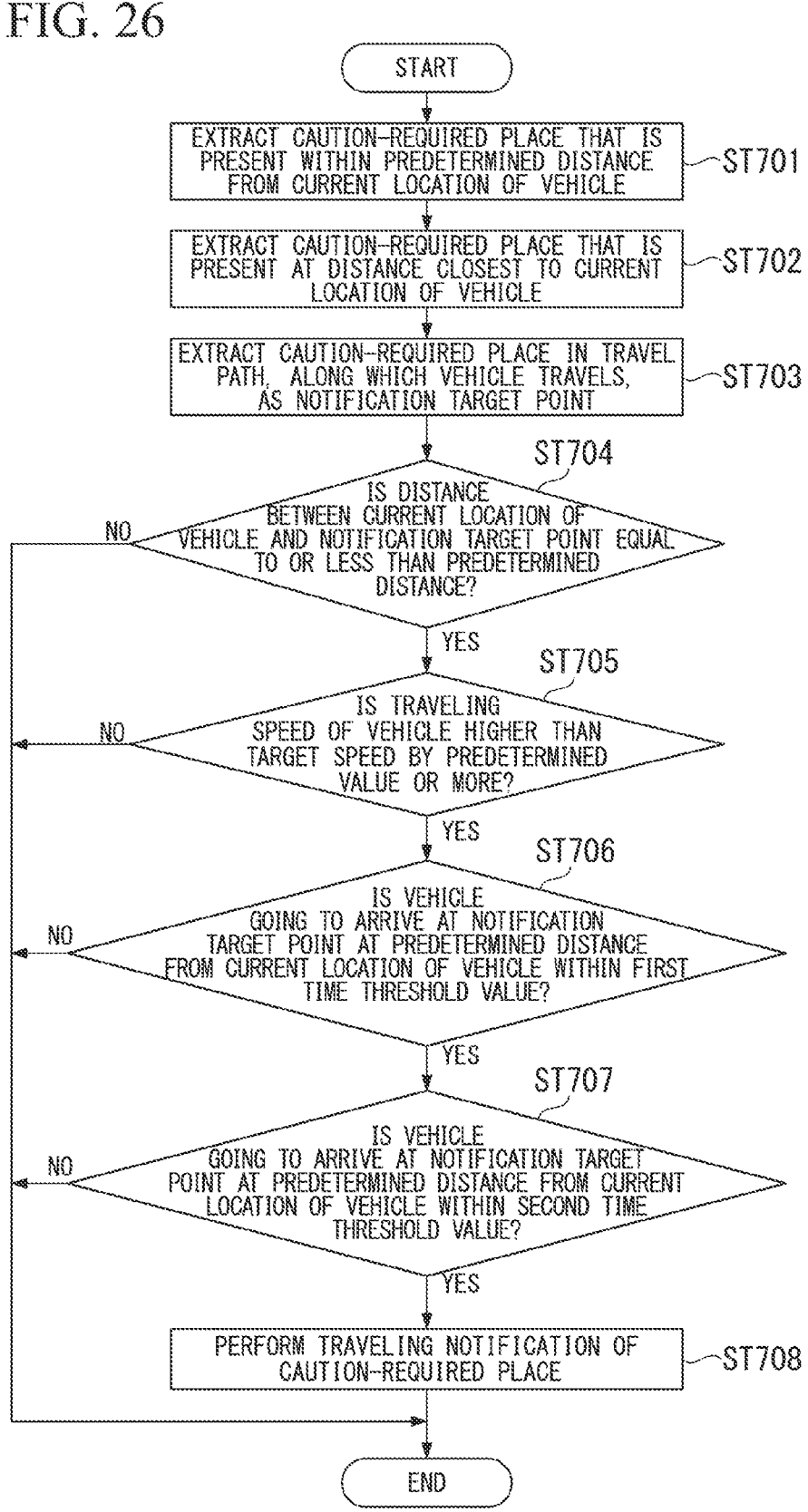
FIG. 26 is a flowchart showing an example of notification target point extraction processing and traveling notification processing in a caution-required place in a notification determination unit according to the present embodiment.

FIG. 26 is a flowchart showing an example of notification target point extraction processing and traveling notification processing in a caution-required place in the notification determination unit 27A according to the present embodiment.

In step ST701, the distance range extraction section 271A (first extraction section) extracts a frequent sudden braking intersection that is present in a predetermined distance range from the current location of the vehicle 4, among a plurality of caution-required places included in the driving assistance place information, as a first caution-required place candidate. The current location of the vehicle 4 is set as a center of the predetermined distance range.

In step ST702, the angle range extraction section 272A (second extraction section) extracts a frequent sudden braking intersection that is present at a distance closest to the current location of the vehicle 4, among a plurality of caution-required places included in the driving assistance place information, as a second caution-required place candidate.

In step ST703, the entry angle range extraction section 273A (third extraction section) extracts driving assistance place information in the link with a highest travel probability as a caution-required place in the travel path along which the vehicle 4 travels, among caution-required places extracted in common by both of first caution-required place candidates extracted by the distance range extraction section 271A and second caution-required place candidates extracted by the angle range extraction section 272A, as a notification target point.

In step ST704, the distance determination section 274A determines whether or not the distance between the current location of the vehicle 4 and the notification target point is a predetermined distance or less. When the distance between the current location of the vehicle 4 and the notification target point is a predetermined distance or less, the process proceeds to step ST705. On the other hand, when the distance between the current location of the vehicle 4 and the notification target point is not a predetermined distance or less, the traveling notification processing in a caution-required place is ended without performing traveling notification of caution-required place for the driver of the vehicle 4.

In step ST705, when the distance between the current location of the vehicle 4 and the notification target point is a predetermined distance or less, the speed determination section 275A compares the traveling speed of the vehicle 4 with the target speed in the link of the notification target point, and determines whether or not the traveling speed of the vehicle 4 is equal to or higher than the target speed by a predetermined value or more. When the traveling speed of the vehicle 4 is equal to or higher than the target speed by a predetermined value or more, the process proceeds to step ST706. On the other hand, when the traveling speed of the vehicle 4 is not equal to or higher than the target speed by a predetermined value or more, the traveling notification processing in a caution-required place is ended without performing traveling notification of caution-required place for the driver of the vehicle 4.

In step ST706, the first time determination section 276A determines whether or not the vehicle 4 will arrive at the notification target point at a predetermined distance from the current location of the vehicle 4 within the first time threshold value if the vehicle 4 travels at a speed equal to the current traveling speed. When the vehicle 4 arrives at the notification target point at a predetermined distance from the current location of the vehicle 4 within the first time threshold value, the process proceeds to step ST707. On the other hand, when the vehicle 4 does not arrive at the notification target point at a predetermined distance from the current location of the vehicle 4 within the first time threshold value, the traveling notification processing in a caution-required place is ended without performing traveling notification of caution-required place for the driver of the vehicle 4.

In step ST707, the second time determination section 277A determines whether or not the vehicle 4 will arrive at the notification target point at a predetermined distance from the current location of the vehicle 4 within the second time threshold value if the vehicle 4 travels at a speed equal to the current traveling speed. When the vehicle 4 arrives at the notification target point at a predetermined distance from the current location of the vehicle 4 within the second time threshold value, the process proceeds to step ST709. On the other hand, when the vehicle 4 does not arrive at the notification target point at a predetermined distance from the current location of the vehicle 4 within the second time threshold value, the traveling notification processing in a caution-required place is ended without performing traveling notification of caution-required place for the driver of the vehicle 4.

In step ST708, the execution section 278A performs traveling notification of caution-required place at the notification target point.

Thus, according to the present embodiment, a map generation system (driving assistance system S1) includes: an extraction unit (point extraction section 151A) that collects information including vehicle speed information including a speed, which includes at least a speed, acceleration, and deceleration, from a vehicle and that extracts rapid deceleration information, which includes a location (first location) where a rapid deceleration event satisfying predetermined conditions has occurred, and a traveling direction of the vehicle at the time when the rapid deceleration event has occurred from the collected information including the vehicle speed information including a speed that includes at least a speed, acceleration, and deceleration; a storage unit (map storage unit 12) that stores map data; a division unit (division section 152) that generates mesh map data by dividing the map data stored in the storage unit (map storage unit 12) into a plurality of meshes in a predetermined size and a predetermined number of divisions; and an estimation unit (intersection estimation section 153) that estimates a location that requires caution when the vehicle travels therethrough, as a caution-required place, based on the rapid deceleration information extracted by the extraction unit (point extraction section 151A) and the mesh map data generated by the division unit (division section 152).

Accordingly, the map generation system (driving assistance system S1) can extract rapid deceleration information including the traveling direction and the location of the vehicle when a rapid deceleration event has occurred based on the information including the vehicle speed information including a speed that includes at least a speed, acceleration, and deceleration, which is collected from the actual vehicle, and estimate a caution-required place based on the rapid deceleration information and mesh map data divided into a plurality of meshes in a predetermined size and a predetermined number of divisions. Therefore, it is possible to improve the extraction accuracy in extracting the caution-required place in the driving assistance system.

In the map generation system (driving assistance system S1), the division unit (division section 152) divides the map data into a plurality of block-shaped meshes in the predetermined size and the predetermined number of divisions, and the estimation unit (intersection estimation section 153) sets the front mesh such that a bottom center portion of the front mesh having a plurality of meshes configured similarly to the plurality of meshes is provided at the location where the rapid deceleration event has occurred.

Accordingly, the map generation system (driving assistance system S1) can estimate a caution-required place according to a plurality of front meshes based on the mesh map data obtained by dividing the map data into meshes in a predetermined size and a predetermined number of divisions.

In addition, in the map generation system (driving assistance system S1), the information including the vehicle speed information is information including vehicle speed information accumulated for a predetermined period of time. The extraction unit (point extraction section 151A) levels the information including the vehicle speed information in the predetermined period of time.

Therefore, the map generation system (driving assistance system S1) can estimate a caution-required place according to season, year, month, day, and time by estimating the caution-required place through leveling in a predetermined period of time.

Third Embodiment

Hereinafter, a third embodiment of the present invention will be described in detail with reference to the accompanying diagrams.

Figure 27:
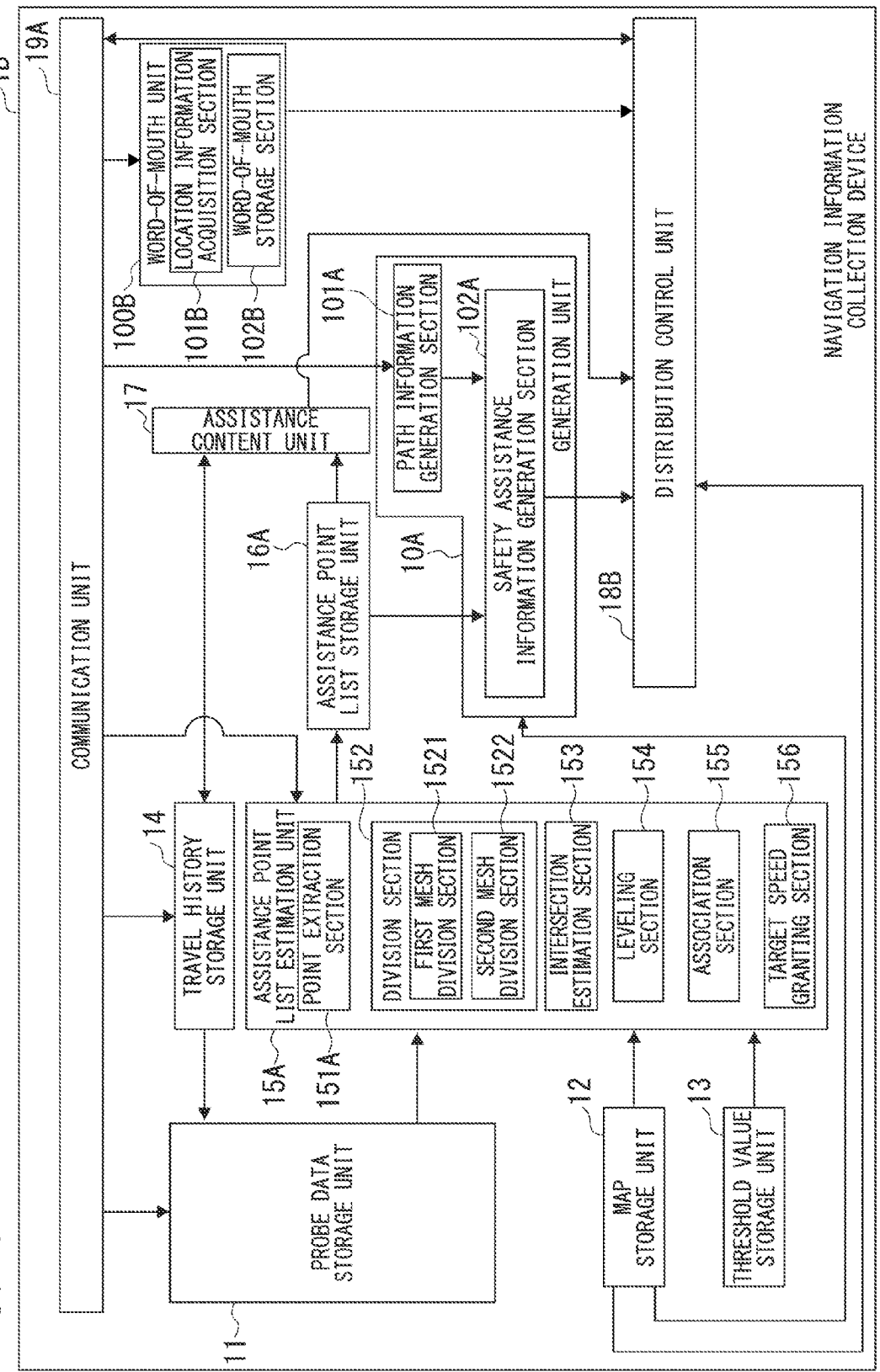
FIG. 27 is a schematic block diagram showing an example of the configuration of a navigation information collection device according to a third embodiment of the present invention.

FIG. 27 is a schematic block diagram showing an example of the configuration of a navigation information collection device 1B according to the third embodiment of the present invention.

The navigation information collection device B includes a probe data storage unit 11, a map storage unit 12, a threshold value storage unit 13, a travel history storage unit (personal history storage unit) 14, an assistance point list estimation unit 15A, an assistance point list storage unit 16A, an assistance content unit 17, a distribution control unit 18B, a communication unit 19A, a generation unit 10A, and a word-of-mouth unit 100B. The assistance point list estimation unit 15A includes a point extraction section 151A, a division section 152, an intersection estimation section 153, a leveling section 154, an association section 155, and a target speed granting section 156. The division section 152 includes a first mesh division section 1521 and the second mesh division section 1522. The generation unit 10A includes a path information generation section 101A and a safety assistance information generation section 102A. The word-of-mouth unit 100B includes a location information acquisition section 101B and a word-of-mouth storage section 102B. In addition, the distribution control unit 18B will be described since the operation thereof is different.

When the navigation information collection device 1B according to the third embodiment is compared with the navigation information collection device 1A according to the second embodiment, the word-of-mouth unit 100B is added in the navigation information collection device 1B. Since other configurations are the same as those of the navigation information collection device 1A according to the first embodiment, explanation thereof will be omitted.

The word-of-mouth unit 100B acquires word-of-mouth including location information and road safety information at the location, which are provided to social media from a plurality of users through a network, and stores the acquired word-of-mouth information.

Specifically, the location information acquisition section 101B acquires word-of-mouth, and acquires the information of a location, for which the word-of-mouth have been posted, using a known technique. Then, the location information acquisition section 101B stores word-of-mouth information, in which the acquired location information and the word-of-mouth are associated with each other, in the word-of-mouth storage section 102B. Here, the word-of-mouth is road safety information, for example, information including experiences or impressions when traveling through a certain spot. In addition, location information and road safety information at the location are included in the word-of-mouth information.

In addition, the word-of-mouth unit 100B compares the location information of driving assistance places stored in the assistance point list storage unit 16 with the location information included in the word-of-mouth information, and stores the driving assistance place and the word-of-mouth information in the word-of-mouth storage section 102B so as to be associated with each other.

The distribution control unit 18B controls the distribution of an application managed by the assistance content unit 17. The distribution control unit 18B performs control to transmit the driving assistance place information, which is input from the safety assistance information generation section 102A, to the electronic device 2B through the communication unit 19A and the network N1. In addition, the distribution control unit 18 performs control to transmit the content information, which is input from the assistance content unit 17, to the electronic device 2B through the communication unit 19A and the network N1.

When word-of-mouth information associated with the location of the caution-required place included in the driving assistance place information input from the safety assistance information generation section 102A is stored in the word-of-mouth storage section 102B, the distribution control unit 18B performs control to distribute the word-of-mouth information and the driving assistance place information to the electronic device 2B.

Figure 28:
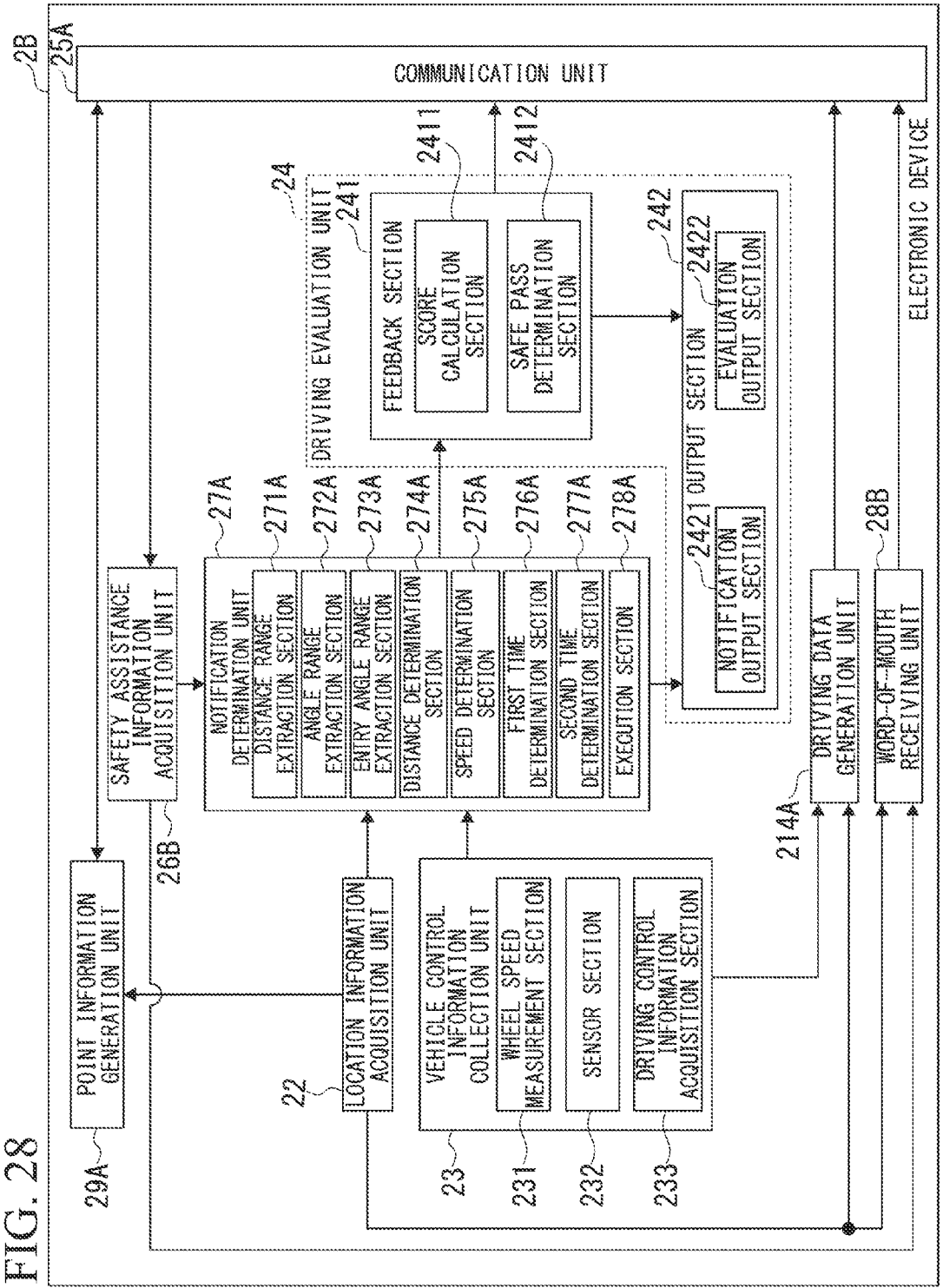
FIG. 28 is a schematic block diagram showing an example of the configuration of an electronic device according to the present embodiment.

FIG. 28 is a schematic block diagram showing an example of the configuration of the electronic device 2B according to the present embodiment.

The electronic device 2B includes a driving data generation unit 214A, a location information acquisition unit 22, a vehicle control information collection unit 23, a driving evaluation unit 24, a communication unit 25A, a safety assistance information acquisition unit 26B, a notification determination unit 27A, a point information generation unit 29A, and a word-of-mouth receiving unit 28B. The vehicle control information collection unit 23 includes a wheel speed measurement section 231, a sensor section 232, and a driving control information acquisition section 233. The driving evaluation unit 24 includes a feedback section 241 and an output section 242. The feedback section 241 includes a score calculation section 2411 and a safe pass determination section 2412. The output section 242 includes a notification output section 2421 and an evaluation output section 2422. The notification determination unit 27A includes a distance range extraction section 271A, an angle range extraction section 272A, an entry angle range extraction section 273A, a distance determination section 274A, a speed determination section 275A, a first time determination section 276A, a second time determination section 277A, and an execution section 278A.

When the electronic device 2B according to the third embodiment is compared with the electronic device 2A according to the second embodiment, the word-of-mouth receiving unit 28B is added in the electronic device 2B. Since other configurations are the same as those of the electronic device 2A, explanation thereof will be omitted.

The word-of-mouth receiving unit 28B receives a posting of word-of-mouth including the road safety information from the driver of the vehicle 4 to social media, for example. The word-of-mouth receiving unit 28B associates the location information of the vehicle 4 and the caution-required place included in the driving assistance place information with the word-of-mouth, and posts the result to social media through the communication unit 25A.

Figure 29:
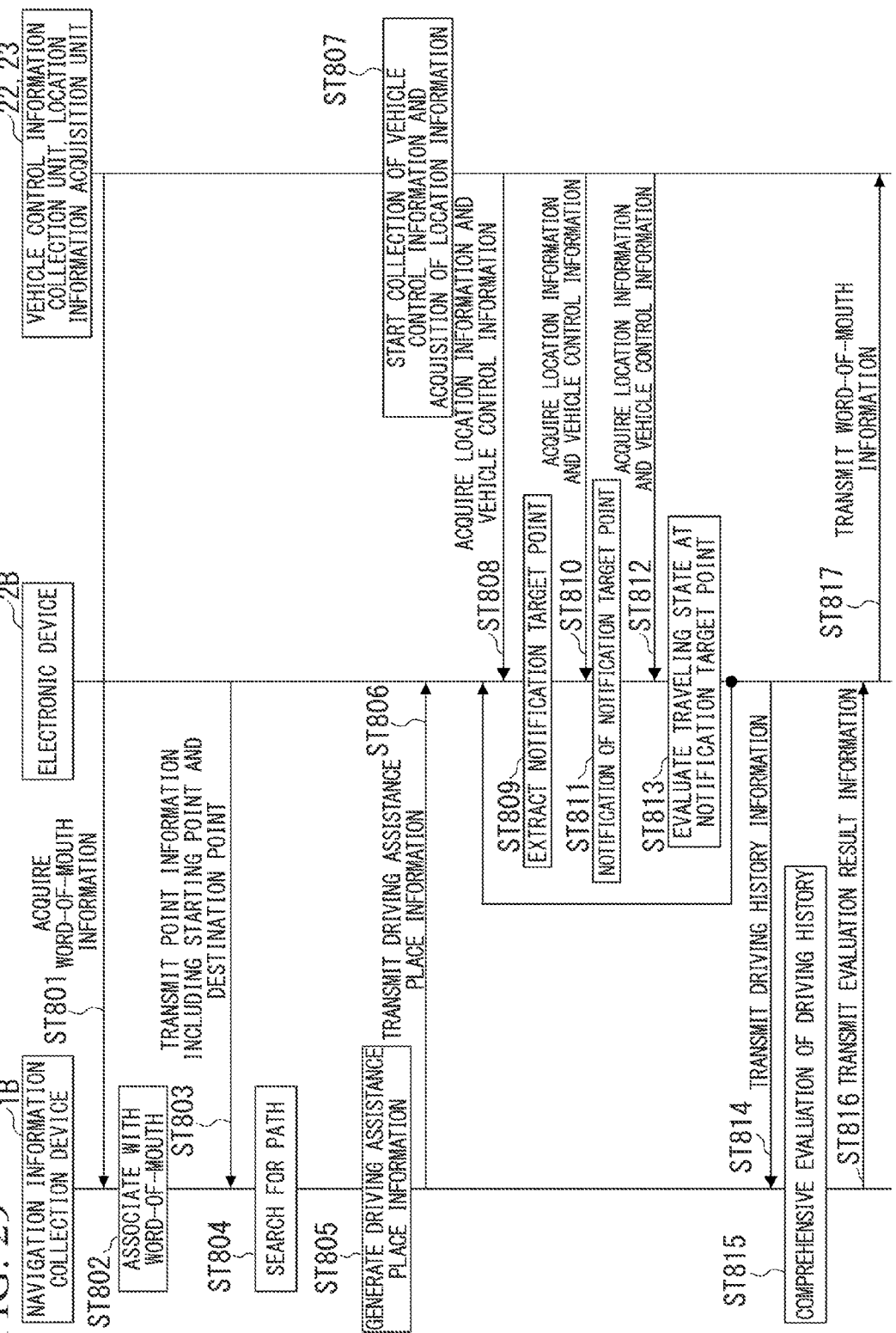
FIG. 29 is a sequence diagram showing an example of the operation of the driving assistance system according to the present embodiment.

FIG. 29 is a sequence diagram showing an example of the operation of the driving assistance system S1 according to the present embodiment.

In step ST801, the word-of-mouth unit 10B acquires word-of-mouth information from a word-of-mouth server apparatus (social media server apparatus).

In step ST802, the location information acquisition section 101B stores word-of-mouth information, in which the acquired location information and the word-of-mouth are associated with each other, in the word-of-mouth storage section 102B.

In step ST803, the electronic device 2B transmits, to the navigation information collection device 1A, point information including the starting point and the destination point generated by the point information generation unit 29A.

In step ST804, the path information generation section 101A generates navigation information by reading map data from the map storage unit 12 and searching for a path from the map data based on the starting point and the destination point included in the point information.

In step ST805, the safety assistance information generation section 102A of the navigation information collection device 1B reads an assistance point list in a range including the point information from the assistance point list storage unit 16 based on the point information received from the electronic device 2B. The safety assistance information generation section 102A generates driving assistance place information by associating frequent sudden braking intersection information included in the assistance point list with the map data included in the navigation information based on the assistance point list and the navigation information input from the path information generation section 101A.

In step ST806, the navigation information collection device 1B transmits the driving assistance place information to the electronic device 2B.

In step ST807, the location information acquisition unit 22 and the vehicle control information collection unit 23 of the electronic device 2B start the acquisition of the location information of the vehicle 4 and the collection of the vehicle control information of the vehicle 4.

In step ST808, the notification determination unit 27A of the electronic device 2B acquires the location information of the vehicle 4 and the vehicle control information of the vehicle 4 that have been acquired or collected by the location information acquisition unit 22 and the vehicle control information collection unit 23.

In step ST809, the notification determination unit 27A extracts a notification target point from a plurality of caution-required places included in the assistance point list based on the location information and the vehicle control information that have been acquired.

In step ST810, the notification determination unit 27A acquires the location information of the vehicle 4 and the vehicle control information of the vehicle 4 that have been acquired or collected by the location information acquisition unit 22 and the vehicle control information collection unit 23.

In step ST811, the notification determination unit 27A performs notification determination for the extracted notification target point, and performs traveling notification of caution-required place based on the determination result.

In step ST812, the notification determination unit 27A acquires the location information of the vehicle 4 and the vehicle control information of the vehicle 4 that have been acquired or collected by the location information acquisition unit 22 and the vehicle control information collection unit 23.

In step ST813, the driving evaluation unit 24 evaluates the traveling state based on the traveling state of the vehicle 4 in a predetermined range including the notification target point, and notifies the driver of the vehicle 4 of the evaluation result immediately after the vehicle 4 has passed through the notification target point.

In addition, the electronic device 2B repeats the processing of steps ST808 to ST813 until the vehicle 4 arrives at the destination point from the starting point.

In step ST814, the electronic device 2B transmits a travel history for one trip, that is, a travel history from the starting point to the destination point, as driving history information, to the navigation information collection device 1B.

In step ST815, the navigation information collection device 1B stores the driving history information received from the electronic device 2B in the travel history storage unit 14, and the assistance content unit 17 evaluates the driving history comprehensively.

In step ST816, the navigation information collection device 1B transmits evaluation result information including the evaluation result to the electronic device 2B.

In step ST817, the word-of-mouth receiving unit 28B transmits the received word-of-mouth information to the word-of-mouth server apparatus (social media server apparatus).

Figure 30:
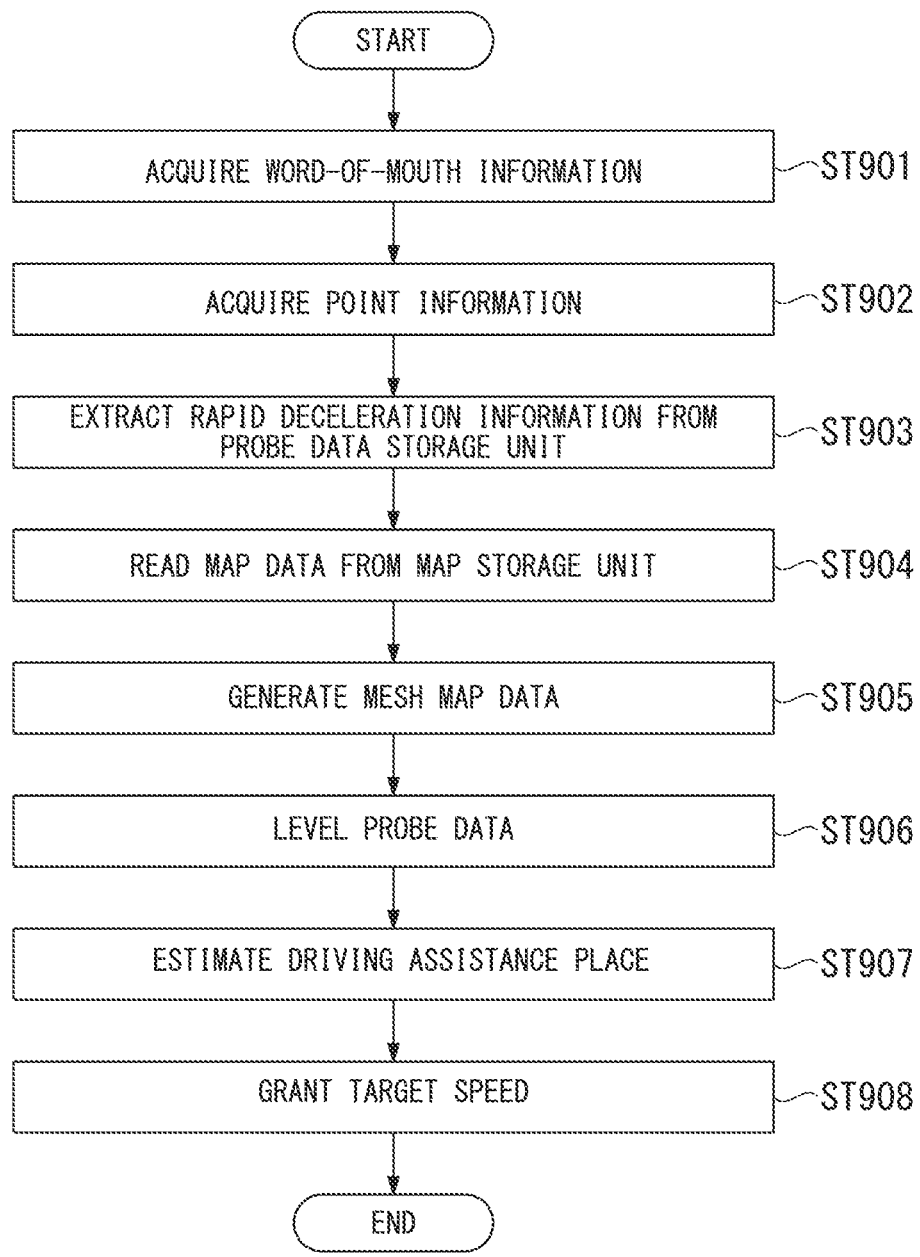
FIG. 30 is a flowchart showing an example of the assistance point list extraction processing of an assistance point list estimation unit according to the present embodiment.

FIG. 30 is a flowchart showing an example of the assistance point list extraction processing of the assistance point list estimation unit 15 according to the present embodiment.

In step ST901, the word-of-mouth unit 100B acquires word-of-mouth information from social media.

In step ST902, the point extraction section 151A acquires point information from the electronic device 2A through the communication unit 19A and the network N1.

In step ST903, the point extraction section 151A reads a predetermined range of probe data including the point information from the probe data storage unit 11 and extracts, from the probe data, rapid deceleration information including the occurrence location of a rapid deceleration event corresponding to predetermined conditions (for example, vehicle speed information is deceleration equal to or greater than the threshold value) and a traveling direction of the vehicle when the rapid deceleration event has occurred.

In step ST904, the division section 152 reads the map data from the map storage unit 12.

In step ST905, the first mesh division section 1521 generates first mesh map data by dividing a predetermined range of map data into block-shaped meshes in the latitude and longitude directions. The second mesh division section 1522 generates second mesh map data by dividing one mesh in the first mesh map data into, for example, nine meshes.

In step ST906, the leveling section 154 levels one or both of the probe data and the frequent sudden braking intersection estimated by the intersection estimation section 153 in a predetermined period of time by referring to the probe data.

In step ST907, the intersection estimation section 153 estimates the frequent sudden braking intersection as a driving assistance place based on the first mesh map data, the second mesh map data, the number of occurrence points of rapid deceleration, the rapid deceleration orientation, and the rapid deceleration probability.

In step ST908, the target speed granting section 156 grants a target speed as a target to pass safely through the frequent sudden braking intersection, which is calculated for each link at the frequent sudden braking intersection, to the frequent sudden braking intersection based on the probe data and the map data.

Thus, according to the present embodiment, a map generation system (driving assistance system S1) includes: an extraction unit (point extraction section 151A) that collects vehicle speed information, which includes at least a speed, acceleration, and deceleration, from a vehicle and that extracts rapid deceleration information, which includes a location (first location) where a rapid deceleration event satisfying predetermined conditions has occurred, and a traveling direction of the vehicle at the time when the rapid deceleration event has occurred from the collected information including the vehicle speed information including a speed that includes at least a speed, acceleration, and deceleration; a storage unit (map storage unit 12) that stores map data; a division unit (division section 152) that generates mesh map data by dividing the map data stored in the storage unit (map storage unit 12) into a plurality of meshes in a predetermined size and a predetermined number of divisions; and an estimation unit (intersection estimation section 153) that estimates a location that requires caution when the vehicle travels therethrough, as a caution-required place, based on the rapid deceleration information extracted by the extraction unit (point extraction section 151A) and the mesh map data generated by the division unit (division section 152).

Accordingly, the map generation system (driving assistance system S1) can extract rapid deceleration information including the traveling direction and the location of the vehicle when a rapid deceleration event has occurred based on the information including the vehicle speed information including a speed that includes at least a speed, acceleration, and deceleration, which is collected from the actual vehicle, and estimate a caution-required place based on the rapid deceleration information and mesh map data divided into a plurality of meshes in a predetermined size and a predetermined number of divisions. Therefore, it is possible to improve the extraction accuracy in extracting the caution-required place in the driving assistance system.

In the map generation system (driving assistance system S1), when a traffic signal is present at the location of the intersection, the estimation unit (intersection estimation section 153) does not estimate the location of the intersection as the caution-required place.

Therefore, the map generation system (driving assistance system S1) can estimate the caution-required place according to whether or not a traffic signal is provided, thus, it is possible to estimate an intersection where no traffic signal is provided as a caution-required place, without estimating an intersection where a traffic signal is provided as a caution-required place.

In the map generation system (driving assistance system S1), the estimation unit (intersection estimation section 153) calculates a target speed in the caution-required place based on the information including the vehicle speed information including a speed, which includes at least a speed, acceleration, and deceleration, and associates the target speed with the caution-required place.

Therefore, the map generation system (driving assistance system S1) can calculate the target speed based on the information including the vehicle speed information including a speed, which includes at least a speed, acceleration, and deceleration, and associate the target speed and the caution-required place with each other so that the target speed can be used as a threshold value when estimating the caution-required place. By estimating the caution-required place based on the threshold value, it is possible to suppress the occurrence of a situation in which a point, at which the vehicle travels appropriately along the specific flow of the road, is estimated as a caution-required place.

In addition, the map generation system (driving assistance system S1) further includes a word-of-mouth storage unit (102B) that stores word-of-mouth information including location information and road safety information at the location, which is provided from a plurality of users through a network, and a word-of-mouth unit (100B) that associates the caution-required place and the word-of-mouth information with each other when there is the word-of-mouth information regarding the caution-required place.

Therefore, the map generation system (driving assistance system S1) can store the word-of-mouth information including the road safety information including the location information and associate the word-of-mouth information and the caution-required place with each other. As a result, it is possible to estimate a caution-required place based on the word-of-mouth information associated with the caution-required place.

In each of the embodiments described above, the search for the travel path may be performed either by the electronic device or by the navigation information collection device, and the evaluation of the traveling state of the driving evaluation unit 24 may be performed either by the electronic device or by the navigation information collection device. In the above explanation, the output section 242 performs traveling notification of caution-required place. However, for example, it is possible to perform control such that a control signal for controlling a driving unit or a braking unit (not shown) is output according to the caution-required place when the vehicle 4 travels and the reaction force is applied to the driving unit.

In addition, in each of the embodiments described above, an intersection is extracted as the caution-required place (driving assistance place). However, any place on the road, for example, a place where a child pops out, a place where an accident occurs frequently, a place where the driver's technique is required in traveling, a place where there is a restriction on the height of a vehicle, and the like may be extracted as caution-required places, and the driver may be notified of the execution of traveling notification of caution-required place and the evaluation result after evaluating the traveling state in the caution-required place.

All or parts of the navigation information collection device and the electronic device in each of the embodiments described above may be implemented by using a computer. In this case, the above may be implemented by recording a program for realizing the control function in a computer-readable recording medium, reading the program recorded in the recording medium into a computer system, and executing the read program. The "computer system" referred to herein is a computer system built into the navigation information collection device and the electronic system, and is intended to include an OS or hardware, such as a peripheral device.

In addition, examples of the "computer-readable recording medium" include portable media, such as a flexible disk, a magneto-optic disc, a ROM, and a CD-ROM, and a storage device, such as a hard disk built into the computer system. In addition, examples of the "computer-readable recording medium" may also include a recording medium that stores a program dynamically for a short period of time like a network, such as the Internet, or a communication line when transmitting a program through a communication line, such as a telephone line, and include a recording medium that stores a program for a predetermined period of time like a volatile memory in a computer system that serves as a server or a client in that case.

The above program may be a program for realizing some of the functions described above or may be a program capable of realizing the above functions in combination with a program already recorded in the computer system.

In addition, all or parts of the navigation information collection device and the electronic device in each of the embodiments described above may be implemented as an integrated circuit, such as a large scale integration (LSI). The functional blocks of each of the navigation information collection device and the electronic system may be implemented as separate processors, or all or some of the functional blocks of each of the navigation information collection device and the electronic system may be integrated as a processor. The method of circuit integration may be realized by using a dedicated circuit or a general-purpose processor without being limited to the LSI. In addition, if the integrated circuit technology to replace the LSI appears as a result of advances in semiconductor technologies, it is also possible to use the integrated circuit based on the technology.

While one embodiment of the invention has been described in detail with reference to the diagrams, the specific configuration is not limited to those described above, and various design changes and the like within the scope not departing from the subject matter of the invention.

In addition, the techniques of the first to third embodiments described above can be used by being appropriately combined with each other. In addition, some of the components may be omitted.

REFERENCE SIGNS LIST

S1: driving assistance system (map generation system)
S2: navigation information collection system
S3, S3-1, S3-2: navigation system
1, 1A, 1B: navigation information collection device (map generation device)
2, 2-1, 2-2, 2-3, 2A, 2B: electronic device (map generation device)
3: in-vehicle terminal device
4, 4-1, 4-2: vehicle
N1: network
10A: generation unit
101A: path information generation section
102A: safety assistance information generation section
11: probe data storage unit
12: map storage unit (storage unit)
13: threshold value storage unit
14: travel history storage unit (personal history storage unit)
15, 15A: assistance point list estimation unit
151, 151A: point extraction section (extraction section)
152: division section
1521: first mesh division section
1522: second mesh division section
153: intersection estimation section (estimation section)
154: leveling section
155: association section
156: target speed granting section
16: assistance point list storage unit
17: assistance content unit
18, 18A, 18B: distribution control unit
19, 19A: communication unit
100B: word-of-mouth unit
101B: location information acquisition section
102: word-of-mouth storage section
21: generation unit
211: path information generation section
212: assistance point list acquisition section
213: safety assistance information generation section
214, 214A: driving data generation section
22: location information acquisition unit
23: vehicle control information collection unit
231: wheel speed measurement section
232: sensor section
233: driving control information acquisition section
24: driving evaluation unit
241: feedback section
2411: score calculation section
2412: safe pass determination section
242: output section
2421: information output section
2422: evaluation output section
25, 25A: communication unit 26A: safety assistance information acquisition unit
27A: notification determination unit
271A: distance range extraction section
272A: angle range extraction section
273A: entry angle range extraction section
274A: distance determination section
275A: speed determination section
275A: first time determination section
277A: second time determination section
278A: execution section
28B: word-of-mouth receiving unit
29A: point information generation unit

The invention claimed is:

1. A map generation system, comprising an electronic device,
the electronic device comprising:
an extraction unit configured to collect vehicle speed information, which includes at least a speed, acceleration, and deceleration, from a vehicle and configured to extract rapid deceleration information, which includes a first location where a rapid deceleration event satisfying predetermined conditions has occurred, and a traveling direction of the vehicle at the time when the rapid deceleration event has occurred from the collected vehicle speed information;
a storage unit that stores map data;
a division unit configured to generate mesh map data by dividing the map data stored in the storage unit into a plurality of meshes in a predetermined size and a predetermined number of divisions; and
an estimation unit configured to estimate a location that requires caution when the vehicle travels therethrough, as a caution-required place, based on the rapid deceleration information extracted by the extraction unit and the mesh map data generated by the division unit,
wherein intersection location information indicating a location of an intersection is included in the map data,
the estimation unit estimates the location of the intersection on the map data present in a front mesh in front of the mesh which includes the first location indicated by the rapid deceleration information, as the caution-required place,
the vehicle speed information is information including vehicle speed information accumulated for a predetermined period of time, and
the extraction unit levels the vehicle speed information in the predetermined period of time.

2. The map generation system according to claim 1,
wherein the division unit divides the map data into a plurality of block-shaped meshes in the predetermined size and the predetermined number of divisions, and
the estimation unit sets the front mesh such that a bottom center portion of the front mesh having a plurality of meshes configured similarly to the plurality of meshes is provided at the first location where the rapid deceleration event has occurred.

3. The map generation system according to claim 1,
wherein, when a traffic signal is present at the location of the intersection, the estimation unit does not estimate the location of the intersection as the caution-required place.

4. The map generation system according to claim 1,
wherein the estimation unit calculates a target speed in the caution-required place based on the vehicle speed information, and associates the target speed with the caution-required place.

5. The map generation system according to claim 1, the electronic device further comprising:
a word-of-mouth storage unit that stores word-of-mouth information including location information and road safety information at the location, the word-of-mouth information being provided from a plurality of users through a network; and
a word-of-mouth unit configured to associate the caution-required place and the word-of-mouth information with each other when the word-of-mouth information regarding the caution-required place is present.

6. The map generation system according to claim 1, wherein the map generation system sends the estimated caution-required place to the vehicle to cause the vehicle to perform traveling notification of the caution-required place.

7. A map generation device comprising an electronic device, the electronic device comprising:
an extraction unit configured to collect vehicle speed information, which includes at least a speed, acceleration, and deceleration, from a vehicle and that extracts rapid deceleration information, which includes a first location where a rapid deceleration event satisfying predetermined conditions has occurred, and a traveling direction of the vehicle at the time when the rapid deceleration event has occurred from the collected vehicle speed information;
a storage unit that stores map data;
a division unit configured to generate mesh map data by dividing the map data stored in the storage unit into a plurality of meshes in a predetermined size and a predetermined number of divisions; and
an estimation unit configured to estimate a location that requires caution when the vehicle travels therethrough, as a caution-required place, based on the rapid deceleration information extracted by the extraction unit and the mesh map data generated by the division unit,
wherein intersection location information indicating a location of an intersection is included in the map data, and
the estimation unit estimates the location of the intersection on the map data present in a front mesh in front of the mesh which includes the first location indicated by the rapid deceleration information, as the caution-required place,
the vehicle speed information is information including vehicle speed information accumulated for a predetermined period of time, and
the extraction unit levels the vehicle speed information in the predetermined period of time.

8. The map generation device according to claim 7, wherein the map generation device sends the estimated caution-required place to the vehicle to cause the vehicle to perform traveling notification of the caution-required place.

9. A map generation method, comprising:
a first step collecting, by using an electronic device, vehicle speed information, which includes at least a speed, acceleration, and deceleration, from a vehicle and extracting rapid deceleration information, which includes a first location where a rapid deceleration event satisfying predetermined conditions has occurred, and a traveling direction of the vehicle at the time when the rapid deceleration event has occurred from the collected vehicle speed information;
a second step of, by using the electronic device, generating mesh map data by dividing map data stored in a storage device into a plurality of meshes in a predetermined size and a predetermined number of divisions; and a third step of estimating, by using the electronic device, a location that requires caution when the vehicle travels therethrough, as a caution-required place, based on the rapid deceleration information extracted in the first step and the mesh map data generated in the second step, wherein intersection location information indicating a location of an intersection is included in the map data, and the third step comprises a fourth step which includes estimating the location of the intersection on the map data present in a front mesh in front of the mesh which includes the first location indicated by the rapid deceleration information, as the caution-required place, wherein the vehicle speed information is information including vehicle speed information accumulated for a predetermined period of time, and the first step comprises a fifth step which levels the vehicle speed information in the predetermined period of time.

10. The map generation method according to claim 9, further comprising a fifth step of, by using the electronic device, sending the estimated caution-required place to the vehicle to cause the vehicle to perform traveling notification of the caution-required place.

11. A non-transitory computer readable medium including program causing a computer including a storage unit that stores map data to execute:

a first step of collecting vehicle speed information, which includes at least a speed, acceleration, and deceleration, from a vehicle and extracting rapid deceleration information, which includes a first location where a rapid deceleration event satisfying predetermined conditions has occurred, and a traveling direction of the vehicle at the time when the rapid deceleration event has occurred from the collected vehicle speed information;

a second step of generating mesh map data by dividing the map data stored in the storage unit into a plurality of meshes in a predetermined size and a predetermined number of divisions; and a third step of estimating a location that requires caution when the vehicle travels therethrough, as a caution-required place, based on the rapid deceleration information extracted in the first step and the mesh map data generated in the second step, wherein intersection location information indicating a location of an intersection is included in the map data, and the third step comprises a fourth step which includes estimating the location of the intersection on the map data present in a front mesh in front of the mesh which includes the first location indicated by the rapid deceleration information, as the caution-required place, wherein the vehicle speed information is information including vehicle speed information accumulated for a predetermined period of time, and the first step comprises a fifth step which levels the vehicle speed information in the predetermined period of time.

12. The non-transitory computer readable medium according to claim 11, the program further causing the computer to execute a fifth step of, by using the electronic device, sending the estimated caution-required place to the vehicle to cause the vehicle to perform traveling notification of the caution-required place.

* * * * *